US012610025B2

(12) United States Patent
Sarkis et al.

(10) Patent No.: US 12,610,025 B2
(45) Date of Patent: Apr. 21, 2026

(54) COMMUNICATION FRAMEWORK FOR VIRTUAL REPRESENTATION CALLS

(71) Applicant: QUALCOMM Incorporated, San Diego, CA (US)

(72) Inventors: Michel Adib Sarkis, San Diego, CA (US); Imed Bouazizi, Frisco, TX (US); Thomas Stockhammer, Bergen (DE); Ning Bi, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 18/468,648

(22) Filed: Sep. 15, 2023

(65) Prior Publication Data

US 2024/0259529 A1 Aug. 1, 2024

Related U.S. Application Data

(60) Provisional application No. 63/480,677, filed on Jan. 19, 2023.

(51) Int. Cl.
*H04N 7/15* (2006.01)
*G06F 3/01* (2006.01)
(Continued)

(52) U.S. Cl.
CPC .............. *H04N 7/157* (2013.01); *G06T 7/70* (2017.01); *G06T 13/40* (2013.01); *G06T 17/20* (2013.01)

(58) Field of Classification Search
CPC ........... H04N 7/157; G06T 7/70; G06T 13/40; G06T 17/20; G06F 3/011
See application file for complete search history.

(56) References Cited

U.S. PATENT DOCUMENTS

2006/0210045 A1    9/2006  Valliath et al.
2016/0353056 A1   12/2016  Cullen
(Continued)

FOREIGN PATENT DOCUMENTS

WO        2022106077 A1    5/2022

OTHER PUBLICATIONS

3GPP TR 26.928 V2.0.0: "3rd Generation Partnership Project, Technical Specification Group Services and System Aspects; Extended Reality (XR) in 5G (Release 16)", 3GPP Standard, Technical Report, 3rd Generation Partnership Project (3GPP), Mobile Competence Centre, 650, Route Des Lucioles, F-06921 Sophia-Antipolis Cedex, France, vol. SA WG4, No. V2.0.0, Mar. 11, 2020, 131 Pages, XP051861037.
(Continued)

*Primary Examiner* — Duc Nguyen
*Assistant Examiner* — Saad Ahmed Syed
(74) *Attorney, Agent, or Firm* — Polsinelli LLP/QUALCOMM Incorporated

(57) ABSTRACT

Systems and techniques are described for establishing one or more virtual sessions between users. For instance, a first device can transmit, to a second device, a call establishment request for a virtual representation call for a virtual session and can receive, from the second device, a call acceptance indicating acceptance of the call establishment request. The first device can transmit, to the second device, first mesh information for a first virtual representation of a first user of the first device and first mesh animation parameters for the first virtual representation. The first device can receive, from the second device, second mesh information for a second virtual representation of a second user of the second device and second mesh animation parameters for the second virtual representation. The first device can generate, based on the second mesh information and the second mesh
(Continued)

200– animation parameters, the second virtual representation of the second user.

31 Claims, 45 Drawing Sheets

(51) Int. Cl.
    *G06T 7/70*      (2017.01)
    *G06T 13/40*     (2011.01)
    *G06T 17/20*     (2006.01)

(56)                    References Cited

U.S. PATENT DOCUMENTS

| | | | |
|---|---|---|---|
| 2017/0331952 A1* | 11/2017 | Rogers | H04W 4/02 |
| 2018/0181794 A1* | 6/2018 | Benini | G06V 40/18 |
| 2019/0096130 A1* | 3/2019 | Shim | G06F 3/011 |
| 2020/0026906 A1* | 1/2020 | Ajiki | G01C 3/06 |
| 2021/0358227 A1 | 11/2021 | Oz et al. | |
| 2024/0331296 A1* | 10/2024 | Marchant | G06T 19/20 |

OTHER PUBLICATIONS

International Search Report and Written Opinion—PCT/US2023/084105—ISA/EPO—Apr. 2, 2024.

* cited by examiner

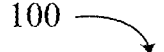
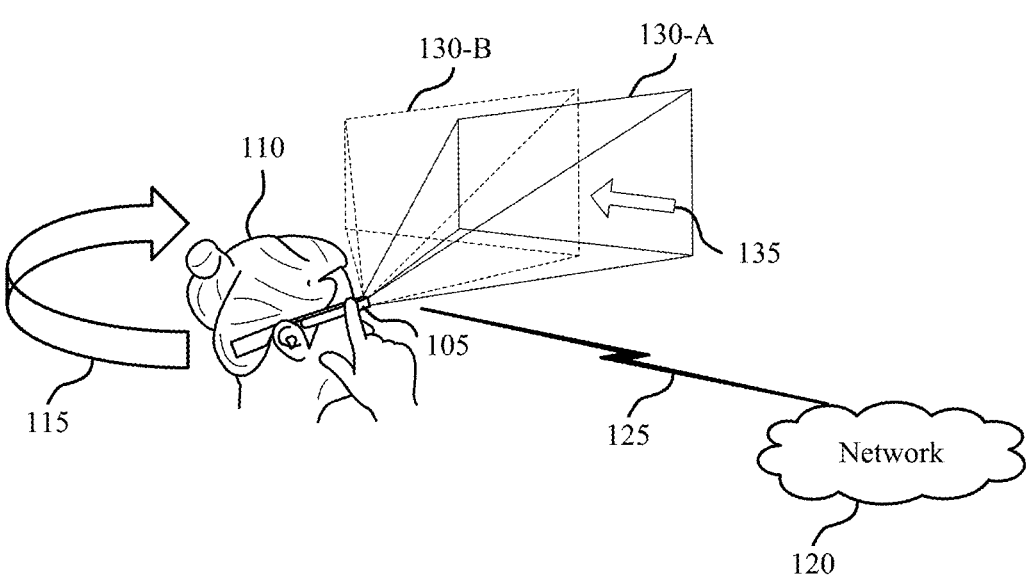
FIG. 1

300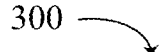
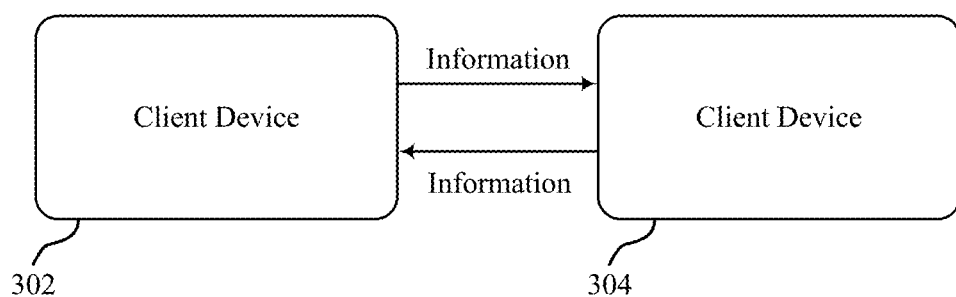
FIG. 3

500

User Interface Unit

505

Display

545

Central Processing Unit

CPU Memory

515

GPU Driver

520

Extended Reality Manager

550

510

Graphics Processing Unit

GPU Memory

530

525

Display Buffer

535

System Memory

540

1200 —

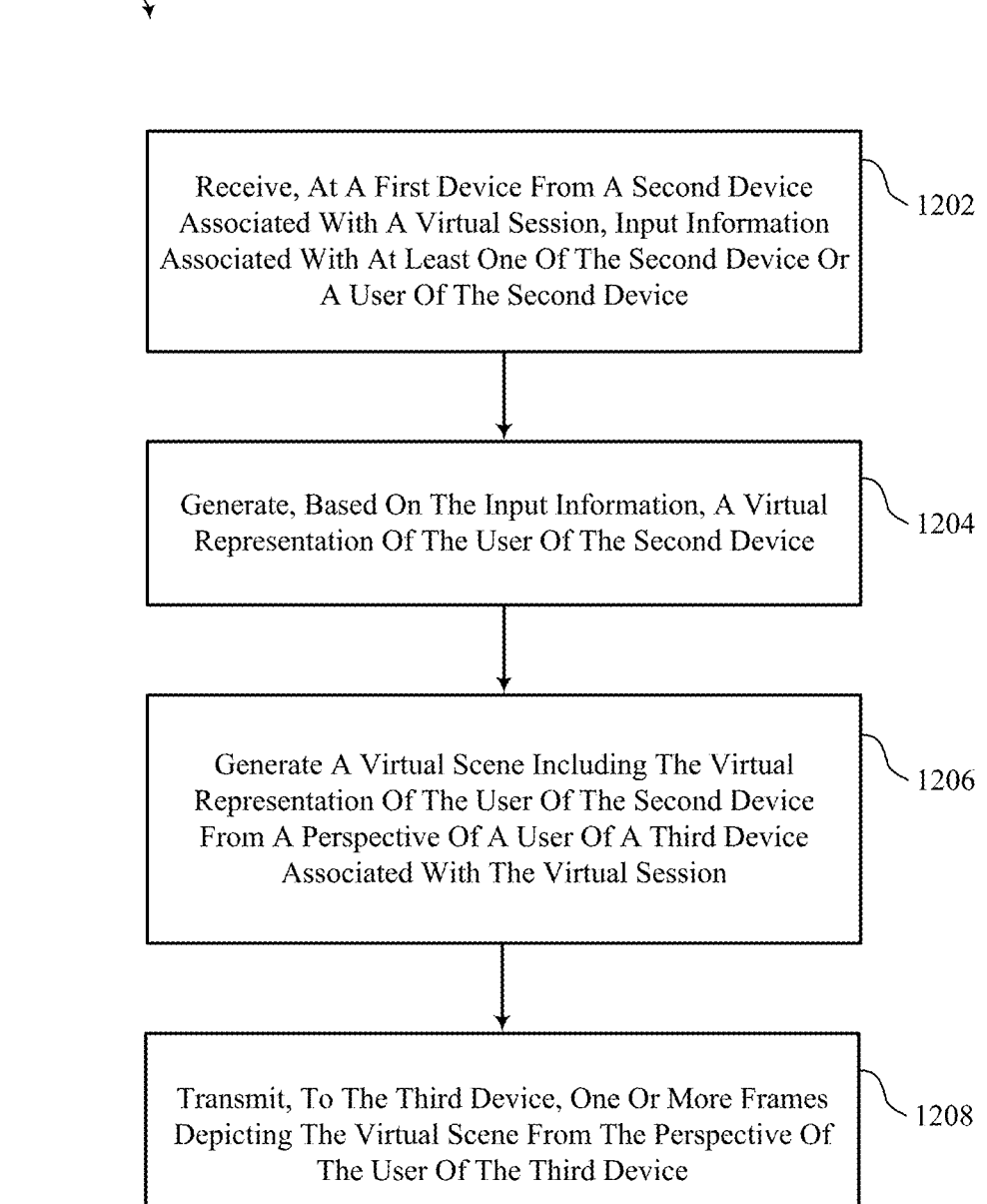

Receive, At A First Device From A Second Device Associated With A Virtual Session, Input Information Associated With At Least One Of The Second Device Or A User Of The Second Device     1202

Generate, Based On The Input Information, A Virtual Representation Of The User Of The Second Device     1204

Generate A Virtual Scene Including The Virtual Representation Of The User Of The Second Device From A Perspective Of A User Of A Third Device Associated With The Virtual Session     1206

Transmit, To The Third Device, One Or More Frames Depicting The Virtual Scene From The Perspective Of The User Of The Third Device     1208

FIG. 12

1402
Raw
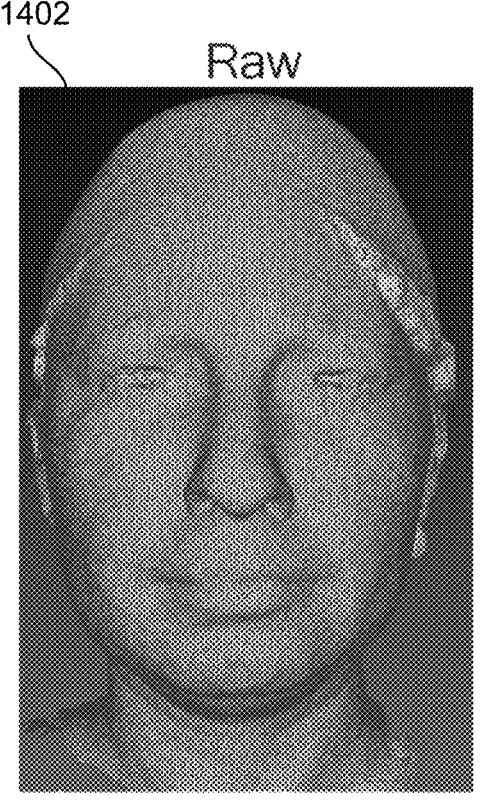
1404
Retopologized
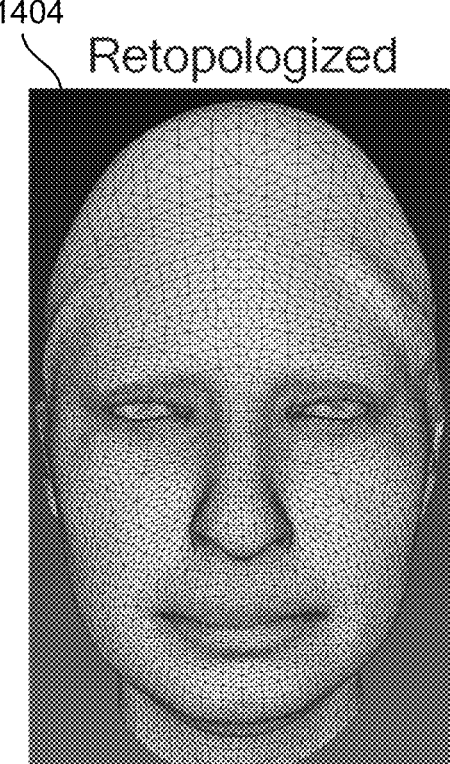
FIG. 14A    FIG. 14B

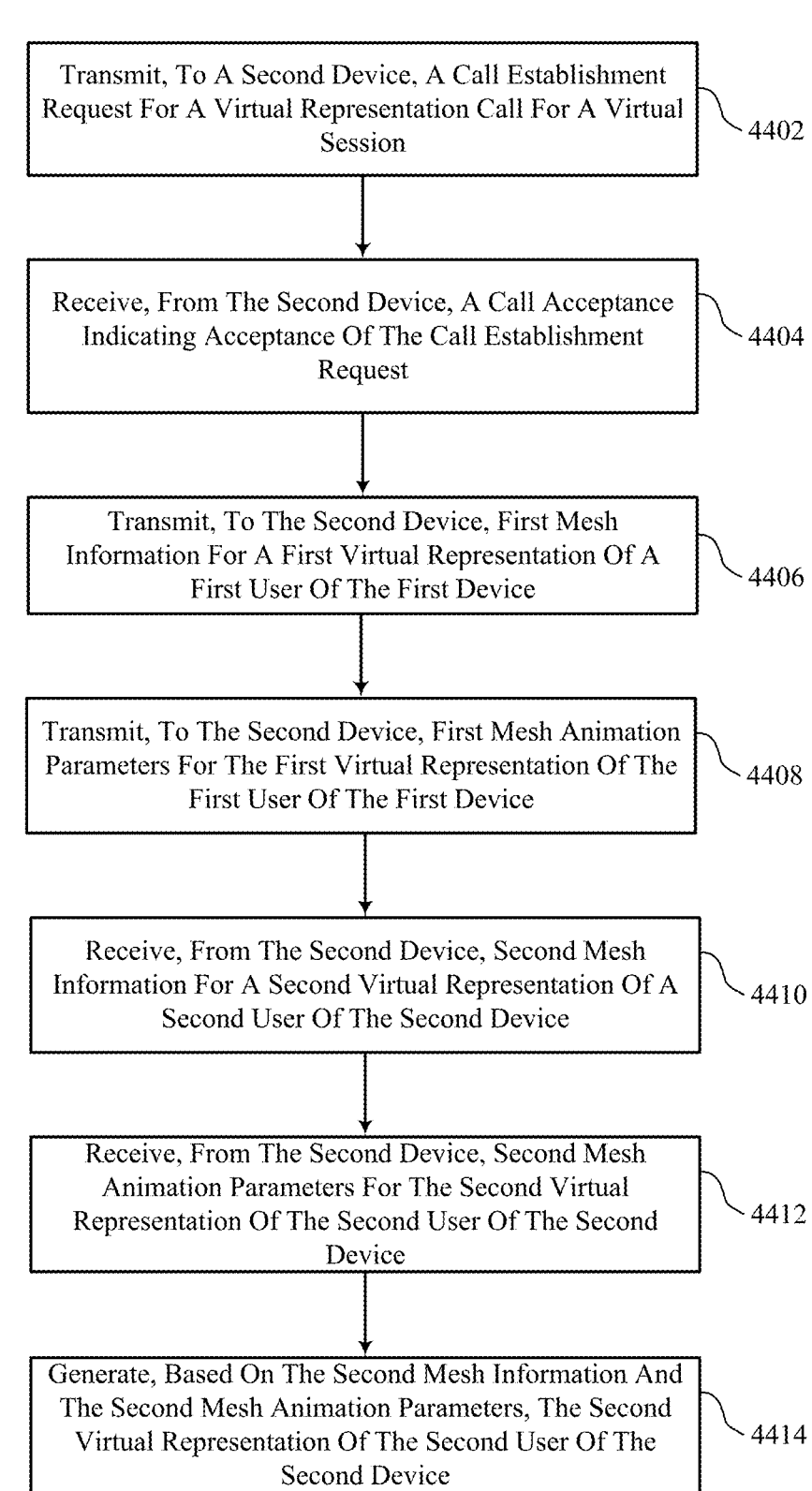

4400

Transmit, To A Second Device, A Call Establishment Request For A Virtual Representation Call For A Virtual Session — 4402

Receive, From The Second Device, A Call Acceptance Indicating Acceptance Of The Call Establishment Request — 4404

Transmit, To The Second Device, First Mesh Information For A First Virtual Representation Of A First User Of The First Device — 4406

Transmit, To The Second Device, First Mesh Animation Parameters For The First Virtual Representation Of The First User Of The First Device — 4408

Receive, From The Second Device, Second Mesh Information For A Second Virtual Representation Of A Second User Of The Second Device — 4410

Receive, From The Second Device, Second Mesh Animation Parameters For The Second Virtual Representation Of The Second User Of The Second Device — 4412

Generate, Based On The Second Mesh Information And The Second Mesh Animation Parameters, The Second Virtual Representation Of The Second User Of The Second Device — 4414

FIG. 44

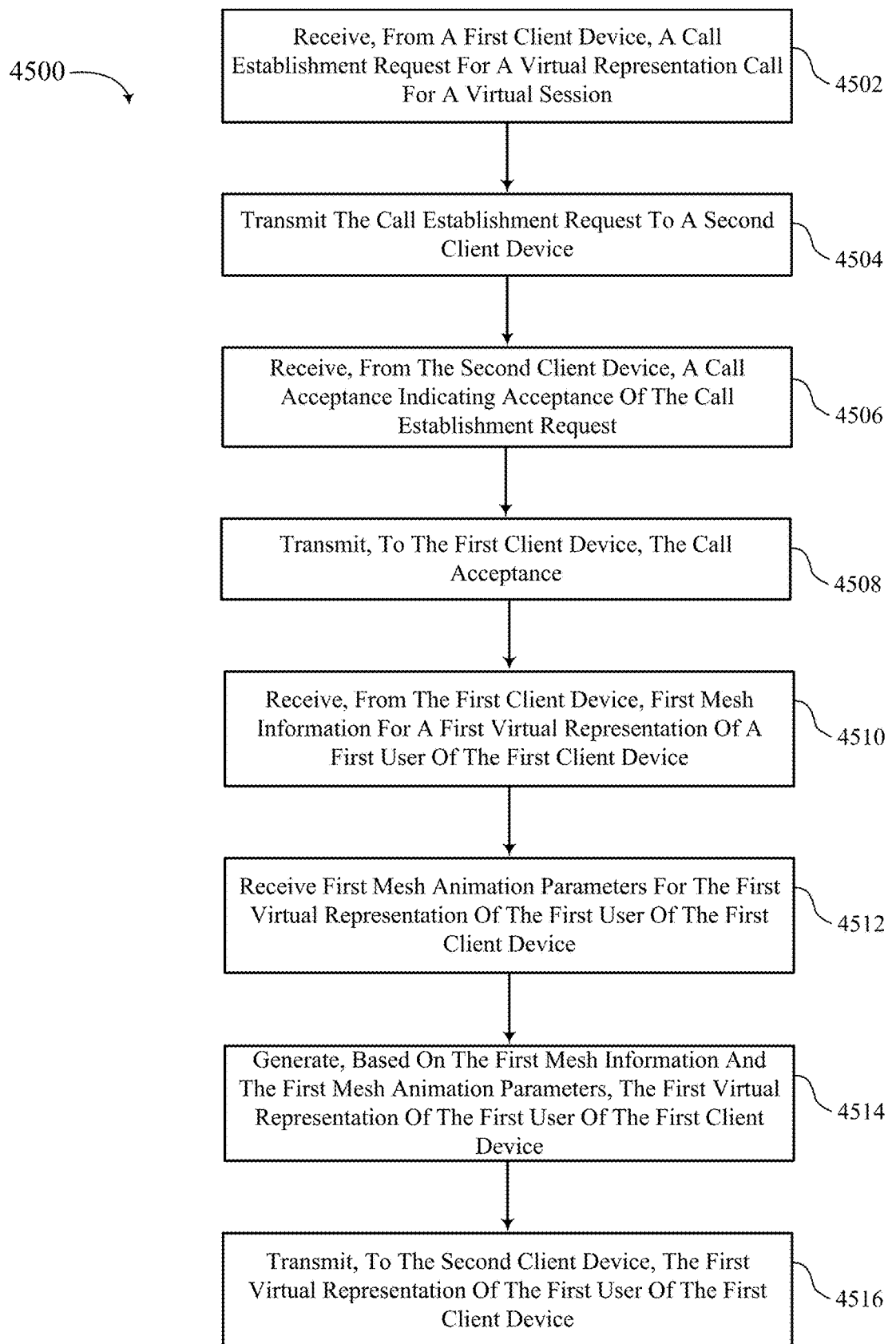

4500

Receive, From A First Client Device, A Call Establishment Request For A Virtual Representation Call For A Virtual Session — 4502

Transmit The Call Establishment Request To A Second Client Device — 4504

Receive, From The Second Client Device, A Call Acceptance Indicating Acceptance Of The Call Establishment Request — 4506

Transmit, To The First Client Device, The Call Acceptance — 4508

Receive, From The First Client Device, First Mesh Information For A First Virtual Representation Of A First User Of The First Client Device — 4510

Receive First Mesh Animation Parameters For The First Virtual Representation Of The First User Of The First Client Device — 4512

Generate, Based On The First Mesh Information And The First Mesh Animation Parameters, The First Virtual Representation Of The First User Of The First Client Device — 4514

Transmit, To The Second Client Device, The First Virtual Representation Of The First User Of The First Client Device — 4516

FIG. 45

COMMUNICATION FRAMEWORK FOR VIRTUAL REPRESENTATION CALLS

CROSS-REFERENCE TO RELATED APPLICATIONS

This application claims the benefit of U.S. Provisional Application 63/480,677, filed Jan. 19, 2023, which is hereby incorporated by reference, in its entirety and for all purposes.

TECHNICAL FIELD

The present disclosure generally relates to virtual content for virtual environments or partially virtual environments. For example, aspects of the present disclosure include systems and techniques for providing distributed generation of virtual content.

BACKGROUND

An extended reality (XR) (e.g., virtual reality, augmented reality, mixed reality) system can provide a user with a virtual experience by immersing the user in a completely virtual environment (made up of virtual content) and/or can provide the user with an augmented or mixed reality experience by combining a real-world or physical environment with a virtual environment.

One example use case for XR content that provides virtual, augmented, or mixed reality to users is to present a user with a "metaverse" experience. The metaverse is essentially a virtual universe that includes one or more three-dimensional (3D) virtual worlds. For example, a metaverse virtual environment may allow a user to virtually interact with other users (e.g., in a social setting, in a virtual meeting, etc.), to virtually shop for goods, services, property, or other item, to play computer games, and/or to experience other services.

In some cases, a user may be represented in a virtual environment (e.g., a metaverse virtual environment) as a virtual representation of the user, sometimes referred to as an avatar. In any virtual environment, it is important for a system to be able to set up a call for a virtual representation with high-quality avatars representing a person in an efficient manner.

SUMMARY

Systems and techniques are described for providing a distributed generation of virtual content for a virtual environment (e.g., a metaverse virtual environment). According to at least one example, a method is provided for generating virtual content at a first device in a distributed system. The method includes: receiving, from a second device associated with a virtual session, input information associated with at least one of the second device or a user of the second device; generating, based on the input information, a virtual representation of the user of the second device; generating a virtual scene from a perspective of a user of a third device associated with the virtual session, wherein the virtual scene includes the virtual representation of the user of the second device; and transmitting, to the third device, one or more frames depicting the virtual scene from the perspective of the user of the third device.

In another example, an apparatus for generating virtual content at a first device in a distributed system is provided that includes at least one memory and at least one processor (e.g., configured in circuitry) coupled to the at least one memory. The at least one processor is configured to: receive, from a second device associated with a virtual session, input information associated with at least one of the second device or a user of the second device; generate, based on the input information, a virtual representation of the user of the second device; generate a virtual scene from a perspective of a user of a third device associated with the virtual session, wherein the virtual scene includes the virtual representation of the user of the second device; and output, for transmission to the third device, one or more frames depicting the virtual scene from the perspective of the user of the third device.

In another example, a non-transitory computer-readable medium is provided that has stored thereon instructions that, when executed by one or more processors, cause the one or more processors to: receive, from a second device associated with a virtual session, input information associated with at least one of the second device or a user of the second device; generate, based on the input information, a virtual representation of the user of the second device; generate a virtual scene from a perspective of a user of a third device associated with the virtual session, wherein the virtual scene includes the virtual representation of the user of the second device; and output, for transmission to the third device, one or more frames depicting the virtual scene from the perspective of the user of the third device.

In another example, an apparatus for generating virtual content at a first device in a distributed system is provided. The apparatus includes: means for receiving, from a second device associated with a virtual session, input information associated with at least one of the second device or a user of the second device; means for generating, based on the input information, a virtual representation of the user of the second device; means for generating a virtual scene from a perspective of a user of a third device associated with the virtual session, wherein the virtual scene includes the virtual representation of the user of the second device; and means for transmitting, to the third device, one or more frames depicting the virtual scene from the perspective of the user of the third device.

As another example, a method is provided for establishing one or more virtual sessions between users. The method includes: transmitting, by a first device to a second device, a call establishment request for a virtual representation call for a virtual session; receiving, at the first device from the second device, a call acceptance indicating acceptance of the call establishment request; transmitting, by the first device to the second device, first mesh information for a first virtual representation of a first user of the first device; transmitting, by the first device to the second device, first mesh animation parameters for the first virtual representation of the first user of the first device; receiving, at the first device from the second device, second mesh information for a second virtual representation of a second user of the second device; receiving, at the first device from the second device, second mesh animation parameters for the second virtual representation of the second user of the second device; and generating, at the first device based on the second mesh information and the second mesh animation parameters, the second virtual representation of the second user of the second device.

In another example, a first device for establishing one or more virtual sessions between users is provided that includes at least one memory and at least one processor (e.g., configured in circuitry) coupled to the at least one memory. The at least one processor is configured to: transmit, to a second device, a call establishment request for a virtual representation call for a virtual session; receive, from the second device, a call acceptance indicating acceptance of the call establishment request; transmit, to the second device, first mesh information for a first virtual representation of a first user of the first device; transmit, to the second device, first mesh animation parameters for the first virtual representation of the first user of the first device; receive, from the second device, second mesh information for a second virtual representation of a second user of the second device; receive, from the second device, second mesh animation parameters for the second virtual representation of the second user of the second device; and generate, based on the second mesh information and the second mesh animation parameters, the second virtual representation of the second user of the second device.

In another example, a non-transitory computer-readable medium of a first device is provided that has stored thereon instructions that, when executed by one or more processors, cause the one or more processors to: transmit, to a second device, a call establishment request for a virtual representation call for a virtual session; receive, from the second device, a call acceptance indicating acceptance of the call establishment request; transmit, to the second device, first mesh information for a first virtual representation of a first user of the first device; transmit, to the second device, first mesh animation parameters for the first virtual representation of the first user of the first device; receive, from the second device, second mesh information for a second virtual representation of a second user of the second device; receive, from the second device, second mesh animation parameters for the second virtual representation of the second user of the second device; and generate, based on the second mesh information and the second mesh animation parameters, the second virtual representation of the second user of the second device.

In another example, a first device for establishing one or more virtual sessions between users is provided. The apparatus includes: means for transmitting, to a second device, a call establishment request for a virtual representation call for a virtual session; means for receiving, from the second device, a call acceptance indicating acceptance of the call establishment request; means for transmitting, to the second device, first mesh information for a first virtual representation of a first user of the first device; means for transmitting, to the second device, first mesh animation parameters for the first virtual representation of the first user of the first device; means for receiving, from the second device, second mesh information for a second virtual representation of a second user of the second device; means for receiving, from the second device, second mesh animation parameters for the second virtual representation of the second user of the second device; and means for generating, based on the second mesh information and the second mesh animation parameters, the second virtual representation of the second user of the second device.

In another example, a method is provided for establishing one or more virtual sessions between users. The method includes: receiving, by a server device from a first client device, a call establishment request for a virtual representation call for a virtual session; transmitting, by the server device, the call establishment request to a second client device; receiving, by the server device from the second client device, a call acceptance indicating acceptance of the call establishment request; transmitting, by the server device to the first client device, the call acceptance; receiving, from the first client device based on the call acceptance, first mesh information for a first virtual representation of a first user of the first client device; transmitting, by the server device, first mesh animation parameters for the first virtual representation of the first user of the first client device; generating, by the server device based on the first mesh information and the first mesh animation parameters, the first virtual representation of the first user of the first client device; and transmitting, by the server device to the second client device, the first virtual representation of the first user of the first client device.

In another example, a server device for establishing one or more virtual sessions between users is provided that includes at least one memory and at least one processor (e.g., configured in circuitry) coupled to the at least one memory. The at least one processor is configured to: receive, from a first client device, a call establishment request for a virtual representation call for a virtual session; transmit the call establishment request to a second client device; receive, from the second client device, a call acceptance indicating acceptance of the call establishment request; transmit, to the first client device, the call acceptance; receive, from the first client device based on the call acceptance, first mesh information for a first virtual representation of a first user of the first client device; transmit first mesh animation parameters for the first virtual representation of the first user of the first client device; generate, based on the first mesh information and the first mesh animation parameters, the first virtual representation of the first user of the first client device; and transmit, to the second client device, the first virtual representation of the first user of the first client device.

In another example, a non-transitory computer-readable medium of a server device is provided that has stored thereon instructions that, when executed by one or more processors, cause the one or more processors to: receive, from a first client device, a call establishment request for a virtual representation call for a virtual session; transmit the call establishment request to a second client device; receive, from the second client device, a call acceptance indicating acceptance of the call establishment request; transmit, to the first client device, the call acceptance; receive, from the first client device based on the call acceptance, first mesh information for a first virtual representation of a first user of the first client device; transmit first mesh animation parameters for the first virtual representation of the first user of the first client device; generate, based on the first mesh information and the first mesh animation parameters, the first virtual representation of the first user of the first client device; and transmit, to the second client device, the first virtual representation of the first user of the first client device.

In another example, a server device for establishing one or more virtual sessions between users is provided. The apparatus includes: means for receiving, from a first client device, a call establishment request for a virtual representation call for a virtual session; means for transmitting the call establishment request to a second client device; means for receiving, from the second client device, a call acceptance indicating acceptance of the call establishment request; means for transmitting, to the first client device, the call acceptance; means for receiving, from the first client device based on the call acceptance, first mesh information for a first virtual representation of a first user of the first client device; means for transmitting first mesh animation parameters for the first virtual representation of the first user of the first client device; means for generating, based on the first mesh information and the first mesh animation parameters, the first virtual representation of the first user of the first client device; and means for transmitting, to the second client device, the first virtual representation of the first user of the first client device.

In another example, a method for establishing one or more virtual sessions between users is provided. The method includes: transmitting, by a first device to a second device, a call establishment request for a virtual representation call for a virtual session; receiving, at the first device from the second device, a call acceptance indicating acceptance of the call establishment request; transmitting, by the first device to a third device, input information associated with at least one of the first device or a user of the first device, the input information for generating a virtual representation of a user of the second device and a virtual scene from a perspective of the user of the second device; and receiving, from the third device, information for a virtual scene.

As another example, an apparatus for establishing one or more virtual sessions between users is provided. The apparatus includes least one memory and at least one processor coupled to at least one memory having stored thereon instructions. The instructions, when executed by the at least one processor, cause the at least one processor to: transmit, by a first device to a second device, a call establishment request for a virtual representation call for a virtual session; receive, at the first device from the second device, a call acceptance indicating acceptance of the call establishment request; transmit, by the first device to a third device, input information associated with at least one of the first device or a user of the first device, the input information for generating a virtual representation of a user of the second device and a virtual scene from a perspective of the user of the second device; and receive, from the third device, information for a virtual scene.

In another example, a non-transitory computer-readable medium having stored thereon instructions is provided. The instructions, when executed by one or more processors, cause the one or more processors to transmit, by a first device to a second device, a call establishment request for a virtual representation call for a virtual session; receive, at the first device from the second device, a call acceptance indicating acceptance of the call establishment request; transmit, by the first device to a third device, input information associated with at least one of the first device or a user of the first device, the input information for generating a virtual representation of a user of the second device and a virtual scene from a perspective of the user of the second device; and receive, from the third device, information for a virtual scene.

As another example, an apparatus for establishing one or more virtual sessions between users, the method comprising: transmitting, by a first device to a second device, a call establishment request for a virtual representation call for a virtual session; receiving, at the first device from the second device, a call acceptance indicating acceptance of the call establishment request; transmitting, by the first device to a third device, input information associated with at least one of the first device or a user of the first device, the input information for generating a virtual representation of a user of the second device and a virtual scene from a perspective of the user of the second device; and receiving, from the third device, information for a virtual scene.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, any component of a cloud based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 1 is a diagram illustrating an example of an extended reality (XR) system, according to aspects of the disclosure;

FIG. 3 is a diagram illustrating an example of an XR system in which two client devices exchange information used to generate virtual representations of users and to compose a virtual scene, according to aspects of the disclosure;

FIG. 12 is a flow diagram illustrating an example of a process of generating virtual content at a device of a distributed system, according to aspects of the disclosure;

FIG. 14A is a diagram illustrating an example of a raw (non-retopologized) mesh, according to aspects of the disclosure;

FIG. 14B is a diagram illustrating an example of a retopologized mesh, according to aspects of the disclosure;

FIG. 44 is a flow diagram illustrating a process for generating virtual content in a distributed system, in accordance with aspects of the present disclosure.

FIG. 45 is a flow diagram illustrating a process for generating virtual content in a distributed system, in accordance with aspects of the present disclosure.

DETAILED DESCRIPTION

Figure 2:
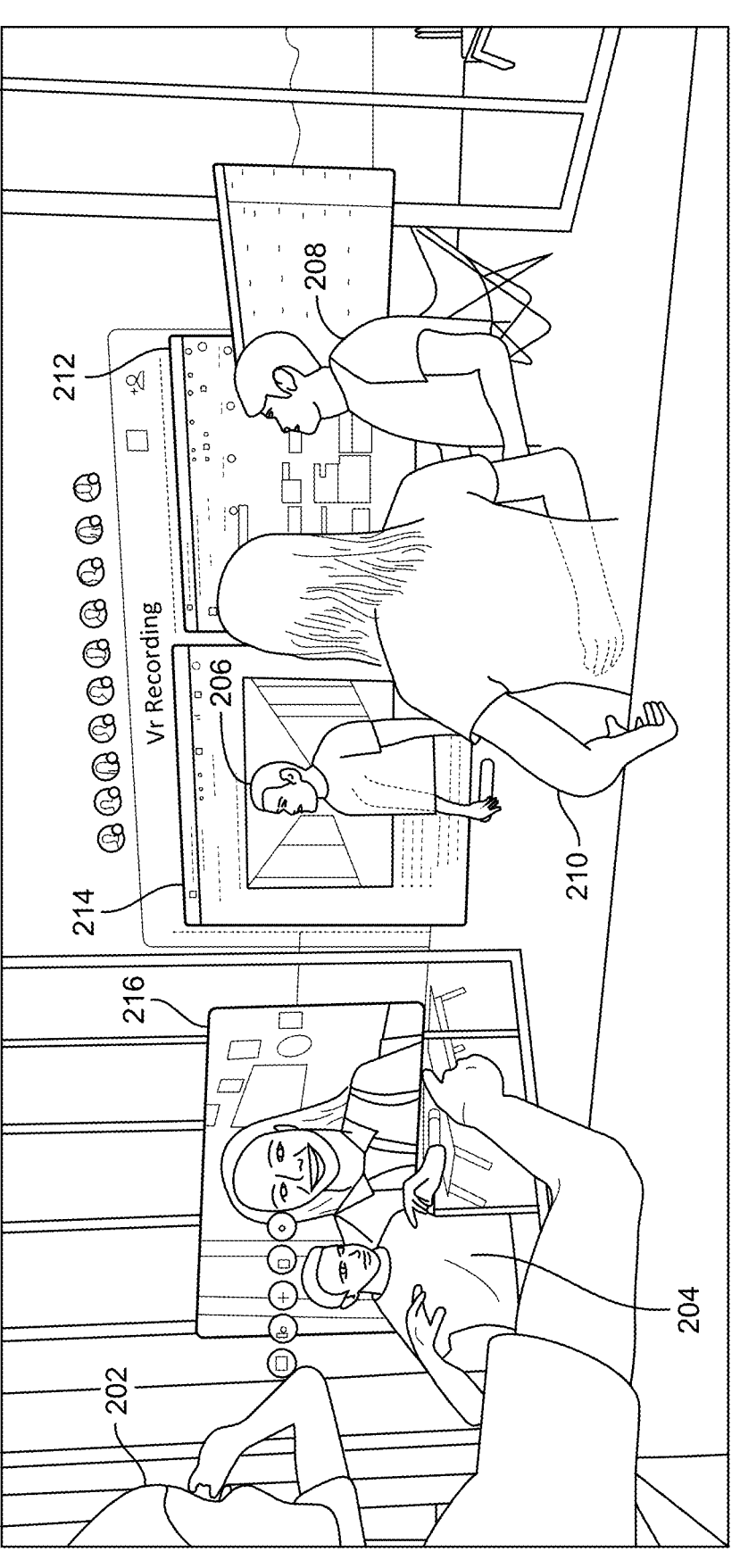
FIG. 2 is a diagram illustrating an example of a three-dimensional (3D) collaborative virtual environment, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs), smart glasses (e.g., AR glasses, MR glasses, etc.), among others.

XR systems can include virtual reality (VR) systems facilitating interactions with VR environments, augmented reality (AR) systems facilitating interactions with AR environments, mixed reality (MR) systems facilitating interactions with MR environments, and/or other XR systems. For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may participate in one or more virtual sessions with other users by virtually interacting with other users (e.g., in a social setting, in a virtual meeting, etc.), virtually shopping for items (e.g., goods, services, property, etc.), virtually playing computer games, and/or experiencing other services in a metaverse virtual environment. In one illustrative example, a virtual session provided by an XR system may include a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. A virtual representation or avatar may be generated/animated in real-time based on captured input from users devices. Avatars may range from basic synthetic 3D representations to more realistic representations of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

For instance, in the example of the 3D collaborative virtual environment from above, an XR system a user from the group of users may display virtual representations (or avatars) of the other users sitting at specific locations at a virtual table or in a virtual room. The virtual representations of the users and the background of the virtual environment should be displayed in a realistic manner (e.g., as if the users were sitting together in the real world). The heads, bodies, arms, and hands of the users can be animated as the users move in the real world. Audio may need to be spatially rendered or may be rendered monophonically. Latency in rendering and animating the virtual representations should be minimal in order to maintain a high-quality user experience.

The computational complexity of generating virtual environments by XR systems can impose significant power and resource demands, which can be a limiting factor in implementing XR experiences (e.g., reducing the ability of XR devices to efficiently generate and animate virtual content in a low-latency manner). For example, the computational complexity of rendering and animating virtual representations of users and composing a virtual scene can impose large power and resource demands on devices when implementing XR applications. Such power and resource demands are exacerbated by recent trends towards implementing such technologies in mobile and wearable devices (e.g., HMDs, XR glasses, etc.), and making such devices smaller, lighter, and more comfortable (e.g., by reducing the heat emitted by the device) to wear by the user for longer periods of time. In view of such factors, it may be difficult for an XR device (e.g., an HMD) of a user to render and animate virtual representations of other users and to compose a scene and generate a target view of a virtual environment for display to the user of the XR device.

Systems, apparatuses, electronic devices, methods (also referred to as processes), and computer-readable media (collectively referred to herein as "systems and techniques") are described herein for providing distributed generation of virtual content for a virtual environment (e.g., a metaverse virtual environment). In some aspects, an animation and scene rendering system may receive input information associated with one or more devices (e.g., at least one XR device) of respective user(s) that are participating or associated with a virtual session (e.g., a 3D collaborative virtual meeting in a metaverse environment, a computer or virtual game, or other virtual session). For instance, the input information received from a first device may include information representing a face of a first user of the first device (e.g., codes or features representing an appearance of the face or other information), information representing a body of the first user of the first device (e.g., codes or features representing an appearance of the body, a pose of the body, or other information), information representing one or more hands of the first user of the device (e.g., codes or features representing an appearance of the hand(s), a pose of the hand(s), or other information), pose information of the first device (e.g., a pose in six-degrees-of-freedom (6-DOF), referred to as a 6-DOF pose), audio associated with an environment in which the first device is located, and/or other information.

The animation and scene rendering system may process the input information to generate and/or animate a respective virtual representation for each user of each device of the one or more devices. For example, the animation and scene rendering system may process the input information from the first device to generate and/or animate a virtual representation (or avatar) for the first user of the first device. Animation of a virtual representation refers to modifying a position, movement, mannerism, or other feature of the virtual representation, such as to match a corresponding position, movement, mannerism, etc. of the corresponding user in a real-world or physical space. In some aspects, to generate and/or animate the virtual representation for the first user, the animation and scene rendering system may generate and/or animate a virtual representation of a face of the first user (referred to as a facial representation), generate and/or animate a virtual representation of a body of the first user (referred to as a body representation), and generate and/or animate a virtual representation of hair of the first user (referred to as a hair representation). In some cases, the animation and scene rendering system may combine or attach the facial representation with the body representation to generate a combined virtual representation. The animation and scene rendering system may then add the hair representation to the combined virtual representation to generate a final virtual representation of the user for one or more frames of content.

The animation and scene rendering system may then compose a virtual scene or environment for the virtual session and generate a respective target view (e.g., a frame of content, such as virtual content or a combination of real-world and virtual content) for each device from a respective perspective of each device or user in the virtual scene or environment. The composed virtual scene includes the virtual representations of the users involved in the virtual session and any virtual background of the scene. In one example, using the information received from the first device and information received from other devices of the one or more devices associated with the virtual session, the animation and scene rendering system may compose the virtual scene (including virtual representations of the users and background information) and generate a frame representing a view of the virtual scene from the perspective of a second user (representing a view of the second user in the real or physical world) of a second device of the one or more devices associated with the virtual session. In some aspects, the view of the virtual scene can be generated from the perspective of the second user based on a pose of the first device (corresponding to a pose of the first user) and poses of any other users/devices and also based on a pose of the second device (corresponding to a pose of the second user). For instance, the view of the virtual scene can be generated from the perspective of the second user based on a relative difference between the pose of the second device and each respective pose of the first device and the other devices.

In some cases, when composing the virtual scene, the animation and scene rendering system may perform relighting of each respective virtual representation of the one or more users. For example, the animation and scene rendering system can determine lighting in the virtual scene or in the real-world environment in which the first user is located. The animation and scene rendering system can modify lighting of the virtual representation of the first user to account for the determined lighting, so that the virtual representation of the first user appears as realistic as possible when viewed by other users in the virtual scene.

The animation and scene rendering system can transmit the frame (e.g., after encoding or compressing the frame) to the second device. The second device can display the frame (e.g., after decoding or decompressing the frame) so that the second user can view the virtual scene from the second user's perspective.

In some cases, one or more meshes (e.g., including a plurality of vertices, edges, and/or faces in three-dimensional space) with corresponding materials may be used to represent an avatar. The materials may include a normal texture, a diffuse or albedo texture, a specular reflection texture, any combination thereof, and/or other materials or textures. The various materials or textures may need to be available from enrollment or offline reconstruction.

A goal of generating a virtual representation or avatar for a user is to generate a mesh with the various materials (e.g., normal, albedo, specular reflection, etc.) representing the user. In some cases, a mesh must be of a known topology. However, meshes from scanners (e.g., LightCage, 3DMD, etc.) may not satisfy such a constraint. To solve such an issue, a mesh can be retopologized after scanning, which would make the mesh parametrized. As a result, a mesh for an avatar may be associated with a number of animation parameters that define how the avatar will be animated during a virtual session. In some aspects, the animation parameters can include encoded parameters (e.g., codes or features) from a neural network, some or all of which can be used to generate the animated avatar. In some cases, the animation parameters can include facial part codes or features, codes or features representing face blend shapes, codes or features representing hand joints, codes or features representing body joints, codes or features representing head pose, an audio stream (or an encoded representation of the audio stream), any combination thereof, and/or other parameters.

To transmit data for an avatar mesh between devices for an interactive virtual experience between users, parameters for animating the mesh may require large data transmission rates. For instance, the parameters may need to be transmitted from one device of a first user to a second device of a second user for every frame at a frame rate of 30-60 frames per second (FPS) so that the second device can animate the avatar at the frame rate. There is a need to be able to set up a call for a virtual representation or avatar in an efficient manner.

In some aspects, systems and techniques are described herein for providing an efficient communication framework for virtual representation calls for a virtual environment (e.g., a metaverse virtual environment). In some aspects, a flow for setting up an avatar call can be performed directly between user devices or can be performed via a server. To set up the call, a first device of a first user can transmit (e.g., directly or via the server), for receipt by a second device of a second user, mesh information defining a virtual representation or avatar for the first user for use in participating in a virtual session (e.g., a 3D collaborative virtual meeting in a metaverse environment, a computer or virtual game, or other virtual session) between the first and second users (and in some cases one or more other users). The mesh information can include information defining the mesh (e.g., including vertices, edges, and/or faces of the mesh) and information defining texture and/or materials of the mesh (e.g., a normal map defining the normal texture for the mesh, an albedo map defining the diffuse or albedo texture for the mesh, a specular reflection map defining the specular reflection texture for the mesh, any combination thereof, and/or other materials or textures). The second device can also transmit (e.g., directly or via the server), for receipt by the first device of the first user, mesh information defining a virtual representation or avatar for the second user. In some cases, the mesh information may only be needed to be transmitted one time at the start of the call, after which only mesh animation parameters are exchanged, as discussed below. In some aspects, the mesh information can be compressed.

Once the call is established between the first and second devices, the first and second devices can exchange (e.g., directly or via the server) mesh animation parameters during the call so that the respective devices can animate the virtual representations during the virtual session. The mesh animation parameters can include information representing a face of the first user of the first device (e.g., codes or features representing an appearance of the face or other information), information representing a body of the first user of the first device (e.g., codes or features representing an appearance of the body, a pose of the body, or other information), information representing one or more hands of the first user of the first device (e.g., codes or features representing an appearance of the hand(s), a pose of the hand(s), or other information), pose information of the first device (e.g., a pose in six-degrees-of-freedom (6-DOF), referred to as a 6-DOF pose), audio associated with an environment in which the first device is located, and/or other information. For instance, an animation and scene rendering system of the device of the second user participating in the virtual session can process the mesh information and the animation parameters from the first device to generate and/or animate the virtual representation or avatar for the first user of the first device during the virtual session. In some aspects, the mesh animation parameters can be compressed.

By using such a call flow and transmitting codes or features representing animation of the virtual representations (or avatars) of the users during the call, the transmission data rate needed for providing the information needed to animate the virtual representations is greatly reduced. In some aspects, the mesh information and/or the mesh animation parameters can be compressed, which can further reduce the transmission data rates.

Other examples include flows such as device-to-device flows with no edge server and a decoder on a target or receiving client device (e.g., for view-dependent textures and view-independent textures), device-to-device flows with no edge server and all processing (e.g., decoding, avatar animation, etc.) on the source or transmitting/sending client device (e.g., for view-dependent textures and view-independent textures), device-to-device flows with an edge server and a decoder on a server device such as the edge server or a cloud server (e.g., for view-dependent textures and view-independent textures), and device-to-device flows with an edge server and all processing (e.g., decoding, avatar animation, etc.) on the source or transmitting/sending client device (e.g., for view-dependent textures and view-independent textures).

Such solutions can provide a photo-realistic framework for virtual representations (e.g., avatars) of users in a virtual environment (e.g., for the Metaverse), as discussed herein.

Various aspects of the application will be described with respect to the figures.

FIG. 1 illustrates an example of an extended reality system 100. As shown, the extended reality system 100 includes a device 105, a network 120, and a communication link 125. In some cases, the device 105 may be an extended reality (XR) device, which may generally implement aspects of extended reality, including virtual reality (VR), augmented reality (AR), mixed reality (MR), etc. Systems including a device 105, a network 120, or other elements in extended reality system 100 may be referred to as extended reality systems.

The device 105 may overlay virtual objects with real-world objects in a view 130. For example, the view 130 may generally refer to visual input to a user 110 via the device 105, a display generated by the device 105, a configuration of virtual objects generated by the device 105, etc. For example, view 130-A may refer to visible real-world objects (also referred to as physical objects) and visible virtual objects, overlaid on or coexisting with the real-world objects, at some initial time. View 130-B may refer to visible real-world objects and visible virtual objects, overlaid on or coexisting with the real-world objects, at some later time. As discussed herein, positional differences in real-world objects (e.g., and thus overlaid virtual objects) may arise from view 130-A shifting to view 130-B at 135 due to head motion 115. In another example, view 130-A may refer to a completely virtual environment or scene at the initial time and view 130-B may refer to the virtual environment or scene at the later time.

Generally, device 105 may generate, display, project, etc. virtual objects and/or a virtual environment to be viewed by a user 110 (e.g., where virtual objects and/or a portion of the virtual environment may be displayed based on user 110 head pose prediction in accordance with the techniques described herein). In some examples, the device 105 may include a transparent surface (e.g., optical glass) such that virtual objects may be displayed on the transparent surface to overlay virtual objects on real word objects viewed through the transparent surface. Additionally or alternatively, the device 105 may project virtual objects onto the real-world environment. In some cases, the device 105 may include a camera and may display both real-world objects (e.g., as frames or images captured by the camera) and virtual objects overlaid on displayed real-world objects. In various examples, device 105 may include aspects of a virtual reality headset, smart glasses, a live feed video camera, a GPU, one or more sensors (e.g., such as one or more IMUs, image sensors, microphones, etc.), one or more output devices (e.g., such as speakers, display, smart glass, etc.), etc.

In some cases, head motion 115 may include user 110 head rotations, translational head movement, etc. The device 105 may update the view 130 of the user 110 according to the head motion 115. For example, the device 105 may display view 130-A for the user 110 before the head motion 115. In some cases, after the head motion 115, the device 105 may display view 130-B to the user 110. The extended reality system (e.g., device 105) may render or update the virtual objects and/or other portions of the virtual environment for display as the view 130-A shifts to view 130-B.

In some cases, the extended reality system 100 may provide various types of virtual experiences, such as a three-dimensional (3D) collaborative virtual environment for a group of users (e.g., including the user 110). FIG. 2 is a diagram illustrating an example of a 3D collaborative virtual environment 200 in which various users interact with one another in a virtual session via virtual representations (or avatars) of the users in the virtual environment 200. The virtual representations include including a virtual representation 202 of a first user, a virtual representation 204 of a second user, a virtual representation 206 of a third user, a virtual representation 208 of a fourth user, and a virtual representation 210 of a fifth user. Other background information of the virtual environment 200 is also shown, including a virtual calendar 212, a virtual web page 214, and a virtual video conference interface 216. The users may visually, audibly, haptically, or otherwise experience the virtual environment from each user's perspective while interacting with the virtual representations of the other users. For example, the virtual environment 200 is shown from the perspective of the first user (represented by the virtual representation 202).

It is important for an XR system to efficiently generate high-quality virtual representations (or avatars) with low-latency. It can also be important for the XR system to render audio in an effective manner to enhance the XR experience. For instance, in the example of the 3D collaborative virtual environment 200 of FIG. 2, an XR system of the first user (e.g., the XR system 100) displays the virtual representations 204-210 of the other users participating in the virtual session. The virtual representations 204-210 of the users and the background of the virtual environment 200 should be displayed in a realistic manner (e.g., as if the users were meeting in a real-world environment), such as by animating the heads, bodies, arms, and hands of the other users' virtual representations 204-210 as the users move in the real world. Audio captured by XR systems of the other users may need to be spatially rendered or may be rendered monophonically for output to the XR system of the first user. Latency in rendering and animating the virtual representations 204-210 should be minimal so that user experience of the first user is as if the user is interacting with the other uses in the real-world environment.

Extended reality systems typically involve the XR devices (e.g., an HMD, smart glasses such as AR glasses, etc.) rendering and animating virtual representations of users and composing a virtual scene. FIG. 3 is a diagram illustrating an example of an extended reality system 300 in which two client devices (client device 302 and client device 304) exchange information used to generate (e.g., render and/or animate) virtual representations of users and compose a virtual scene including the virtual representations of the users (e.g., the virtual environment 200). For example, the client device 302 may transmit pose information to the client device 304. The client device 304 can use the pose information to generate a rendering of a virtual representation of a user of the client device 302 from the perspective of the client device 304.

However, the computational complexity of generating virtual environments can introduce significant power and resource demands on the client devices 302, 304, leading to excessing power and resource demands on the client devices when implementing XR applications. Such complexity can limit an ability of a client device to generate an XR experience in a high-quality and low-latency manner. These power and resource demands are intensified due to XR technologies typically being implemented in mobile and wearable devices (e.g., HMDs. XR glasses, etc.), which are being manufactured with smaller, lighter, and more comfortable (e.g., by reducing the heat emitted by the device) form factors, with the idea that a user may wear an XR device for long periods of time. In view of such issues, it may be difficult for an XR system 300 such as that shown in FIG. 3 to provide a quality XR experience.

Figure 4:
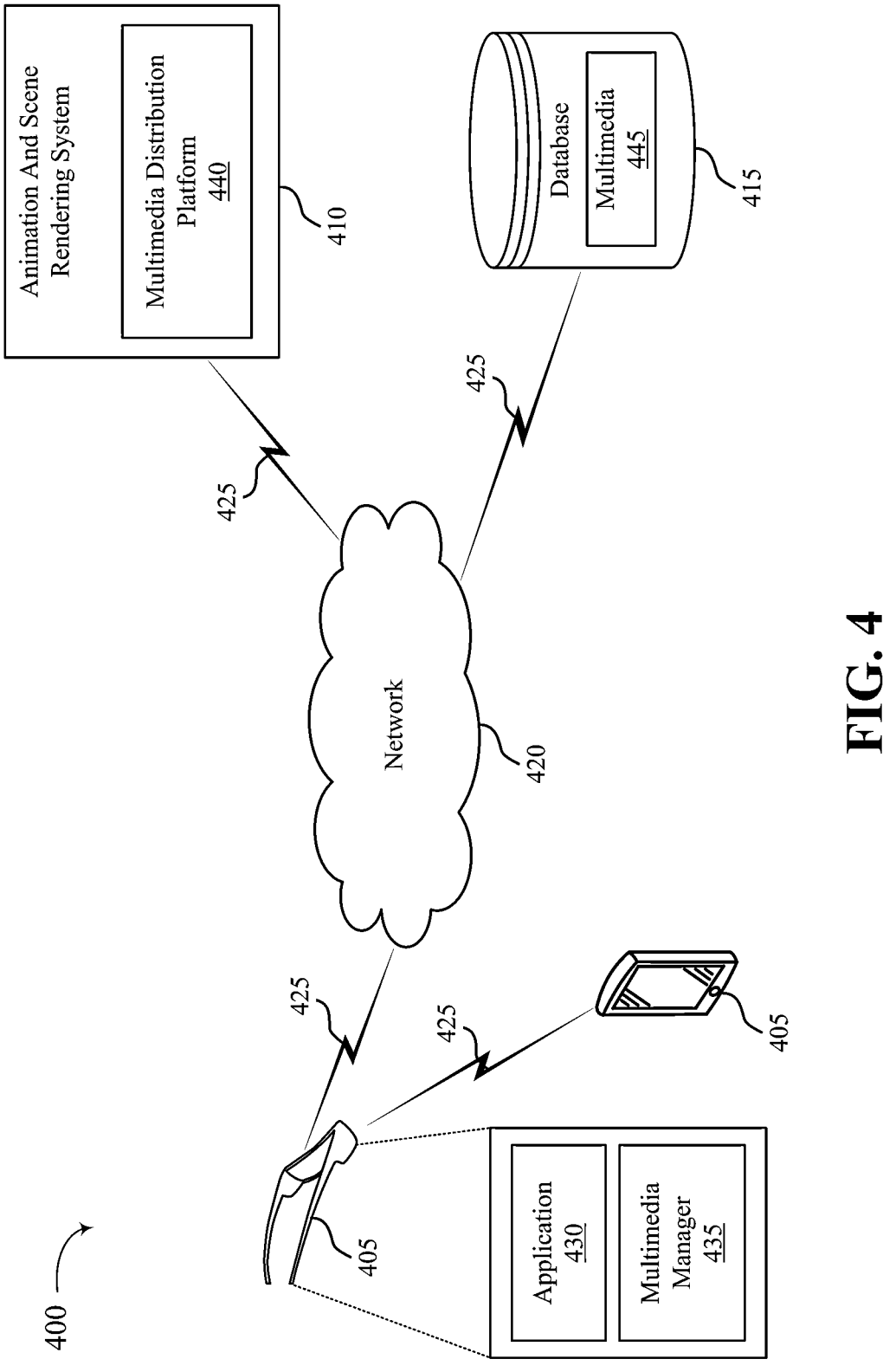
FIG. 4 is a diagram illustrating another example of an XR system, according to aspects of the disclosure.

As noted previously, systems and techniques are described herein for providing distributed generation of virtual content for a virtual environment or scene (e.g., a metaverse virtual environment). FIG. 4 is a diagram illustrating an example of a system 400 in accordance with aspects of the present disclosure. As shown, the system 400 includes client devices 405, an animation and scene rendering system 410, and storage 415. Although the system 400 illustrates two devices 405, a single animation and scene rendering system 410, a single storage 415, and a single network 420, the present disclosure applies to any system architecture having one or more devices 405, animation and scene rendering systems 410, storage devices 415, and networks 420. In some cases, the storage 415 may be part of the animation and scene rendering system 410. The devices 405, the animation and scene rendering system 410, and the storage 415 may communicate with each other and exchange information that supports generation of virtual content for XR, such as multimedia packets, multimedia data, multimedia control information, pose prediction parameters, via network 420 using communications links 425. In some cases, a portion of the techniques described herein for providing distributed generation of virtual content may be performed by one or more of the devices 405 and a portion of the techniques may be performed by the animation and scene rendering system 410, or both.

A device 405 may be an XR device (e.g., a head-mounted display (HMD), XR glasses such as virtual reality (VR) glasses, augmented reality (AR) glasses, etc.), a mobile device (e.g., a cellular phone, a smartphone, a personal digital assistant (PDA), etc.), a wireless communication device, a tablet computer, a laptop computer, and/or other device that supports various types of communication and functional features related to multimedia (e.g., transmitting, receiving, broadcasting, streaming, sinking, capturing, storing, and recording multimedia data). A device 405 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 405 may also be able to communicate directly with another device (e.g., using a peer-to-peer (P2P) or device-to-device (D2D) protocol, such as using sidelink communications). For example, a device 405 may be able to receive from or transmit to another device 405 variety of information, such as instructions or commands (e.g., multimedia-related information).

The devices 405 may include an application 430 and a multimedia manager 435. While the system 400 illustrates the devices 405 including both the application 430 and the multimedia manager 435, the application 430 and the multimedia manager 435 may be an optional feature for the devices 405. In some cases, the application 430 may be a multimedia-based application that can receive (e.g., download, stream, broadcast) from the animation and scene rendering systems 410, storage 415 or another device 405, or transmit (e.g., upload) multimedia data to the animation and scene rendering systems 410, the storage 415, or to another device 405 via using communications links 425.

The multimedia manager 435 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 435 may process multimedia (e.g., image data, video data, audio data) from and/or write multimedia data to a local memory of the device 405 or to the storage 415.

The multimedia manager 435 may also be configured to provide multimedia enhancements, multimedia restoration, multimedia analysis, multimedia compression, multimedia streaming, and multimedia synthesis, among other functionality. For example, the multimedia manager 435 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 435 may process multimedia data to support server-based pose prediction for XR, according to the techniques described herein.

The animation and scene rendering system 410 may be a server device, such as a data server, a cloud server, a server associated with a multimedia subscription provider, proxy server, web server, application server, communications server, home server, mobile server, edge or cloud-based server, a personal computer acting as a server device, a mobile device such as a mobile phone acting as a server device, an XR device acting as a server device, a network router, any combination thereof, or other server device. The animation and scene rendering system 410 may in some cases include a multimedia distribution platform 440. In some cases, the multimedia distribution platform 440 may be a separate device or system from the animation and scene rendering system 410. The multimedia distribution platform 440 may allow the devices 405 to discover, browse, share, and download multimedia via network 420 using communications links 425, and therefore provide a digital distribution of the multimedia from the multimedia distribution platform 440. As such, a digital distribution may be a form of delivering media content such as audio, video, images, without the use of physical media but over online delivery mediums, such as the Internet. For example, the devices 405 may upload or download multimedia-related applications for streaming, downloading, uploading, processing, enhancing, etc. multimedia (e.g., images, audio, video). The animation and scene rendering system 410 or the multimedia distribution platform 440 may also transmit to the devices 405 a variety of information, such as instructions or commands (e.g., multimedia-related information) to download multimedia-related applications on the device 405.

The storage 415 may store a variety of information, such as instructions or commands (e.g., multimedia-related information). For example, the storage 415 may store multimedia 445, information from devices 405 (e.g., pose information, representation information for virtual representations or avatars of users, such as codes or features related to facial representations, body representations, hand representations, etc., and/or other information). A device 405 and/or the animation and scene rendering system 410 may retrieve the stored data from the storage 415 and/or more send data to the storage 415 via the network 420 using communication links 425. In some examples, the storage 415 may be a memory device (e.g., read only memory (ROM), random access memory (RAM), cache memory, buffer memory, etc.), a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 420 may provide encryption, access authorization, tracking, Internet Protocol (IP) connectivity, and other access, computation, modification, and/or functions. Examples of network 420 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 420 may include the Internet.

The communications links 425 shown in the system 400 may include uplink transmissions from the device 405 to the animation and scene rendering systems 410 and the storage 415, and/or downlink transmissions, from the animation and scene rendering systems 410 and the storage 415 to the device 405. The wireless links 425 may transmit bidirectional communications and/or unidirectional communications. In some examples, the communication links 425 may be a wired connection or a wireless connection, or both. For example, the communications links 425 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

In some aspects, a user of the device 405 (referred to as a first user) may be participating in a virtual session with one or more other users (including a second user of an additional device). In such examples, the animation and scene rendering systems 410 may process information received from the device 405 (e.g., received directly from the device 405, received from storage 415, etc.) to generate and/or animate a virtual representation (or avatar) for the first user. The animation and scene rendering systems 410 may compose a virtual scene that includes the virtual representation of the user and in some cases background virtual information from a perspective of the second user of the additional device. The animation and scene rendering systems 410 may transmit (e.g., via network 120) a frame of the virtual scene to the additional device. Further details regarding such aspects are provided below.

Figure 5:
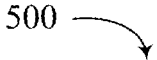
FIG. 5 is a diagram illustrating an example configuration of a client device, according to aspects of the disclosure.

FIG. 5 is a diagram illustrating an example of a device 500. The device 500 can be implemented as a client device (e.g., device 405 of FIG. 4) or as an animation and scene rendering system (e.g., the animation and scene rendering system 410). As shown, the device 500 includes a central processing unit (CPU) 510 having CPU memory 515, a GPU 525 having GPU memory 530, a display 545, a display buffer 535 storing data associated with rendering, a user interface unit 505, and a system memory 540. For example, system memory 540 may store a GPU driver 520 (illustrated as being contained within CPU 510 as described below) having a compiler, a GPU program, a locally-compiled GPU program, and the like. User interface unit 505, CPU 510, GPU 525, system memory 540, display 545, and extended reality manager 550 may communicate with each other (e.g., using a system bus).

Examples of CPU 510 include, but are not limited to, a digital signal processor (DSP), general purpose microprocessor, application specific integrated circuit (ASIC), field programmable logic array (FPGA), or other equivalent integrated or discrete logic circuitry. Although CPU 510 and GPU 525 are illustrated as separate units in the example of FIG. 5, in some examples, CPU 510 and GPU 525 may be integrated into a single unit. CPU 510 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 545. As illustrated, CPU 510 may include CPU memory 515. For example, CPU memory 515 may represent on-chip storage or memory used in executing machine or object code. CPU memory 515 may include one or more volatile or non-volatile memories or storage devices, such as flash memory, a magnetic data media, an optical storage media, etc. CPU 510 may be able to read values from or write values to CPU memory 515 more quickly than reading values from or writing values to system memory 540, which may be accessed, e.g., over a system bus.

GPU 525 may represent one or more dedicated processors for performing graphical operations. For example, GPU 525 may be a dedicated hardware unit having fixed function and programmable components for rendering graphics and executing GPU applications. GPU 525 may also include a DSP, a general purpose microprocessor, an ASIC, an FPGA, or other equivalent integrated or discrete logic circuitry. GPU 525 may be built with a highly-parallel structure that provides more efficient processing of complex graphic-related operations than CPU 510. For example, GPU 525 may include a plurality of processing elements that are configured to operate on multiple vertices or pixels in a parallel manner. The highly parallel nature of GPU 525 may allow GPU 525 to generate graphic images (e.g., graphical user interfaces and two-dimensional or three-dimensional graphics scenes) for display 545 more quickly than CPU 510.

GPU 525 may, in some instances, be integrated into a motherboard of device 500. In other instances, GPU 525 may be present on a graphics card or other device or component that is installed in a port in the motherboard of device 500 or may be otherwise incorporated within a peripheral device configured to interoperate with device 500. As illustrated, GPU 525 may include GPU memory 530. For example, GPU memory 530 may represent on-chip storage or memory used in executing machine or object code. GPU memory 530 may include one or more volatile or non-volatile memories or storage devices, such as flash memory, a magnetic data media, an optical storage media, etc. GPU 525 may be able to read values from or write values to GPU memory 530 more quickly than reading values from or writing values to system memory 540, which may be accessed, e.g., over a system bus. That is, GPU 525 may read data from and write data to GPU memory 530 without using the system bus to access off-chip memory. This operation may allow GPU 525 to operate in a more efficient manner by reducing the need for GPU 525 to read and write data via the system bus, which may experience heavy bus traffic.

Display 545 represents a unit capable of displaying video, images, text or any other type of data for consumption by a viewer. In some cases, such as when the device 500 is implemented as an animation and scene rendering system, the device 500 may not include the display 545. The display 545 may include a liquid-crystal display (LCD), a light emitting diode (LED) display, an organic LED (OLED), an active-matrix OLED (AMOLED), or the like.

Display buffer 535 represents a memory or storage device dedicated to storing data for presentation of imagery, such as computer-generated graphics, still images, video frames, or the like for display 545. Display buffer 535 may represent a two-dimensional buffer that includes a plurality of storage locations. The number of storage locations within display buffer 535 may, in some cases, generally correspond to the number of pixels to be displayed on display 545. For example, if display 545 is configured to include 640×480 pixels, display buffer 535 may include 640×480 storage locations storing pixel color and intensity information, such as red, green, and blue pixel values, or other color values. Display buffer 535 may store the final pixel values for each of the pixels processed by GPU 525. Display 545 may retrieve the final pixel values from display buffer 535 and display the final image based on the pixel values stored in display buffer 535.

User interface unit 505 represents a unit with which a user may interact with or otherwise interface to communicate with other units of device 500, such as CPU 510. Examples of user interface unit 505 include, but are not limited to, a trackball, a mouse, a keyboard, and other types of input devices. User interface unit 505 may also be, or include, a touch screen and the touch screen may be incorporated as part of display 545.

System memory 540 may include one or more computer-readable storage media. Examples of system memory 540 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 540 may store program modules and/or instructions that are accessible for execution by CPU 510. Additionally, system memory 540 may store user applications and application surface data associated with the applications. System memory 540 may in some cases store information for use by and/or information generated by other components of device 500. For example, system memory 540 may act as a device memory for GPU 525 and may store data to be operated on by GPU 555 as well as data resulting from operations performed by GPU 525

In some examples, system memory 540 may include instructions that cause CPU 510 or GPU 525 to perform the functions ascribed to CPU 510 or GPU 525 in aspects of the present disclosure. System memory 540 may, in some examples, be considered as a non-transitory storage medium. The term "non-transitory" should not be interpreted to mean that system memory 540 is non-movable. As one example, system memory 540 may be removed from device 500 and moved to another device. As another example, a system memory substantially similar to system memory 540 may be inserted into device 500. In certain examples, a non-transitory storage medium may store data that can, over time, change (e.g., in RAM).

System memory 540 may store a GPU driver 520 and compiler, a GPU program, and a locally-compiled GPU program. The GPU driver 520 may represent a computer program or executable code that provides an interface to access GPU 525. CPU 510 may execute the GPU driver 520 or portions thereof to interface with GPU 525 and, for this reason, GPU driver 520 is shown in the example of FIG. 5 within CPU 510. GPU driver 520 may be accessible to programs or other executables executed by CPU 510, including the GPU program stored in system memory 540. Thus, when one of the software applications executing on CPU 510 requires graphics processing, CPU 510 may provide graphics commands and graphics data to GPU 525 for rendering to display 545 (e.g., via GPU driver 520).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 525 to execute commands without user knowledge as to the specifics of the hardware components. In order to process the graphics rendering instructions, CPU 510 may issue one or more rendering commands to GPU 525 (e.g., through GPU driver 520) to cause GPU 525 to perform some or all of the rendering of the graphics data. In some examples, the graphics data to be rendered may include a list of graphics primitives (e.g., points, lines, triangles, quadrilaterals, etc.).

The GPU program stored in system memory 540 may invoke or otherwise include one or more functions provided by GPU driver 520. CPU 510 generally executes the program in which the GPU program is embedded and, upon encountering the GPU program, passes the GPU program to GPU driver 520. CPU 510 executes GPU driver 520 in this context to process the GPU program. That is, for example, GPU driver 520 may process the GPU program by compiling the GPU program into object or machine code executable by GPU 525. This object code may be referred to as a locally-compiled GPU program. In some examples, a compiler associated with GPU driver 520 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 510 and GPU 525).

In the example of FIG. 5, the compiler may receive the GPU program from CPU 510 when executing HL code that includes the GPU program. That is, a software application being executed by CPU 510 may invoke GPU driver 520 (e.g., via a graphics API) to issue one or more commands to GPU 525 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 525 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 520 may formulate one or more commands that specify one or more operations for GPU 525 to perform in order to render the primitive. When GPU 525 receives a command from CPU 510, it may decode the command and configure one or more processing elements to perform the specified operation and may output the rendered data to display buffer 535.

GPU 525 may receive the locally-compiled GPU program, and then, in some instances, GPU 525 renders one or more images and outputs the rendered images to display buffer 535. For example, GPU 525 may generate a number of primitives to be displayed at display 545. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like.

Generally, the term "primitive" refers to any basic geometric shape or element capable of being rendered by GPU 525 for display as an image (or frame in the context of video data) via display 545. GPU 525 may transform primitives and other attributes (e.g., that define a color, texture, lighting, camera configuration, or other aspect) of the primitives into a so-called "world space" by applying one or more model transforms (which may also be specified in the state data). Once transformed, GPU 525 may apply a view transform for the active camera (which again may also be specified in the state data defining the camera) to transform the coordinates of the primitives and lights into the camera or eye space. GPU 525 may also perform vertex shading to render the appearance of the primitives in view of any active lights. GPU 525 may perform vertex shading in one or more of the above model, world, or view space.

Once the primitives are shaded, GPU 525 may perform projections to project the image into a canonical view volume. After transforming the model from the eye space to the canonical view volume, GPU 525 may perform clipping to remove any primitives that do not at least partially reside within the canonical view volume. For example, GPU 525 may remove any primitives that are not within the frame of the camera. GPU 525 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, GPU 525 may then rasterize the primitives. Generally, rasterization may refer to the task of taking an image described in a vector graphics format and converting it to a raster image (e.g., a pixelated image) for output on a video display or for storage in a bitmap file format.

A GPU 525 may include a dedicated fast bin buffer (e.g., a fast memory buffer, such as GMEM, which may be referred to by GPU memory 530). As discussed herein, a rendering surface may be divided into bins. In some cases, the bin size is determined by format (e.g., pixel color and depth information) and render target resolution divided by the total amount of GMEM. The number of bins may vary based on device 500 hardware, target resolution size, and target display format. A rendering pass may draw (e.g., render, write, etc.) pixels into GMEM (e.g., with a high bandwidth that matches the capabilities of the GPU). The GPU 525 may then resolve the GMEM (e.g., burst write blended pixel values from the GMEM, as a single layer, to a display buffer 535 or a frame buffer in system memory 540). Such may be referred to as bin-based or tile-based rendering. When all bins are complete, the driver may swap buffers and start the binning process again for a next frame.

For example, GPU 525 may implement a tile-based architecture that renders an image or rendering target by breaking the image into multiple portions, referred to as tiles or bins. The bins may be sized based on the size of GPU memory 530 (e.g., which may alternatively be referred to herein as GMEM or a cache), the resolution of display 545, the color or Z precision of the render target, etc. When implementing tile-based rendering, GPU 525 may perform a binning pass and one or more rendering passes. For example, with respect to the binning pass, GPU 525 may process an entire image and sort rasterized primitives into bins.

The device 500 may use sensor data, sensor statistics, or other data from one or more sensors. Some examples of the monitored sensors may include IMUs, eye trackers, tremor sensors, heart rate sensors, etc. In some cases, an IMU may be included in the device 500, and may measure and report a body's specific force, angular rate, and sometimes the orientation of the body, using some combination of accelerometers, gyroscopes, or magnetometers.

As shown, device 500 may include an extended reality manager 550. The extended reality manager 550 may implement aspects of extended reality, augmented reality, virtual reality, etc. In some cases, such as when the device 500 is implemented as a client device (e.g., device 405 of FIG. 4), the extended reality manager 550 may determine information associated with a user of the device and/or a physical environment in which the device 500 is located, such as facial information, body information, hand information, device pose information, audio information, etc. The device 500 may transmit the information to an animation and scene rendering system (e.g., animation and scene rendering system 410). In some cases, such as when the device 500 is implemented as an animation and scene rendering system (e.g., the animation and scene rendering system 410 of FIG. 4), the extended reality manager 550 may process the information provided by a client device as input information to generate and/or animate a virtual representation for a user of the client device.

Figure 6:
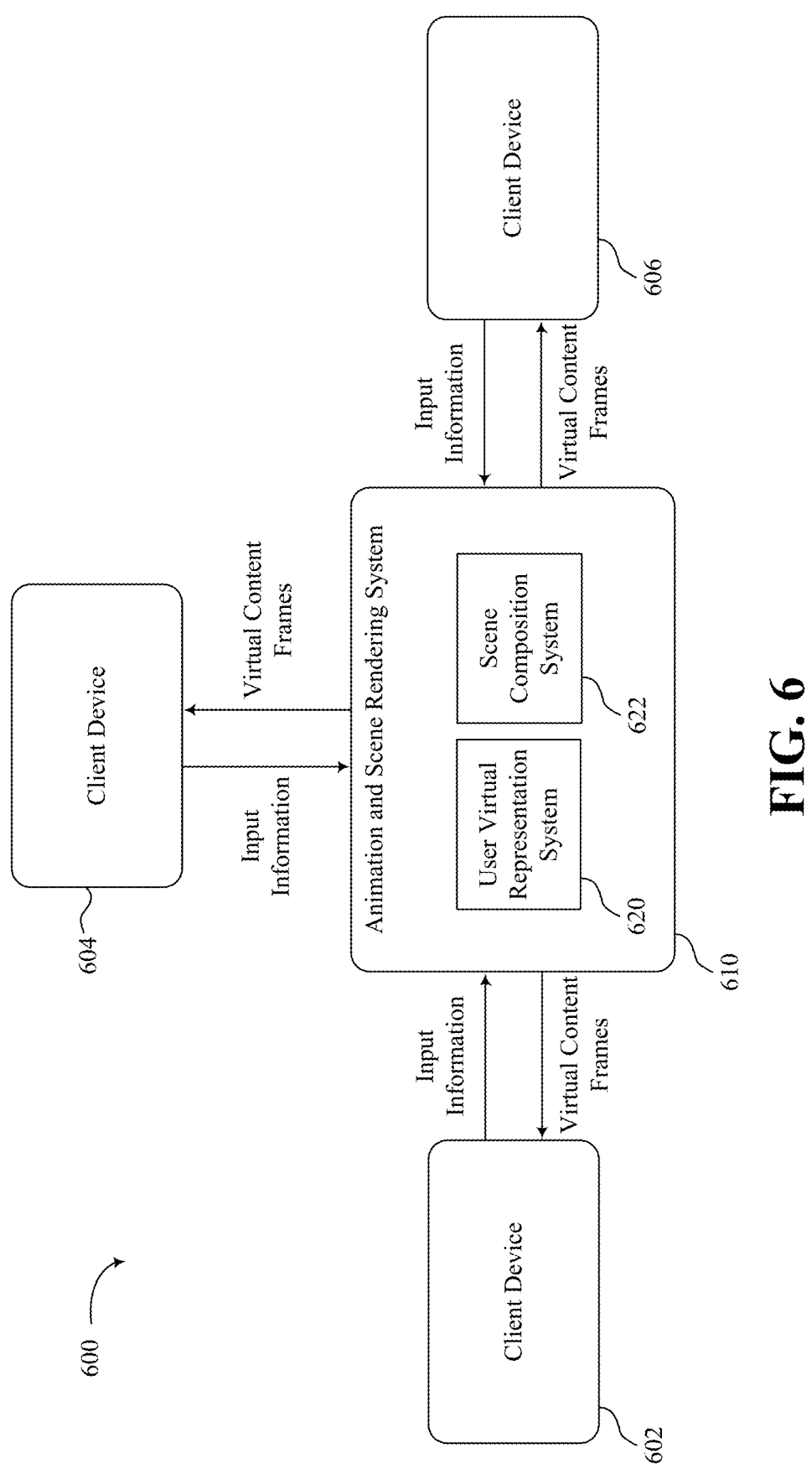
FIG. 6 is a diagram illustrating an example of an XR system including an animation and scene rendering system in communication with client devices, according to aspects of the disclosure.

FIG. 6 is a diagram illustrating another example of an XR system 600 that includes a client device 602, a client device 604, and a client device 606 in communication with an animation and scene rendering system 610. As shown, each of the client devices 602, 604, and 606 provides input information to the animation and scene rendering system 610. In some examples, the input information from the client device 602 may include information representing a face (e.g., codes or features representing an appearance of the face or other information) of a user of the client device 602, information representing a body (e.g., codes or features representing an appearance of the body, a pose of the body, or other information) of the user of the client device 602, information representing one or more hands (e.g., codes or features representing an appearance of the hand(s), a pose of the hand(s), or other information) of the user of the client device 602, pose information (e.g., a pose in six-degrees-of-freedom (6-DOF), referred to as a 6-DOF pose) of the client device 602, audio associated with an environment in which the client device 602 is located, any combination thereof, and/or other information. Similar information can be provided from the client device 604 and the client device 606.

The user virtual representation system 620 of the animation and scene rendering system 610 may process the information (e.g., a facial representation, body representation, pose information, etc.) provided from each of the client devices 602, 604, 606 and can generate and/or animate a virtual representation (or avatar) for each respective user of the client devices 602, 604, 606. As used herein, animation of a virtual representation (or avatar) of a user refers to modifying a position, movement, mannerism, or other feature of the virtual representation so that the animation matches a corresponding position, movement, mannerism, etc. of the corresponding user in a real-world environment or space. In some aspects, as described in more detail below with respect to FIG. 8, to generate and/or animate the virtual representation for the first user, the user virtual representation system 620 may generate and/or animate a virtual representation of a face of the user (a facial representation) of the client device 602, generate and/or animate a virtual representation of a body (a body representation) of the user of the client device 602, and generate and/or animate a virtual representation of hair (a hair representation) of the user of the client device 602. In some cases, the user virtual representation system 620 may combine or attach the facial representation with the body representation to generate a combined virtual representation. The user virtual representation system 620 may then add the hair representation to the combined virtual representation to generate a final virtual representation of the user for one or more frames of content (shown in FIG. 6 as virtual content frames). The scene rendering system can transmit the one or more frames to the client devices 602, 604, 606.

A scene composition system 622 of the animation and scene rendering system 610 may then compose a virtual scene or environment for the virtual session and generate a respective target view (e.g., a frame of content, such as virtual content or a combination of real-world and virtual content) for each of the client devices 602, 604, 606 from a respective perspective of each device or user in the virtual scene or environment. The virtual scene composed by the scene composition system 622 includes the virtual representations of the users involved in the virtual session and any virtual background of the scene. In one example, using the information received from the other client devices 604, 606, the scene composition system 622 may compose the virtual scene (including virtual representations of the users and background information) and generate a frame representing a view of the virtual scene from the perspective of the user of the client device 602.

Figure 7:
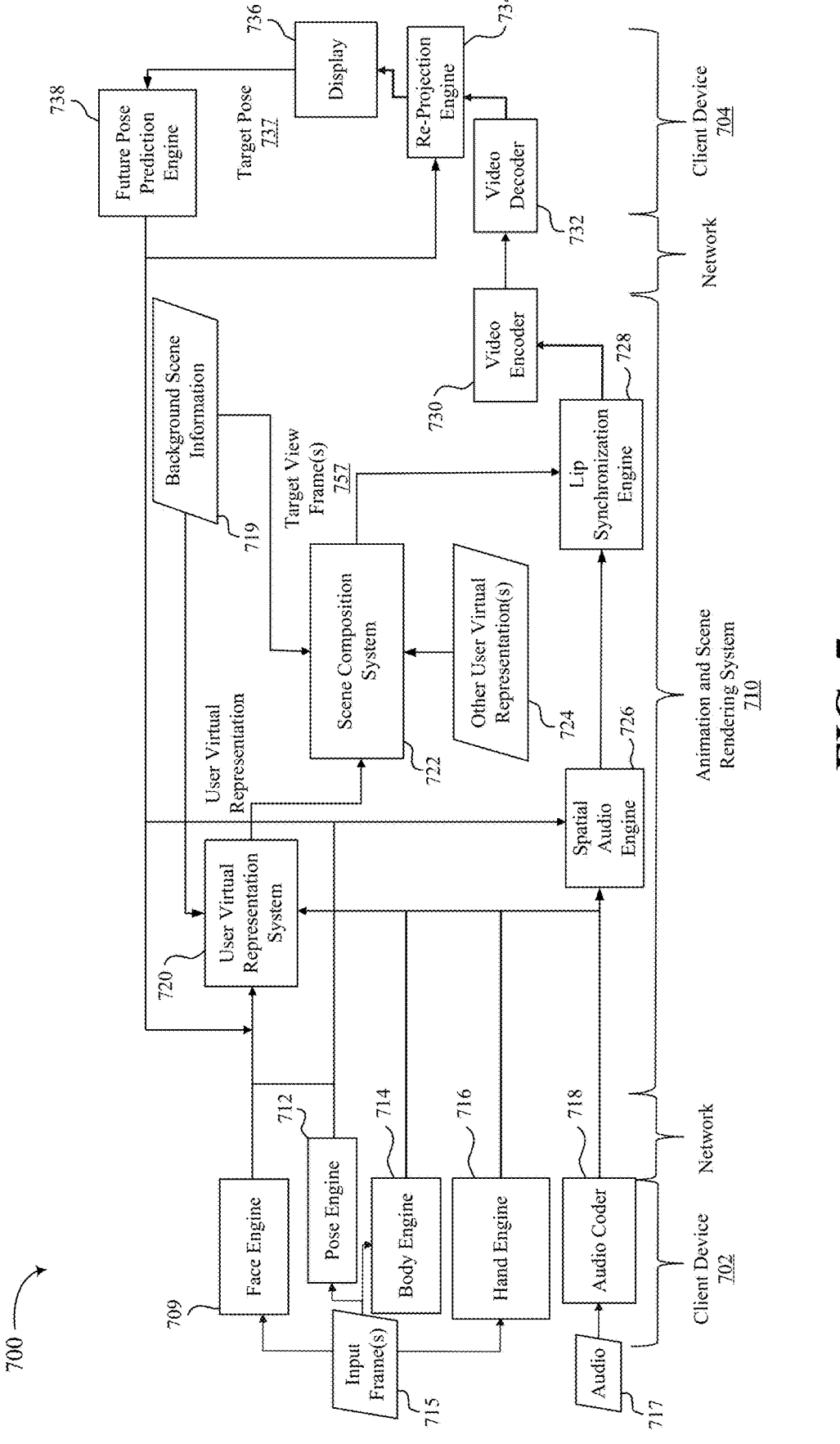
FIG. 7 is a diagram illustrating another example of an XR system including an animation and scene rendering system in communication with client devices, according to aspects of the disclosure.

FIG. 7 is a diagram illustrating an example of an XR system 700 configured to perform aspects described herein. The XR 700 system includes a client device 702 and a client device 704 participating in a virtual session (in some cases with other client devices not shown in FIG. 7). The client device 702 may send information to an animation and scene rendering system 710 via a network (e.g., a real-time communications (RTC) network or other wireless network). The animation and scene rendering system 710 can generate frames for a virtual scene from the perspective of a user of the client device 704 and can transmit the frames or images (referred to as a target view frame or image) to the client device 704 via the network. The client device 702 may include a first XR device (e.g., a virtual reality (VR) head-mounted display (HMD), augmented reality (AR) or mixed (MR) glasses, etc.) and the client device 704 may include a second XR device.

The frames transmitted to the client device 704 include a view of the virtual scene from a perspective of a user of the client device 704 (e.g., the user can view virtual representations of other users in the virtual scene as if the users are in a physical space together) based on a relative difference between the pose of the client device 704 and each respective pose of the client device 702 and any other devices providing information to the animation and scene rendering system 710. In the example of FIG. 7, the client device 702 can be considered a source (e.g., a source of information for generating at least one frame for the virtual scene) and the client device 704 can be considered a target (e.g., a target for receiving the at least one frame generated for the virtual scene).

As noted above, the information sent by a client device to an animation and scene rendering system (e.g., from client device 702 to animation and scene rendering system 710) may include information representing a face (e.g., codes or features representing an appearance of the face or other information) of a user of the client device 702, information representing a body (e.g., codes or features representing an appearance of the body, a pose of the body, or other information) of the user of the client device 702, information representing one or more hands (e.g., codes or features representing an appearance of the hand(s), a pose of the hand(s), or other information) of the user of the client device 702, pose information (e.g., a pose in six-degrees-of-freedom (6-DOF), referred to as a 6-DOF pose) of the client device 702, audio associated with an environment in which the client device 702 is located, any combination thereof, and/or other information.

For example, the computing device 702 may include a face engine 709, a pose engine 712, a body engine 714, a hand engine 716, and an audio coder 718. In some aspects, the computing device 702 may include a body engine configured to generate a virtual representation of the user's body. The computing device 702 may include other components or engines other than those shown in FIG. 7 (e.g., one or more components on the device 500 of FIG. 5, one or more components of the computing system 4300 of FIG. 43, etc.). The computing device 704 is shown to include a video decoder 732, a re-projection engine 734, a display 736, and a future pose prediction engine 738. In some cases, each client device (e.g., client device 702, client device 702, client device 602 of FIG. 6, client device 604 of FIG. 6, client device 606 of FIG. 6, etc.) may include a face engine, a pose engine, a body engine, a hand engine, an audio coder (and in some cases an audio decoder or combined audio encoder-decoder), a video decoder (and in some cases a video encoder or combined video encoder-decoder), a re-projection engine, a display, and a future pose prediction engine. These engines or components are not shown in FIG. 7 with respect to the client device 702 and the client device 704 because the client device 702 is a source device and the client device 704 is a target device in the example of FIG. 7.

The face engine 709 of the client device 702 may receive one or more input frames 715 from one or more cameras of the client device 702. For instance, the input frame(s) 715 received by the face engine 709 may include frames (or images) captured by one or more cameras with a field of view of a mouth of the user of the client device 702, a left eye of the user, and a right eye of the user. Other images may also be processed by the face engine 709. In some cases, the input frame(s) 715 can be included in a sequence of frames (e.g., a video, a sequence of standalone or still images, etc.). The face engine 709 can generate and output a code (e.g., a feature vector or multiple feature vectors) representing a face of the user of the client device 702. The face engine 709 can transmit the code representing the face of the user to the animation and scene rendering system 710. In one illustrative example, the face engine 709 may include one or more face encoders that include one or more machine learning systems (e.g., a deep learning network, such as a deep neural network) trained to represent faces of users with a code or feature vector(s). In some cases, the face engine 709 can include a separate encoder for each type of image that the face engine 709 processes, such as a first encoder for frames or images of the mouth, a second encoder for frames or images of the right eye, and a third encoder for frames or images of the left eye. The training can include supervised learning (e.g., using labeled images and one or more loss functions, such as mean-squared error MSE)), semi-supervised learning, unsupervised learning, etc.). For instance, a deep neural network may generate and output the code (e.g., a feature vector or multiple feature vectors) representing the face of the user of the client device 702. The code can be a latent code (or bitstream) that can be decoded by a face decoder (not shown) of the animation and scene rendering system 710 that is trained to decode codes (or feature vector)

representing faces of users in order to generate virtual representations of the faces (e.g., a face mesh). For example, the face decoder of the animation and scene rendering system 710 can decode the code received from the client device 702 to generate a virtual representation of the user's face.

The pose engine 712 can determine a pose (e.g., 6-DOF pose) of the client device 702 (and thus the head pose of the user of the client device 702) in the 3D environment. The 6-DOF pose can be an absolute pose. In some cases, the pose engine 712 may include a 6-DOF tracker that can track three degrees of rotational data (e.g., including pitch, roll, and yaw) and three degrees of translation data (e.g., a horizontal displacement, a vertical displacement, and depth displacement relative to a reference point). The pose engine 712 (e.g., the 6-DOF tracker) may receive sensor data as input from one or more sensors. In some cases, the pose engine 712 includes the one or more sensors. In some examples, the one or more sensors may include one or more inertial measurement units (IMUs) (e.g., accelerometers, gyroscopes, etc.), and the sensor data may include IMU samples from the one or more IMUs. The pose engine 712 can determine raw pose data based on the sensor data. The raw pose data may include 6DOF data representing the pose of the client device 702, such as three-dimensional rotational data (e.g., including pitch, roll, and yaw) and three-dimensional translation data (e.g., a horizontal displacement, a vertical displacement, and depth displacement relative to a reference point).

The body engine 714 may receive one or more input frames 715 from one or more cameras of the client device 702. The frames received by the body engine 714 and the camera(s) used to capture the frames may be the same or different from the frame(s) received by the face engine 709 and the camera(s) used to capture those frames. For instance, the input frame(s) received by the body engine 714 may include frames (or images) captured by one or more cameras with a field of view of body (e.g., a portion other than the face, such as a neck, shoulders, torso, lower body, feet, of the user etc.) of the user of the client device 702. The body engine 714 can perform one or more techniques to output a representation of the body of the user of the client device 702. In one example, the body engine 714 can generate and output a 3D mesh (e.g., including a plurality of vertices, edges, and/or faces in 3D space) representing a shape of the body. In another example, the body engine 714 can generate and output a code (e.g., a feature vector or multiple feature vectors) representing a body of the user of the client device 702. In one illustrative example, the body engine 714 may include one or more body encoders that include one or more machine learning systems (e.g., a deep learning network, such as a deep neural network) trained to represent bodies of users with a code or feature vector(s). The training can include supervised learning (e.g., using labeled images and one or more loss functions, such as MSE), semi-supervised learning, unsupervised learning, etc.). For instance, a deep neural network may generate and output the code (e.g., a feature vector or multiple feature vectors) representing the body of the user of the client device 702. The code can be a latent code (or bitstream) that can be decoded by a body decoder (not shown) of the animation and scene rendering system 710 that is trained to decode codes (or feature vectors) representing virtual bodies of users in order to generate virtual representations of the bodies (e.g., a body mesh). For example, the body decoder of the animation and scene rendering system 710 can decode the code received from the client device 702 to generate a virtual representation of the user's body.

The hand engine 716 may receive one or more input frames 715 from one or more cameras of the client device 702. The frames received by the hand engine 716 and the camera(s) used to capture the frames may be the same or different from the frame(s) received by the face engine 709 and/or the body engine 714 and the camera(s) used to capture those frames. For instance, the input frame(s) received by the hand engine 716 may include frames (or images) captured by one or more cameras with a field of view of hands of the user of the client device 702. The hand engine 716 can perform one or more techniques to output a representation of the one or more hands of the user of the client device 702. In one example, the hand engine 716 can generate and output a 3D mesh (e.g., including a plurality of vertices, edges, and/or faces in 3D space) representing a shape of the hand(s). In another example, the hand engine 716 can output a code (e.g., a feature vector or multiple feature vectors) representing the one or more hands. For instance, the hand engine 716 may include one or more body encoders that include one or more machine learning systems (e.g., a deep learning network, such as a deep neural network) that are trained (e.g., using supervised learning, semi-supervised learning, unsupervised learning, etc.) to represent hands of users with a code or feature vector(s). The code can be a latent code (or bitstream) that can be decoded by a hand decoder (not shown) of the animation and scene rendering system 710 that is trained to decode codes (or feature vectors) representing virtual hands of users in order to generate virtual representations of the bodies (e.g., a body mesh). For example, the hand decoder of the animation and scene rendering system 710 can decode the code received from the client device 702 to generate a virtual representation of the user's hands (or one hand in some cases).

The audio coder 718 (e.g., audio encoder or combined audio encoder-decoder) can receive audio data 717, such as audio obtained using one or more microphones of the client device 702. The audio coder 718 can encode or compress audio data and transmit the encoded audio to the animation and scene rendering system 710. The audio coder 718 can perform any type of audio coding to compress the audio data, such as a Modified discrete cosine transform (MDCT) based encoding technique. The encoded audio can be decoded by an audio decoder (not shown) of the animation and scene rendering system 710 that is configured to perform an inverse process of the audio encoding process performed by the audio coder 718 to obtain decoded (or decompressed) audio.

A user virtual representation system 720 of the animation and scene rendering system 710 can receive the input information received from the client device 702 and use the input information to generate and/or animate a virtual representation (or avatar) of the user of the client device 702. In some aspects, the user virtual representation system 720 may also use a future predicted pose of the client device 704 to generate and/or animate the virtual representation of the user of the client device 702. In such aspects, the future pose prediction engine 738 of the client device 704 may predict pose of the client device 704 (e.g., corresponding to a predicted head pose, body pose, hand pose, etc. of the user) based on a target pose (e.g., target pose 737) and transmit the predicted pose to the user virtual representation system 720. For instance, the future pose prediction engine 738 may predict the future pose of the client device 704 (e.g., corresponding to head position, head orientation, a line of sight such as view 130-A or 130-B of FIG. 1, etc. of the user of the client device 704) for a future time (e.g., a time T, which may be the prediction time) according to a model. The future time T can correspond to a time when a target view frame (e.g., target view frame 757) will be output or displayed by the client device 704. As used herein, reference to a pose of a client device (e.g., client device 704) and to a head pose, body pose, etc. of a user of the client device can be used interchangeably.

The predicted pose can be useful when generating a virtual representation because, in some cases, virtual objects may appear delayed to a user when compared to an expected view of the objects to the user or compared with real-world objects that the user is viewing (e.g., in an AR, MR, or VR see-through scenario). Referring to FIG. 1 as an illustrative example, without head motion or pose prediction, updating of virtual objects in view 130-B from the previous view 130-A may be delayed until head pose measurements are conducted such that the position, orientation, sizing, etc. of the virtual objects may be updated accordingly. In some cases, the delay may be due to system latency (e.g., end-to-end system delay between client device 704 and a system or device rendering the virtual content, such as the animation and scene rendering system 710), which may be caused by rendering, time warping, or both. In some cases, such delay may be referred to as round trip latency or dynamic registration error. In some cases, the error may be large enough that the user of client device 704 may perform a head motion (e.g., the head motion 115 illustrated in FIG. 1) before a time pose measurement may be ready for display. Thus, it may be beneficial to predict the head motion 115 such that virtual objects associated with the view 130-B can be determined and updated in real-time based on the prediction (e.g., patterns) in the head motion 115.

As noted above, the user virtual representation system 720 may use the input information received from the client device 702 and the future predicted pose information from the future pose prediction engine 738 to generate and/or animate the virtual representation of the user of the client device 702. As noted herein, animation of the virtual representation of the user can include modifying a position, movement, mannerism, or other feature of the virtual representation to match a corresponding position, movement, mannerism, etc. of the user in a real-world or physical space. An example of the user virtual representation system 720 is described below with respect to FIG. 8. In some aspects, the user virtual representation system 720 may be implemented as a deep learning network, such as a neural network (e.g., a convolutional neural network (CNN), an autoencoder, or other type of neural network) trained based on input training data (e.g., codes representing faces of users, codes representing bodies of users, codes representing hands of users, pose information such as 6-DOF pose information of client devices of the users, inverse kinematics information, etc.) using supervised learning, semi-supervised learning, unsupervised learning, etc. to generate and/or animate virtual representations of users of client devices.

Figure 8:
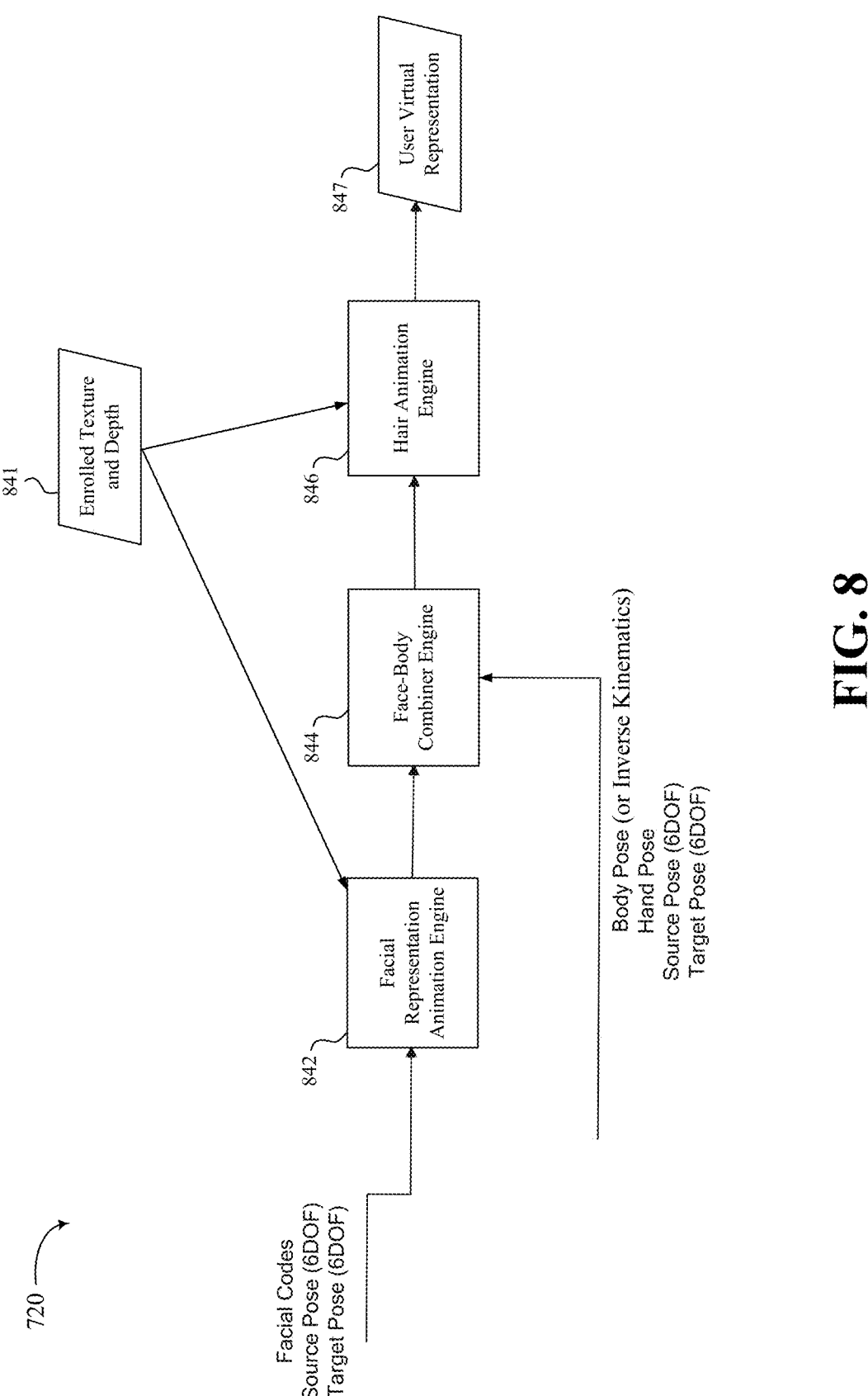
FIG. 8 is a diagram illustrating an illustrative example of a user virtual representation system of an animation and scene rendering system, according to aspects of the disclosure.

FIG. 8 is a diagram illustrating an illustrative example of the user virtual representation system 720. A facial representation animation engine 842 of the user virtual representation system 720 can generate and/or animate a virtual representation of a face (or the entire head) of the first user (referred to as a facial representation) of the client device 702. The facial representation can include a 3D mesh (including a plurality of vertices, edges, and/or faces in 3D space) representing a shape of the face or head of the user of the client device 702 and texture information representing features of the face.

As shown in FIG. 8, the facial representation animation engine 842 can obtain (e.g., receive, retrieve, etc.) the facial codes (e.g., a feature vector or multiple feature vectors) output from the face engine 709, a source pose of the client device 702 (e.g., the 6-DOF pose output by the pose engine 712), and a target pose (e.g., target pose 737) of the client device 704 (e.g., a 6-DOF pose output by a pose engine of the client device 704 and received by the animation and scene rendering system 710). The facial representation animation engine 842 can also obtain texture information (e.g., color and surface detail of the face) and depth information (shown as enrolled texture and depth information 841). The texture information and depth information may be obtained during an enrollment stage, where a user uses one or more cameras of a client device (e.g., the client device 702, 704, etc.) to capture one or more images of the user. The images can be processed to determine the text and depth information of the user's face (and in some cases the user's body and/or hair). Using the facial codes, the source and target poses, and the enrolled texture and depth information 841, the facial representation animation engine 842 can generate (or animate) the face of the user of the client device 702 in a pose from a perspective of the user of the client device 704 (e.g., based on a relative difference between the pose of the client device 704 and each respective pose of the client device 702 and any other devices providing information to the animation and scene rendering system 710) and with facial features that correspond to the features of the face of the user. For example, the facial representation animation engine 842 may compute a mapping based on the facial codes, the source and target poses, and the enrolled texture and depth information 841. The mapping may be learned using offline training data (e.g., using supervised training, unsupervised training, semi-supervised training, etc.). The facial representation animation engine 842 can use the mapping to determine how the animation of the face of the user should appear based on the input and enrolled data.

A face-body combiner engine 844 of the user virtual representation system 720 can obtain, generate, and/or animate a virtual representation of a body (referred to as a body representation) of the user of the client device 702. For example, as shown in FIG. 8, the face-body combiner engine 844 can obtain a pose of the one or more hands of the user of the client device 702 output by the hand engine 716, the source pose of the client device 702, and the target pose of the client device 704. In some aspects, the face-body combiner engine 844 may also obtain a pose of the body of the user of the client device 702 output by the body engine 714. In other aspects, the pose of the body may be estimated using inverse kinematics. For example, using the head pose (e.g., a 6DOF head pose or device pose) from the pose engine 712 and the hand pose from the hand engine 716, the face-body combiner engine 844 can estimate joint parameters of the user's body to manipulate the body, arms, legs, etc. The face-body combiner engine 844 can estimate the joint parameters using any suitable kinematics equation (e.g., an inverse kinematics equation or set of equations, such as a Forward And Backward Reaching Inverse Kinematics (FABRIK) heurist method). Using the pose of the hand(s), the source and target poses, and either the body pose or a result of the inverse kinematics, the face-body combiner engine 844 can determine a pose of the body of the user of the client device 702 from a perspective of the user of the client device 704 (e.g., based on a relative difference between the pose of the client device 704 and each respective pose of the client device 702 and any other devices providing information to the animation and scene rendering system 710).

The face-body combiner engine 844 can combine or attach the facial representation with the body representation to generate a combined virtual representation. For instance, as noted above, the facial representation may include a 3D mesh of the face or head of the user of the client device 702 and texture information representing features of the face. The body representation may include a 3D mesh of the body of the user of the client device 702 and texture information representing features of the body. The face-body combiner engine 844 can combine or merge the previously-synthesized 3D mesh of the facial representation (or full head) with the 3D mesh of the body representation (including the one or more hands) to generate the combined virtual representation (e.g., a combined 3D mesh of the face/head and body). In some cases, the 3D mesh of the body representation may be a generic 3D mesh of a male or female (corresponding to whether the user is male or female). In one example, the vertices of the face/head 3D mesh and the body 3D mesh that correspond to the user's neck are merged (e.g., joined together) to make a seamless transition between the face/head and the body of the user. After combining or merging the 3D mesh of the facial representation/head with the 3D mesh of the body representation, the two 3D meshes will be one joint 3D mesh. The face-body combiner engine 844 may then ensure that the skin color of the body mesh matches the skin diffuse color (e.g., albedo) and the other materials of the face/head mesh. For instance, the face-body combiner engine 844 may estimate the skin parameters of the head and may transfer the skin parameters to the skin of the body. In one illustrative example, the face-body combiner engine 844 may use a transfer map (e.g., provided by Autodesk™) to transfer a diffuse map representing the diffuse color of the face/head mesh to the body mesh.

A hair animation engine 846 of the user virtual representation system 720 can generate and/or animate a virtual representation of hair (referred to as a hair representation) of the user of the client device 702. The hair representation can include a 3D mesh (including a plurality of vertices, edges, and/or faces in 3D space) representing a shape of the hair and texture information representing features of the hair. The hair animation engine 846 can perform the hair animation using any suitable technique. In one example, the hair animation engine 846 may obtain or receive a reference 3D Mesh based on hair cards or strands that can be animated based on motion of the head. In another example, the hair animation engine 846 may perform an image inpainting technique by adding color on the 2D image output of the virtual representation (or avatar) of the user (output by the user virtual representation system 720) based on the motion or pose of the head and/or body. One illustrative example of an algorithm that may be used by the hair animation engine 846 to generate and/or animate a virtual representation of the user's hair includes Multi-input Conditioned Hair Image generative adversarial networks (GAN) (MichiGAN).

In some aspects, the facial representation animation engine 842 can also obtain the enrolled texture and depth information 841, which may include text and depth information of the hair of the user of the client device 702. The animation and scene rendering system 720 may then combine or add the hair representation to the combined virtual representation to generate a final user virtual representation 847 of the user of the client device 702. For example, the animation and scene rendering system 720 can combine the combined 3D mesh (including the combination of the face mesh and the body mesh including the one or more hands) with the 3D mesh of the hair to generate the final user virtual representation 847.

Returning the FIG. 7, the user virtual representation system 720 may output the virtual representation of the user of the client device 702 to a scene composition system 722 of the animation and scene rendering system 710. Background scene information 719 and other user virtual representations 724 of other users participating in the virtual session (if any exist) are also provided to the scene composition system 722. The background scene information 719 can include lighting of the virtual scene, virtual objects in the scene (e.g., virtual buildings, virtual streets, virtual animals, etc.), and/or other details related to the virtual scene (e.g., a sky, clouds, etc.). In some cases, such as in an AR, MR, or VR see-through setting (where video frames of a real-world environment are displayed to a user), the lighting information can include lighting of a real-world environment in which the client device 702 and/or the client device 704 (and/or other client devices participating in the virtual session) are located. In some cases, the future predicted pose from the future pose prediction engine 738 of the client device 704 may also be input to the scene composition system 722.

Using the virtual representation of the user of the client device 702, the background scene information 719, and virtual representations of other users (if any exist) (and in some cases the future predicted pose), the scene composition system 722 can compose target view frames for the virtual scene with a view of the virtual scene from the perspective of the user of the client device 704 based on a relative difference between the pose of the client device 704 and each respective pose of the client device 702 and any other client devices of users participating in the virtual session. For example, a composed target view frame can include a blending of the virtual representation of the user of the client device 702, the background scene information 719 (e.g., lighting, background objects, sky, etc.), and virtual representations of other users that may be involved in the virtual session. The poses of virtual representations of any other users are also based on a pose of the client device 704 (corresponding to a pose of the user of the client device 704).

Figure 9:
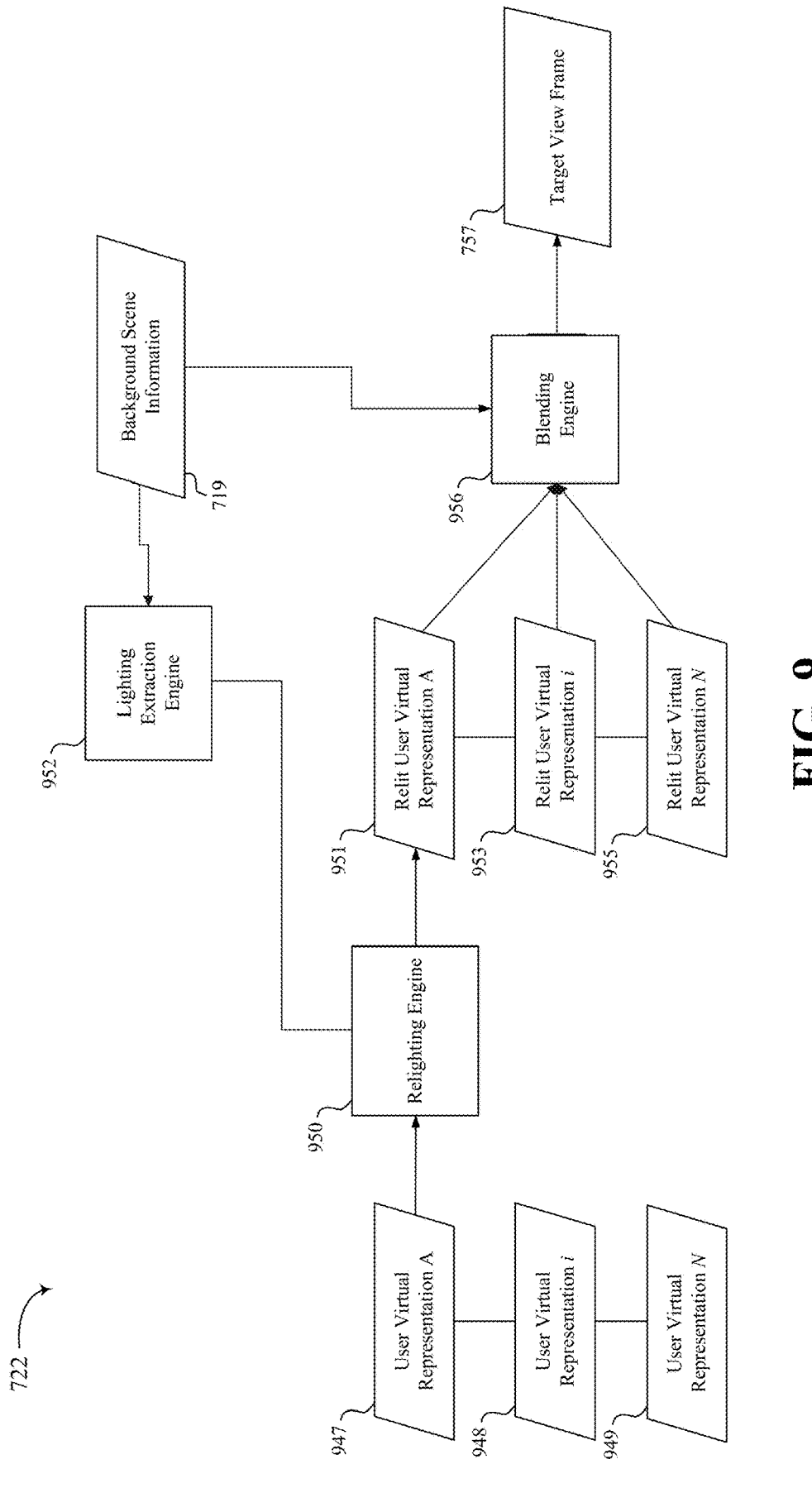
FIG. 9 is a diagram illustrating an illustrative example of a scene composition system of an animation and scene rendering system, according to aspects of the disclosure.

FIG. 9 is a diagram illustrating an example of the scene composition system 722. As noted above, the background scene information 719 may include lighting information of the virtual scene (or lighting information of a real-world environment in some cases). A lighting extraction engine 952 of the scene composition system 722 can obtain the background scene information 719 and extract or determine the lighting information of the virtual scene (or real-world scene) from the background scene information 719. For example, a high dynamic range (HDR) map (e.g., a high dynamic range image (HDRI) map including a 360-degrees image) of a scene may be captured by rotating a camera around the scene in a plurality of directions (e.g., in all directions), in some cases from a single viewpoint. The HDR map or image maps the lighting characteristics of the scene by storing the real world values of light and reflections at each location in the scene. The scene composition system 722 can then extract the light from the HDR map or image (e.g., using one or more convolution kernels).

The lighting extraction engine 952 can output the extracted lighting information to a relighting engine 950 of the scene composition system 722. When generating a target view image of the virtual scene, the relighting engine 950 may use the lighting information extracted from the background scene information 719 to perform relighting of a user virtual representation A 947, a user virtual representation i 948, through a user virtual representation N 949 (where there are N total user virtual representations, with N being greater than or equal to 0) representing users participating in the virtual session. The user virtual representation A 947 can represent the user of the client device 702 of FIG. 7 and the user virtual representation i 948 through the user virtual representation N 949 can represent one or more other users participating in the virtual session. The relighting engine 950 can modify the lighting of the virtual representations A 947, the user virtual representation i 948, through the user virtual representation N 949 so that the virtual representations appear as realistic as possible when viewed by the user of the client device 704. A result of the relighting performed by the relighting engine 950 includes a relit user virtual representations A 951, a relit user virtual representation i 953, through a relit user virtual representation N 955.

In some examples, the relighting engine 950 may include one or more neural networks that are trained (e.g., using supervised training, unsupervised training, semi-supervised training, etc.) to relight the foreground (and in some cases the background) of the virtual scene using extracted light information. For instance, the relighting engine 950 may segment the foreground (e.g., the user) from one or more images of the scene and may estimate a geometry and/or normal map of the user. The relighting engine 950 may use the normal map and the lighting information (e.g., the HDRI map or the current environment of the user) from the lighting extraction engine 952 to estimate an Albedo map including albedo information of the user. The relighting engine 950 may then use the albedo information along with the lighting information (e.g., the HDRI map) from the lighting extraction engine 952 to relight the scene. In some cases, the relighting engine 950 may use techniques other than machine learning.

A blending engine 956 of the scene composition system 722 can blend the relit user virtual representations 951, 953, and 955 into the background scene represented by the background scene information 719 to generate the target view frame 757. In one illustrative example, the blending engine 956 may apply Poisson image blending (e.g., using image gradients) to blend the relit user virtual representations 951, 953, and 955 into the background scene. In another illustrative example, the blending engine 956 may include one or more neural networks trained (e.g., using supervised training, unsupervised training, semi-supervised training, etc.) to blend the relit user virtual representations 951, 953, and 955 into the background scene.

Returning the FIG. 7, a spatial audio engine 726 may receive as input the encoded audio generated by the audio coder 718 and in some cases the future predicted pose information from the future pose prediction engine 738. Using the inputs to generate audio that is spatially oriented according to the pose of the user of the client device 704. A lip synchronization engine 728 can synchronize the animation of the lips of the virtual representation of the user of the client device 702 depicted in the target view frame 757 with the spatial audio output by the spatial audio engine 726. The target view frame 757 (after synchronization by the lip synchronization engine 728) may be output to a video encoder 730. The video encoder 730 can encode (or compress) the target view frame 757 using a video coding technique (e.g., according to any suitable video codec, such as advanced video coding (AVC), high efficiency video coding (HEVC), versatile video coding (VVC), moving picture experts group (MPEG), etc.). The animation and scene rendering system 710 can then transmit the target view frame 757 to the client device 704 via the network.

A video decoder 732 of the client device 704 can decode the encoded target view frame 757 using an inverse of the video coding technique performed by the video encoder 730 (e.g., according to a video codec, such as AVC, HEVC, VVC, etc.). A re-projection engine 734 can perform re-projection to re-project the virtual content of the decoded target view frame according to the predicted pose determined by the future pose prediction engine 738. The re-projected target view frame can then be displayed on a display 736 so that the user of the client device 704 can view the virtual scene from that user's perspective.

Figure 10:
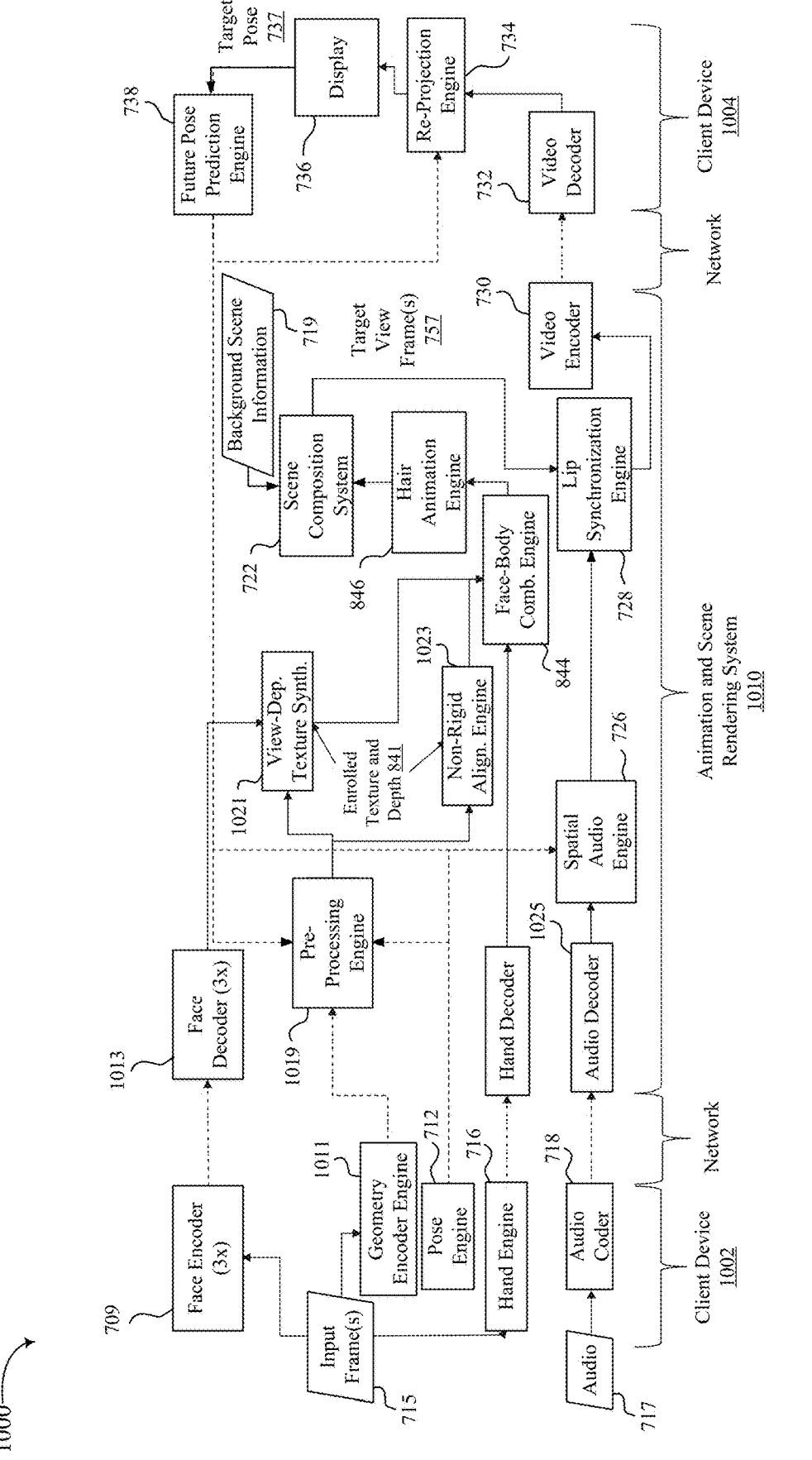
FIG. 10 is a diagram illustrating another example of an XR system including an animation and scene rendering system in communication with client devices, according to aspects of the disclosure.

FIG. 10 illustrates another example of an XR system 1000 configured to perform aspects described herein. As shown in FIG. 10, the XR system 1000 includes some of the same components (with like numerals) as the XR system 700 of FIG. 7 and also includes additional or alternative components as compared to the XR system 700. The face engine 709, the pose engine 712, the hand engine 716, the audio coder 718, the spatial audio engine 726, the scene composition system 722, the lip synchronization engine 728, the video encoder, the video decoder, the re-projection engine 734, the display 736, and the future pose projection engine 738 are configured to perform the same or similar operations as the same components of the XR system 700 of FIG. 7. In some aspects, the XR system 1000 may include a body engine configured to generate a virtual representation of the user's body. Similarly, the face-body combiner engine 844 and the hair animation engine 846 are configured to perform the same or similar operations as the same components of FIG. 8.

Similar to the XR system 700 of FIG. 7, the XR system 1000 system includes a client device 1002 and a client device 1004 participating in a virtual session (in some cases with other client devices not shown in FIG. 10). The client device 1002 may send information to an animation and scene rendering system 1010 via a network (e.g., a real-time communications (RTC) network or other wireless network). The animation and scene rendering system 1010 can generate target view frames for a virtual scene from the perspective of a user of the client device 1004 and can transmit the target view frames to the client device 1004 via the network. The client device 1002 may include a first XR device (e.g., a VR HMD, AR or MR glasses, etc.) and the client device 1004 may include a second XR device. The animation and scene rendering system 1010 is shown to include an audio decoder 1025 that is configured to decode an audio bitstream received from the audio coder 718.

The face engine is shown as a face engine 709 in FIG. 10. The face engine 709 of the client device 1002 may receive one or more input frames 715 from one or more cameras of the client device 1002. In some examples, the input frame(s) 715 received by the face engine 709 may include frames (or images) captured by one or more cameras with a field of view of a mouth of the user of the client device 1002, a left eye of the user, and a right eye of the user. The face engine 709 can generate and output a code (e.g., a feature vector or multiple feature vectors) representing a face of the user of the client device 1002. The face engine 709 can transmit the code representing the face of the user to the animation and scene rendering system 1010. As noted above, the face engine 709 may include one or more machine learning systems (e.g., a deep learning network, such as a deep neural network) trained to represent faces of users with a code or feature vector(s). As indicated by the "3×" notation in FIG. 10, the face engine 709 may include a separate encoder (e.g., a separate encoder neural network) for each type of image that the face engine 709 processes, such as a first encoder for frames or images of a mouth of the user of the client device 1002, a second encoder for frames or images of a right eye of the user of the client device 1002, and a third encoder for frames or images of a left eye of the user of the client device 1002.

A face decoder 1013 of the animation and scene rendering system 1010 is trained to decode codes (or feature vector) representing faces of users in order to generate virtual representations of the faces (e.g., a face mesh). The face decoder 1013 may receive the code (e.g., a latent code or bitstream) from the face engine 709 and can decode the code received from the client device 1002 to generate a virtual representation of the user's face (e.g., a 3D mesh of the user's face). The virtual representation of the user's face can be output to a view-dependent texture synthesis engine 1021 of the animation and scene rendering system 1010, discussed below. In some cases, the view-dependent texture synthesis engine 1021 may be part of the user virtual representation system 720 described previously.

A geometry encoder engine 1011 of the client device 1002 may generate a 3D model (e.g., a 3D morphable model or 3DMM) of the user's head or face based on the one or more frames 715. In some aspects, the 3D model can include a representation of a facial expression in a frame from the one or more frames 715. In one illustrative example, the facial expression representation can be formed from blendshapes. Blendshapes can semantically represent movement of muscles or portions of facial features (e.g., opening/closing of the jaw, raising/lowering of an eyebrow, opening/closing eyes, etc.). In some cases, each blendshape can be represented by a blendshape coefficient paired with a corresponding blendshape vector. In some examples, the facial model can include a representation of the facial shape of the user in the frame. In some cases, the facial shape can be represented by a facial shape coefficient paired with a corresponding facial shape vector. In some implementations, the geometry encoder engine 1011 (e.g., a machine learning model) can be trained (e.g., during a training process) to enforce a consistent facial shape (e.g., consistent facial shape coefficients) for a 3D facial model regardless of a pose (e.g., pitch, yaw, and roll) associated with the 3D facial model. For example, when the 3D facial model is rendered into a 2D image or frame for display, the 3D facial model can be projected onto a 2D image or frame using a projection technique.

In some aspects, the blend shape coefficients may be further refined by additionally introducing a relative pose between the client device 1002 and the client device 1004. For instance, the relative pose information may be processed using a neural network to generate view-dependent 3DMM geometry that approximates ground truth geometry. In another example, the face geometry may be determined directly from the input frame(s) 715, such as by estimating additive vertices residual from the input frame(s) 715 and producing more accurate facial expression details for texture synthesis.

The 3D model of the user's head (or an encoded representation of the 3D model, such as a latent representation or feature vector representing the 3D model) can be output from the geometry encoder engine 1011 and received by a pre-processing engine 1019 of the animation and scene rendering system 1010. The pre-processing engine 1019 may also receive the future pose predicted by the future pose prediction engine 738 of the client device 1004 and the pose of the client device 1002 (e.g., 6-DOF poses) provided by the pose engine 712, as discussed above. The pre-processing engine 1019 can process the 3D model of the user's head and the poses of the client devices 1002, 1004 to generate a face of the user of the client device 1004 with a detailed facial expression in a particular pose (e.g., from the perspective of the pose the user of the client device 1004 relative to the pose of the user of the client device 1002). The pre-processing can be performed because, in some cases, the animation and scene rendering system 1010 is configured to modify a neutral face expression of the user of the client device 1002 (e.g., obtained as an enrolled neutral face offline by capturing an image or scan of the user's face) to animate the virtual representation (or avatar) of the user of the client device 1002 with different expressions under different viewpoints. To do this, the animation and scene rendering system 1010 may need to understand how to modify the neutral expression in order animate the virtual representation of the user of the client device 1002 with the correct expression and pose. The pre-processing engine 1019 can encode the expression information provided by the geometry encoder engine 1011 (and in some cases the pose information provided by the pose engine 712, and/or the future pose information from the future pose prediction engine 738) so that the animation and scene rendering system 1010 (e.g., the view-dependent texture synthesis engine 1021 and/or non-rigid alignment engine 1023) can understand the expression and pose of the virtual representation of the user of the client device 1002 that is to be synthesized.

In one illustrative example, the 3D model (which may be a 3DMM as noted above) includes a position map defining a position of each point of the 3D model and normal information defining a normal of each point on the position map. The pre-processing engine 1019 can extend or convert the normal information and the position map into a coordinate UV space (which may be referred to as a UV face position map). In some cases, the UV face position map can provide and/or represent a 2D map of the face of the user of the client device 1004 captured in an input frame 715. For instance, the UV face position map can be a 2D image that records and/or maps the 3D positions of points (e.g., pixels) in UV space (e.g., 2D texture coordinate system). The U in the UV space and the V in the UV space can denote the axes of the UV face position map (e.g., the axes of a 2D texture of the face). In one illustrative example, the U in the UV space can denote a first axis (e.g., a horizontal X-axis) of the UV face position map and the V in the UV space can denote a second axis (e.g., a vertical Y-axis) of the UV face position map. In some examples, the UV position map can record, model, identify, represent, and/or calculate a 3D shape, structure, contour, depth and/or other details of the face (and/or a face region of the head). In some implementations, a machine learning model (e.g., a neural network) can be used to generate the UV face position map.

The UV face position map can thus encode the expression of the face (and in some cases the pose of the head), providing information that can be used by the animation and scene rendering system 1010 (e.g., the view-dependent texture synthesis engine 1021 and/or non-rigid alignment engine 1023) to animate a facial representation for the user of the client device 1002. The pre-processing engine 1019 can output the pre-processed 3D model of the user's head to the view-dependent texture synthesis engine 1021 and to a non-rigid alignment engine 1023. In some cases, the non-rigid alignment engine 1023 may be part of the user virtual representation system 720 described previously.

As noted above, the view-dependent texture synthesis engine 1021 receives virtual representation of the user's face (the facial representation) from the face decoder 1013 and the pre-processed 3D model information from the pre-processing engine 1019. The view-dependent texture synthesis engine 1021 can combine information associated with the 3D model of the user's head (output from the pre-processing engine 1019) with the facial representation of the user (output from the face decoder 1013) to generate a full head model with facial features for the user of the client device 1002. In some cases, the information associated with the 3D model of the user's head output from the pre-processing engine 1019 may include the UV face position map described previously. The view-dependent texture synthesis engine 1021 may also obtain the enrolled texture and depth information 841 discussed above with respect to FIG. 8. The view-dependent texture synthesis engine 1021 can add the texture and depth from the enrolled texture and depth information 841 to the full head model of the user of the client device 1002. In some cases, the view-dependent texture synthesis engine 1021 may include a deep learning network, such as a neural network (e.g., a convolutional neural network (CNN), an autoencoder, or other type of neural network). For instance, the view-dependent texture synthesis engine 1021 may be a neural network trained (e.g., using supervised learning, semi-supervised learning, unsupervised learning, etc.) to process a UV face position map (and in some cases face information such as the face information output by the face decoder 1013) to generate a full head models of users.

The non-rigid alignment engine 1023 can move the 3D model of the head of the user of the client device 1002 in a translational direction in order to ensure that the geometry and texture are aligned or overlapping, which can reduce gaps between the geometry and the texture. The face-body combiner engine 844 can then combine the body model (not shown in FIG. 10) and the facial representation output by the view-dependent texture synthesis engine 1021 to generate a combined virtual representation of the user of the client device 702. The hair animation engine 846 can generate a hair model, which can be combined with the combined virtual representation of the user to generate a final user virtual representation (e.g., final user virtual representation 847) of the user of the client device 1002. The scene composition system 722 can then generate the target view frame 757, process the target view frame 757 as discussed above, and transmit the target view frame 757 (e.g., after being encoded by the video encoder 730) to the client device 1004.

As discussed above with respect to FIG. 7, the video decoder 732 of the client device 1004 can decode the encoded target view frame 757 using an inverse of the video coding technique performed by the video encoder 730 (e.g., according to a video codec, such as AVC. HEVC, VVC, etc.). The re-projection engine 734 can perform re-projection to re-project the virtual content of the decoded target view frame according to the predicted pose determined by the future pose prediction engine 738. The re-projected target view frame can then be displayed on a display 736 so that the user of the client device 1004 can view the virtual scene from that user's perspective.

Figure 11:
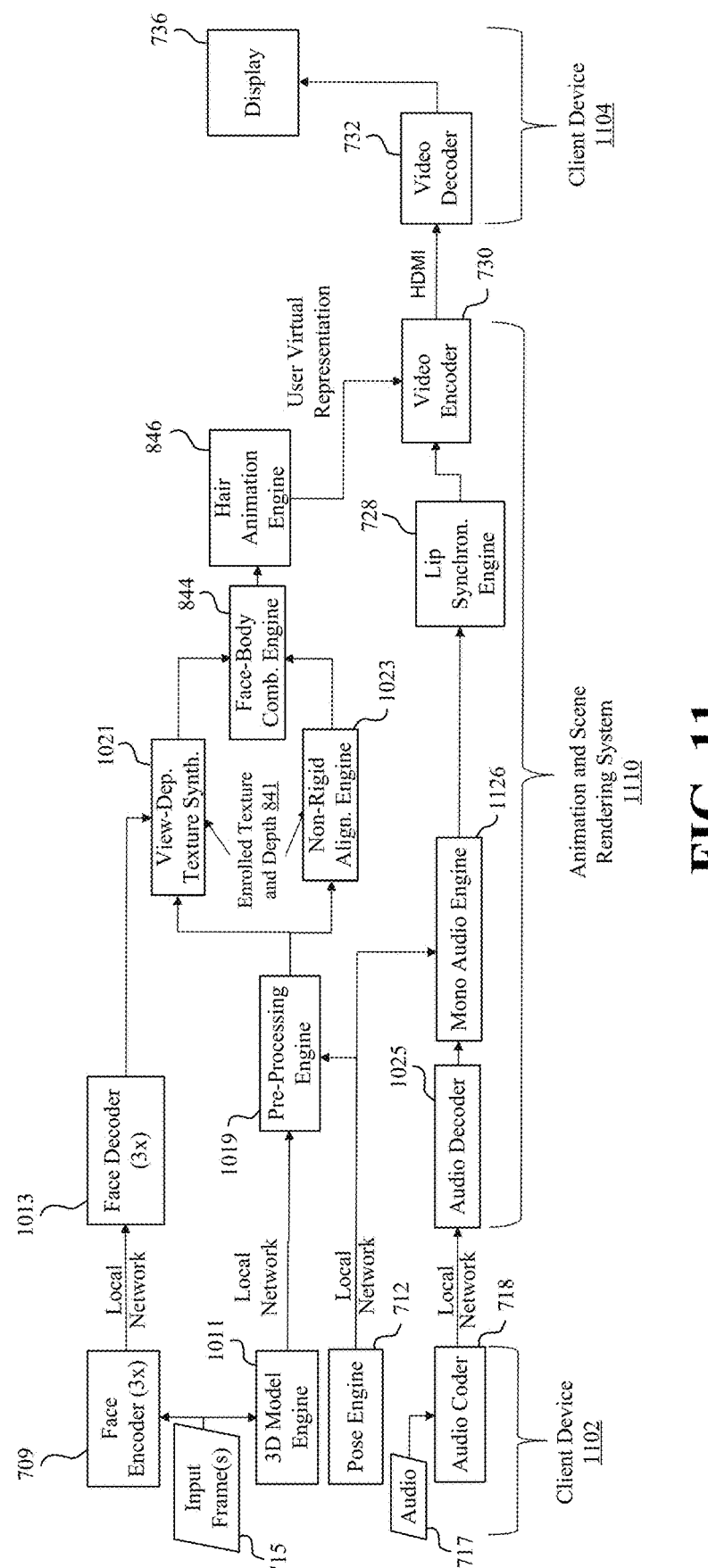
FIG. 11 is a diagram illustrating another example of an XR system including an animation and scene rendering system in communication with client devices, according to aspects of the disclosure.

FIG. 11 illustrates another example of an XR system 1100 configured to perform aspects described herein. As shown in FIG. 11, the XR system 1100 includes some of the same components (with like numerals) as the XR system 700 of FIG. 7 and/or the XR system 1000 of FIG. 10, and also includes additional or alternative components as compared to the XR system 700 and the XR system 1000. The face engine 709, the face decoder 1013, the geometry encoder engine 1011, the pose engine 712, the pre-processing engine 1019, the view-dependent texture synthesis engine 1021, the non-rigid alignment engine 1023, the face-body combiner engine 844, the hair animation engine 846, the audio coder 718, and other like components are configured to perform the same or similar operations as the same components of the XR system 700 of FIG. 7 or the XR system 1000 of FIG. 10.

The XR system 1100 may be similar to the XR systems 700 and 1000 in that a client device 1102 and a client device 1104 participating in a virtual session (in some cases with other client devices not shown in FIG. 11). The XR system 1100 may be different from the XR systems 700 and 1000 in that the client device 1104 may be local to an animation and scene rendering system 1110. For instance, the client device 1104 may be communicatively connected to the animation and scene rendering system 1110 using a local connection, such as a wired connection (e.g., a high-definition multimedia interface (HDMI) cable, etc.). In one illustrative example, the client device 1104 may be a television, a computer monitor, or other device other than an XR device. In some cases, the client device 1104 (e.g., television, computer monitor, etc.) may be configured to display 3D content.

The client device 1102 may send information to the animation and scene rendering system 1110 via a network (e.g., a local network, RTC network, or other wireless network). The animation and scene rendering system 1110 can generate an animated virtual representation (or avatar) of a user of the client device 1102 for a virtual scene from the perspective of a user of the client device 1104 and can output the animated virtual representation to the client device 1104 via the local connection.

In some aspects, the animation and scene rendering system 1110 may include a mono audio engine 1126 instead of the spatial audio engine 726 of FIG. 7 and FIG. 10. In some cases, the animation and scene rendering system 1110 may include a spatial audio engine. In some cases, the animation and scene rendering system 1110 may include the spatial audio engine 726.

FIG. 12 illustrates an example of a process 1200 for generating virtual content at a first device of a distributed system. According to aspects described herein, the first device may include an animation and scene rendering system (e.g., an edge or cloud-based server, a personal computer acting as a server device, a mobile device such as a mobile phone acting as a server device, an XR device acting as a server device, a network router, or other device acting as a server or other device). Illustrative examples of the animation and scene rendering system include the animation and scene rendering system 710 of FIG. 7, the animation and scene rendering system 1010 of FIG. 10, and the animation and scene rendering system 1110 of FIG. 11. In some examples, a component (e.g., a chipset, processor, memory, any combination thereof, and/or other component may perform one or more of the operations of the process 1200).

At block 1202, the first device (or component thereof) may receive, from a second device associated with a virtual session, input information associated with at least one of the second device or a user of the second device. In some aspects, the input information includes information representing a face of the user of the second device, information representing a body of the user of the second device, information representing one or more hands of the user of the second device, pose information of the second device, audio associated with an environment in which the second device is located, any combination thereof, and/or other information. In some cases, the information representing the body of the user of the second device includes a pose of the body. In some examples, the information representing the one or more hands of the user of the second device includes a respective pose of each hand of the one or more hands.

At block 1204, the first device (or component thereof) may generate, based on the input information, a virtual representation of the user of the second device. In some aspects, to generate the virtual representation, the first device (or component thereof) may generate a virtual representation of a face of the user of the second device using the information representing the face of the user, the pose information of the second device, and pose information of the third device. The first device (or component thereof) may further generate a virtual representation of a body of the user of the second device using the pose information of the second device and pose information of the third device. The first device (or component thereof) may generate a virtual representation of hair of the user of the second device. In some cases, the first device (or component thereof) is configured to generate the virtual representation of the body of the user of the second device further using the information representing the body of the user. In some examples, the first device (or component thereof) is configured to generate the virtual representation of the body of the user of the second device further using inverse kinematics. In some cases, the first device (or component thereof) is configured to generate the virtual representation of the body of the user of the second device further using the information representing the one or more hands of the user. In some aspects, the first device (or component thereof) may combine the virtual representation of the face with the virtual representation of the body to generate a combined virtual representation. The first device (or component thereof) may add the virtual representation of the hair to the combined virtual representation.

At block 1206, the first device (or component thereof) may generate a virtual scene from a perspective of a user of a third device associated with the virtual session. The virtual scene includes the virtual representation of the user of the second device. In some aspects, to generate the virtual scene, the first device (or component thereof) may obtain a background representation of the virtual scene and adjust, based on the background representation of the virtual scene, lighting of the virtual representation of the user of the second device to generate a modified virtual representation of the user. To generate the virtual scene, the first device (or component thereof) may combine the background representation of the virtual scene with the modified virtual representation of the user.

At block 1208, the first device may transmit (or a component thereof may output for transmission), to the third device, one or more frames depicting the virtual scene from the perspective of the user of the third device.

In some aspects, the first device (or component thereof) may generate, based on input information from the third device, a virtual representation of the user of the third device. The first device (or component thereof) may generate a virtual scene including the virtual representation of the user of the third device from a perspective of the user of second device. The first device may further transmit (or a component thereof may output for transmission), to the second device, one or more frames depicting the virtual scene from the perspective of the user of the second device.

In some cases, the devices or apparatuses configured to perform the operations of the process 1200 and/or other processes described herein may include a processor, micro-processor, microcomputer, or other component of a device that is configured to carry out the steps of the process 1200 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 1200 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1200 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1200 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

As described above, virtual representations (e.g., avatars) are an important component of virtual environments. A virtual representation (or avatar) is a 3D representation of a user and allows the user to interact with the virtual scene. There are different ways to represent a virtual representation of a user (e.g., an avatar) and corresponding animation data.

For example, avatars may be purely synthetic or may be an accurate representation of the user (e.g., as shown by the virtual representations 202, 204, etc. shown in the 3D collaborative virtual environment 200 of FIG. 2). A virtual representation (or avatar) may need to be captured in real-time or retargeted to reflect a user's actual motion, body pose, facial expression, etc.

Figure 13:
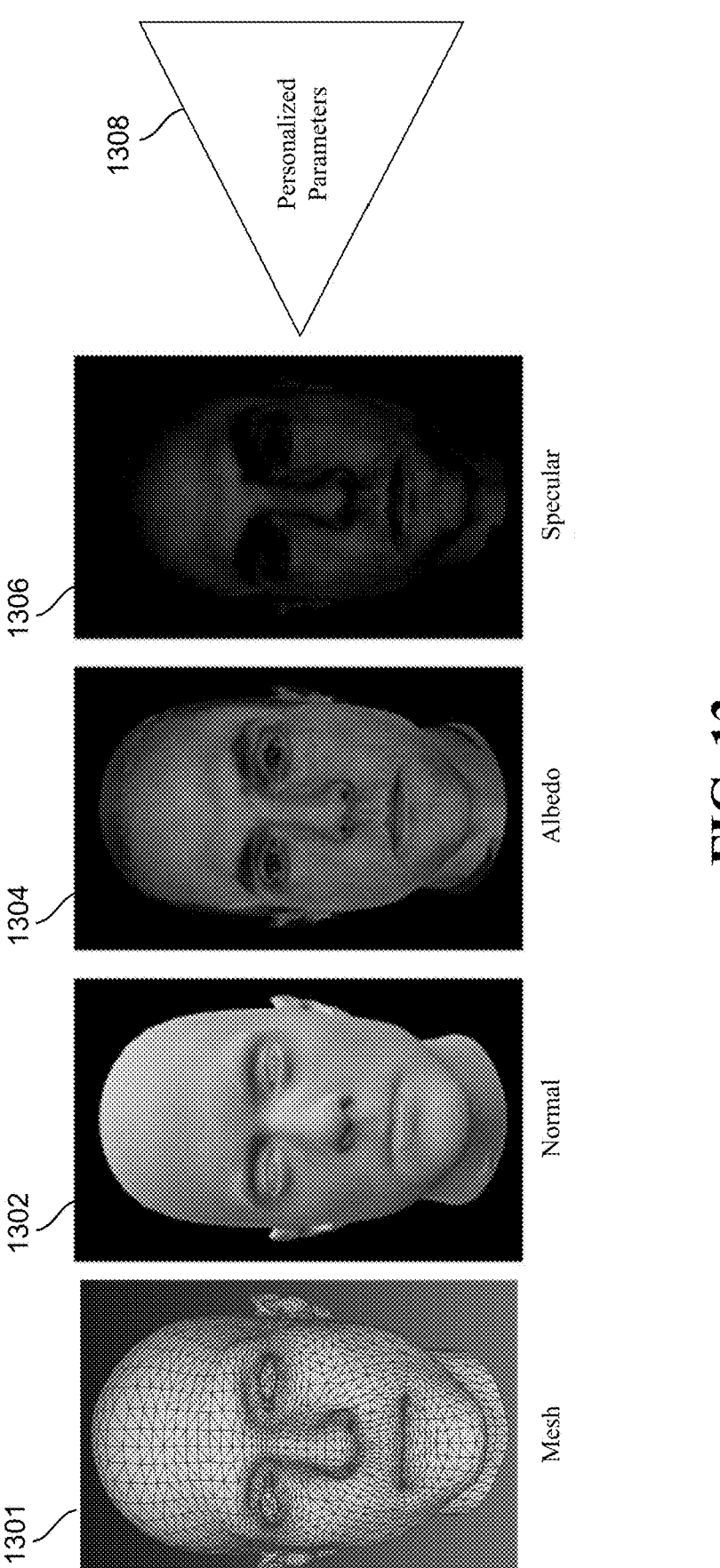
FIG. 13 is a diagram illustrating an example of a mesh of a user, an example of a normal map of the user, an example of an albedo map of the user, an example of a specular reflection map of the user, and an example of personalized for the user, according to aspects of the disclosure.

Various animation assets may be needed to model a virtual representation or avatar and/or to generate an animation of the virtual representation or avatar. For example, one or more meshes (e.g., including a plurality of vertices, edges, and/or faces in three-dimensional space) with corresponding materials may be used to represent an avatar of a user. The materials may include a normal texture (e.g., represented by a normal map), a diffuse or albedo texture, a specular reflection texture, any combination thereof, and/or other materials or textures. For instance, an animated avatar is an animated mesh and the corresponding assets (e.g., normal, albedo, specular reflection, etc.) for every frame. FIG. 13 is a diagram illustrating an example of a mesh 1301 of a user, an example of a normal map 1302 of the user, an example of an albedo map 1304 of the user, an example of a specular reflection map 1306 of the user, and an example of personalized parameters 1308 for the user. For example, the personalized parameters 1308 can be neural network parameters (e.g., weights, biases, etc.) that can be retrained beforehand, fine-tuned, or set by the user. The various materials or textures may need to be available from enrollment or offline reconstruction.

In some aspects, assets can be either view dependent (e.g., generated for a certain view pose) or can be view independent (e.g., generated for all possible view poses). In some cases, realism may be compromised for view independent assets.

A goal of generating an avatar for a user is to generate a mesh with the various materials (e.g., normal, albedo, specular reflection, etc.) for the user. In some cases, a mesh must be of a known topology. However, meshes from scanners (e.g., LightCage, 3DMD, etc.) may not satisfy such a constraint. To solve such an issue, a mesh can be retopologized after scanning, which would make the mesh parametrized. FIG. 14A is a diagram illustrating an example of a raw (non-retopologized) mesh 1402. FIG. 14B is a diagram illustrating an example of a retopologized mesh 1404. Retopologizing a mesh for a virtual representation or avatar results in the mesh becoming parametrized with a number of animation parameters that define how the avatar will be animated during a virtual session.

Figure 15:
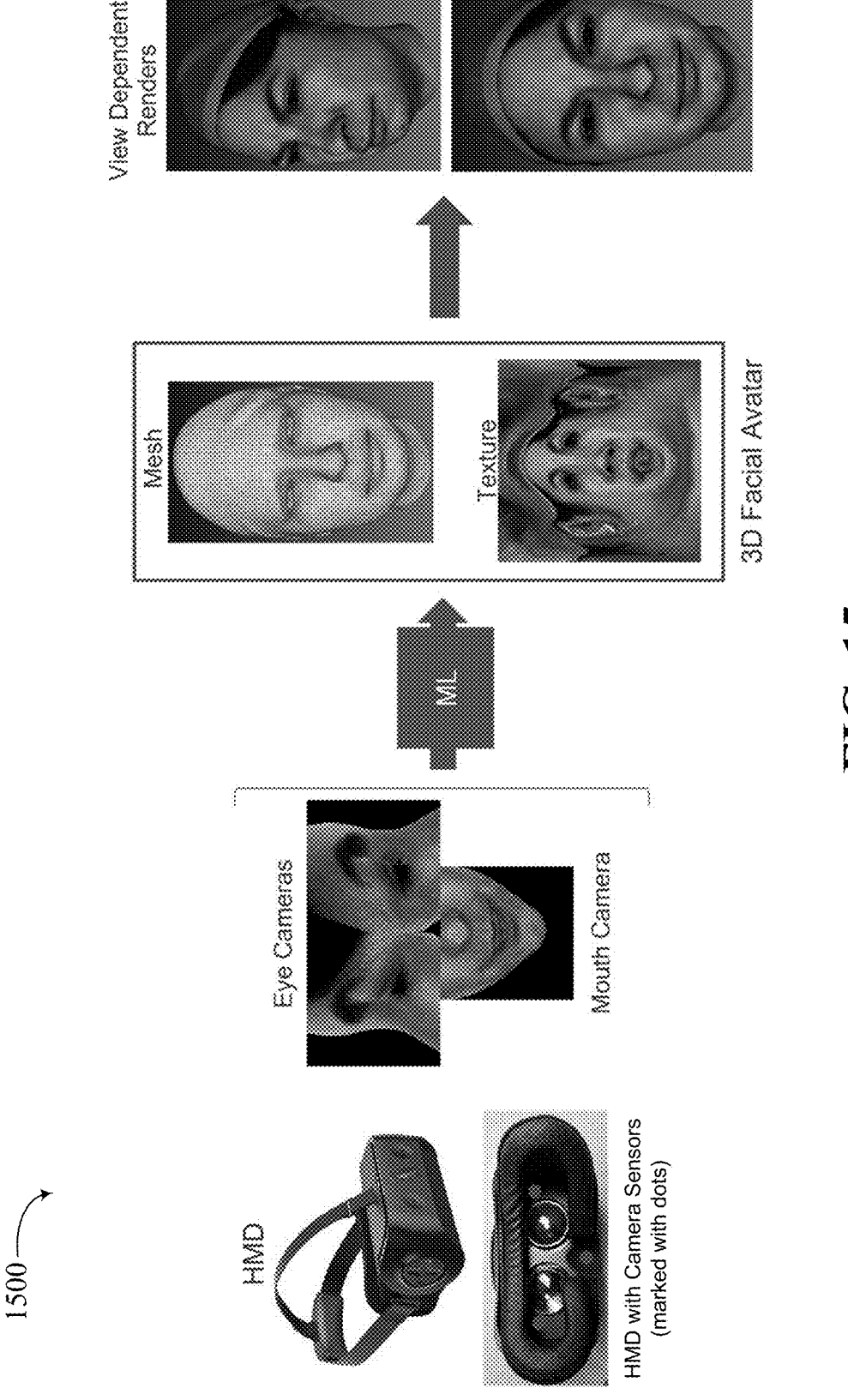
FIG. 15 is a diagram illustrating an example of a technique for performing avatar animation, according to aspects of the disclosure.

Animation of a virtual representation (e.g., avatar) can be performed using various techniques. FIG. 15 is a diagram 1500 illustrating an example of one technique for performing avatar animation. As shown, camera sensors of a head-mounted display (HMD) are used to capture images of a user's face, including eye cameras used to capture images of the user's eyes, face cameras used to capture the visible part of the face (e.g., mouth, chin, checks, part of the nose, etc.), and other sensors for capturing other sensor data (e.g., audio, etc.). A machine learning (ML) model (e.g., a neural network model) can process the images to generate a 3D mesh and texture for the 3D facial avatar. The mesh and texture can then be rendered by a rendering engine to generate a rendered image (e.g., view-dependent renders, as shown in FIG. 15).

Large data transmission rates may be needed to transmit mesh information and animation parameters for a mesh between devices for animation of an avatar to facilitate an interactive virtual experience between users. For instance, the parameters may need to be transmitted from one device of a first user to a second device of a second user for every frame at a frame rate of 30-60 frames per second (FPS) so that the second device can animate the avatar for each frame being rendered at the frame rate.

As discussed previously, systems and techniques are also described herein for providing an efficient communication framework for virtual representation calls for a virtual environment (e.g., a metaverse virtual environment). In some aspects, a flow for setting up an avatar call can be performed directly between client devices (also referred to as user devices) or can be performed via a server.

Figure 16:
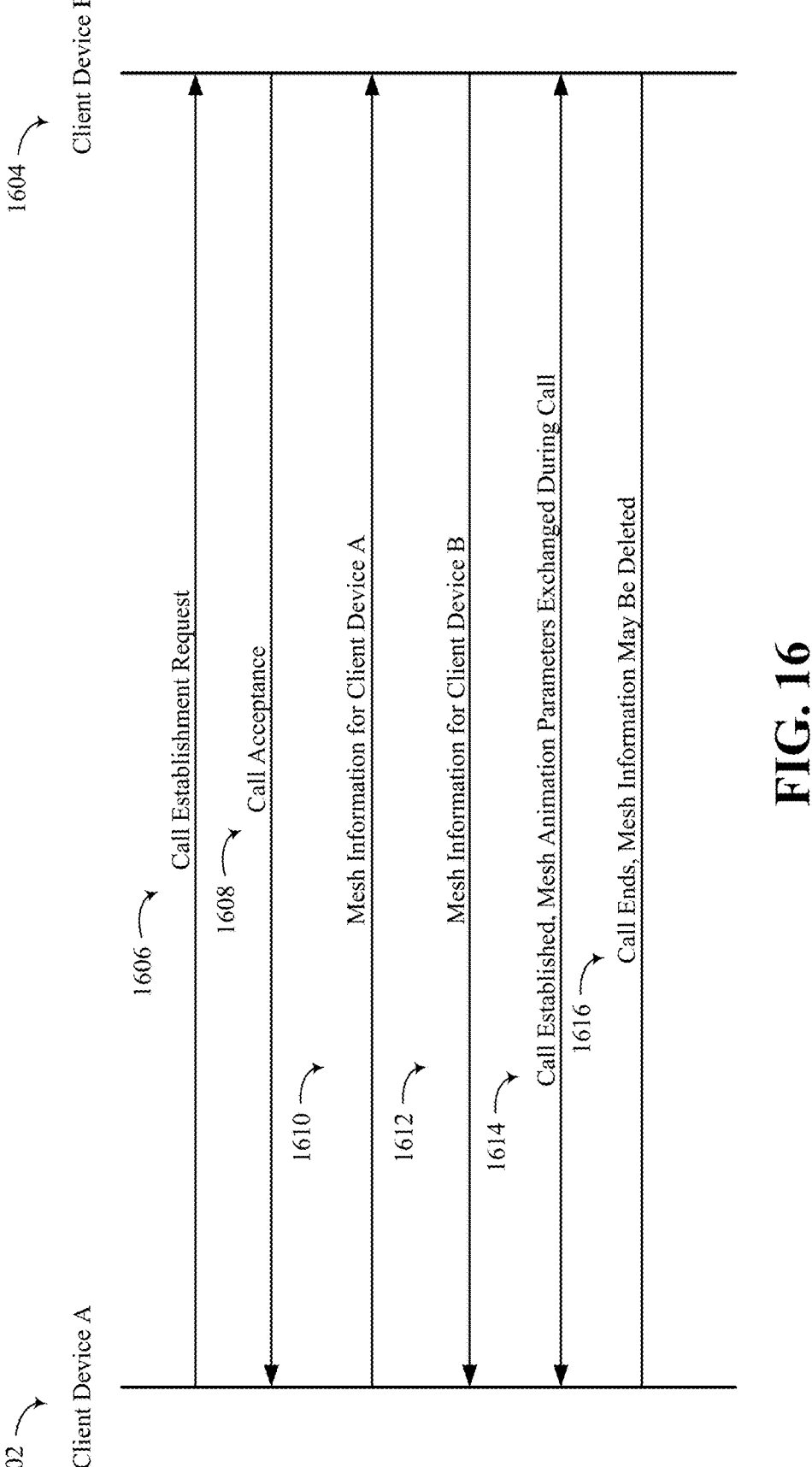
FIG. 16 is a diagram illustrating an example of an avatar call flow directly between client devices, according to aspects of the disclosure.

FIG. 16 is an example of an avatar call flow directly between client devices, including a first client device 1602 (shown as client device A, also referred to as user A) of a first user and a second client device 1604 (shown as client device B, also referred to as user B) of a second user. In one illustrative example, the first client device 1602 is a first XR device (e.g., an HMD configured to display VR, AR, and/or other XR content) and the second client device 1604 is a second XR device (e.g., an HMD configured to display VR, AR, and/or other XR content). While two client devices are shown in FIG. 16, the call flow of FIG. 16 can be between the first client device 1602 and multiple other client devices. As shown, the first client device 1602 can establish an avatar call between the first client device 1602 and the second client device 1604 by transmitting a call establishment request 1606 to the second client device 1604 to establish the avatar call. The second client device 1604 can accept the avatar call, such as based on a user input from the second user accepting an invitation to participate in a virtual session (e.g., a 3D collaborative virtual meeting in a metaverse environment, a computer or virtual game, or other virtual session) with the first user and in some cases one or more other users. The second client device 1604 can transmit a call acceptance 1608 indicating acceptance of the avatar call.

Upon acceptance of the avatar call, the first client device 1602 can provide (e.g., transmit, etc.) mesh information 1610 to the second client device 1604 (e.g., to a secure location on the second client device 1604). The mesh information defines the avatar (or other virtual representation) for the first user for use in participating in the virtual session (e.g., 3D collaborative virtual meeting, computer or virtual game, etc.) between the first and second users and in some cases one or more other users. In some cases, the mesh information can include information defining the mesh (or geometry) of the avatar of the first user, such as vertices, edges, and/or faces of the mesh. The mesh information can further include assets, such as information defining texture and/or materials of the mesh. For instance, the assets can include a normal map defining the normal texture for the mesh (e.g., the normal map 1302 of FIG. 13), an albedo map defining the diffuse or albedo texture for the mesh (e.g., the albedo map 1304 of FIG. 13), a specular reflection map defining the specular reflection texture for the mesh (e.g., the specular reflection map 1306 of FIG. 13), any combination thereof, and/or other materials or textures. In some cases, the assets can be obtained during an enrollment process during which the asset information (e.g., normal, albedo, specular reflection, etc.) can be obtained for the user (e.g., via one or more captured images).

The second client device 1604 can also provide (e.g., transmit, etc.) mesh information 1612 defining an avatar (or other virtual representation) for the second user to the first client device 1602 (e.g., to a secure location on the first client device 1602). Similar to the mesh information 1610, the mesh information 1612 for the second user can include information defining the mesh of the avatar and other assets (e.g., a normal map, an albedo map, a specular reflection map, etc.) associated with the avatar of the second user. In some aspects, the mesh information can be compressed.

In some aspects, the mesh information 1610 and the mesh information 1612 may only be provided (e.g., transmitted, etc.) a single time at the start of the call. After the first client device 1602 obtains the mesh information 1612 for the second user and the second client device 1604 obtains the mesh information 1610 for the first user, the first and second client devices 1602, 1604 may only need to exchange mesh animation parameters 1614 during the avatar call. For example, once the call is established between the first client device 1602 and the second client device 1604, the first and second client devices 1602, 1604 can exchange mesh animation parameters during the call so that the first client device 1602 can animate the avatar of the second user and the second client device 1604 can animate the avatar of the first user during the virtual session.

The virtual session can be rendered as a plurality of frames. The mesh animation parameters can include, for each frame of the plurality of frames making up the virtual session, information representing a face of the first user of the first client device 1602 (e.g., codes or features representing an appearance of the face or other information, such as that described with respect to FIG. 7, FIG. 10, etc.), information representing a body of the first user of the first client device 1602 (e.g., codes or features representing an appearance of the body, a pose of the body, or other information, such as that described with respect to FIG. 7, FIG. 10, etc.), information representing one or more hands of the first user of the first client device 1602 (e.g., codes or features representing an appearance of the hand(s), a pose of the hand(s), or other information, such as that described with respect to FIG. 7, FIG. 10, etc.), pose information of the first client device 1602 (e.g., a pose in six-degrees-of-freedom (6-DOF), referred to as a 6-DOF pose, such as that described with respect to FIG. 7, FIG. 10, etc.), audio associated with an environment in which the first client device 1602 is located such as that described with respect to FIG. 7, FIG. 10, etc., and/or other information. In some aspects, the mesh animation parameters can be compressed.

In some aspects, an animation and scene rendering system (e.g., similar to the animation and scene rendering system 710 of FIG. 7, the animation and scene rendering system 1010 of FIG. 10, the animation and scene rendering system 1110 of FIG. 11, etc.) of the second client device 1604 can process the mesh information 1610 and the animation parameters from the first client device 1602 to generate and/or animate the avatar for the first user during the virtual session. Similarly, an animation and scene rendering system of the first client device 1602 can process the mesh information 1612 and the animation parameters from the second client device 1604 to generate and/or animate the avatar for the second user during the virtual session.

Once the virtual session is completed, the avatar call ends 1616. In some cases, upon ending of the avatar call, the mesh information can be deleted by the first client device 1602 and the second client device 1604.

Figure 17:
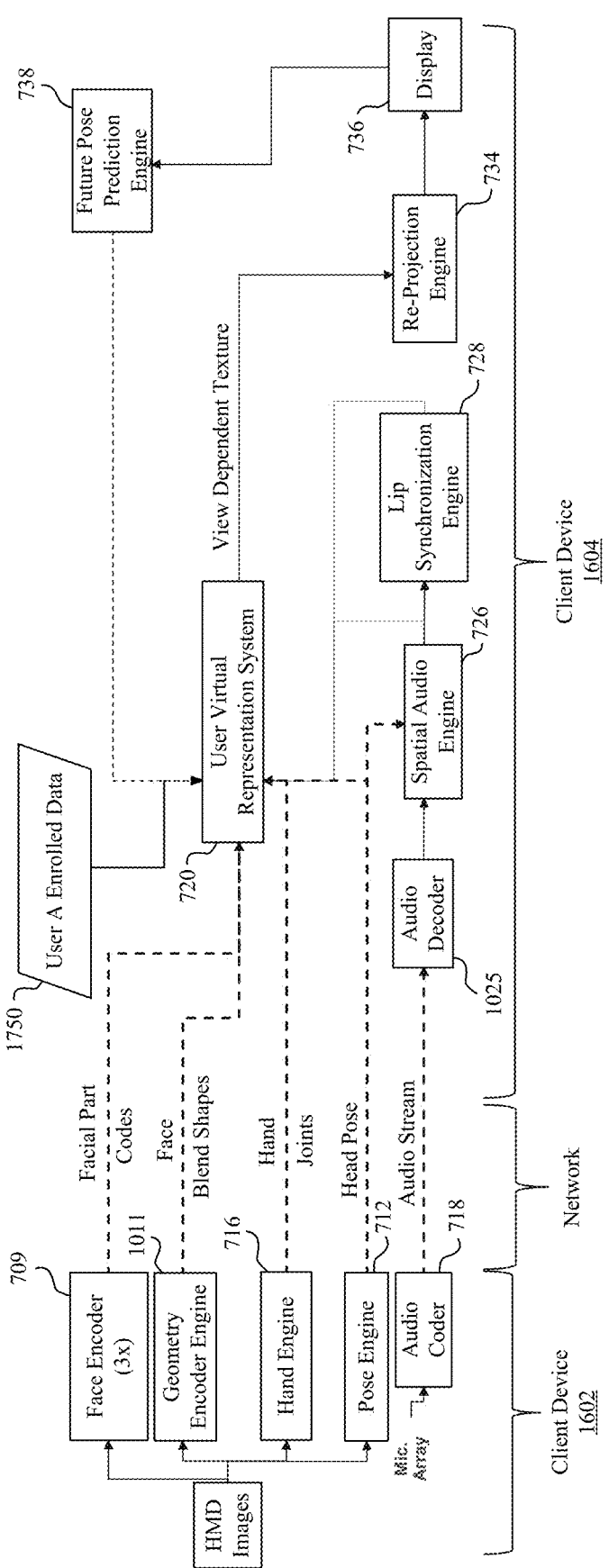
FIG. 17 is a diagram illustrating an example of an XR system configured to perform aspects described herein.
Figure 25:
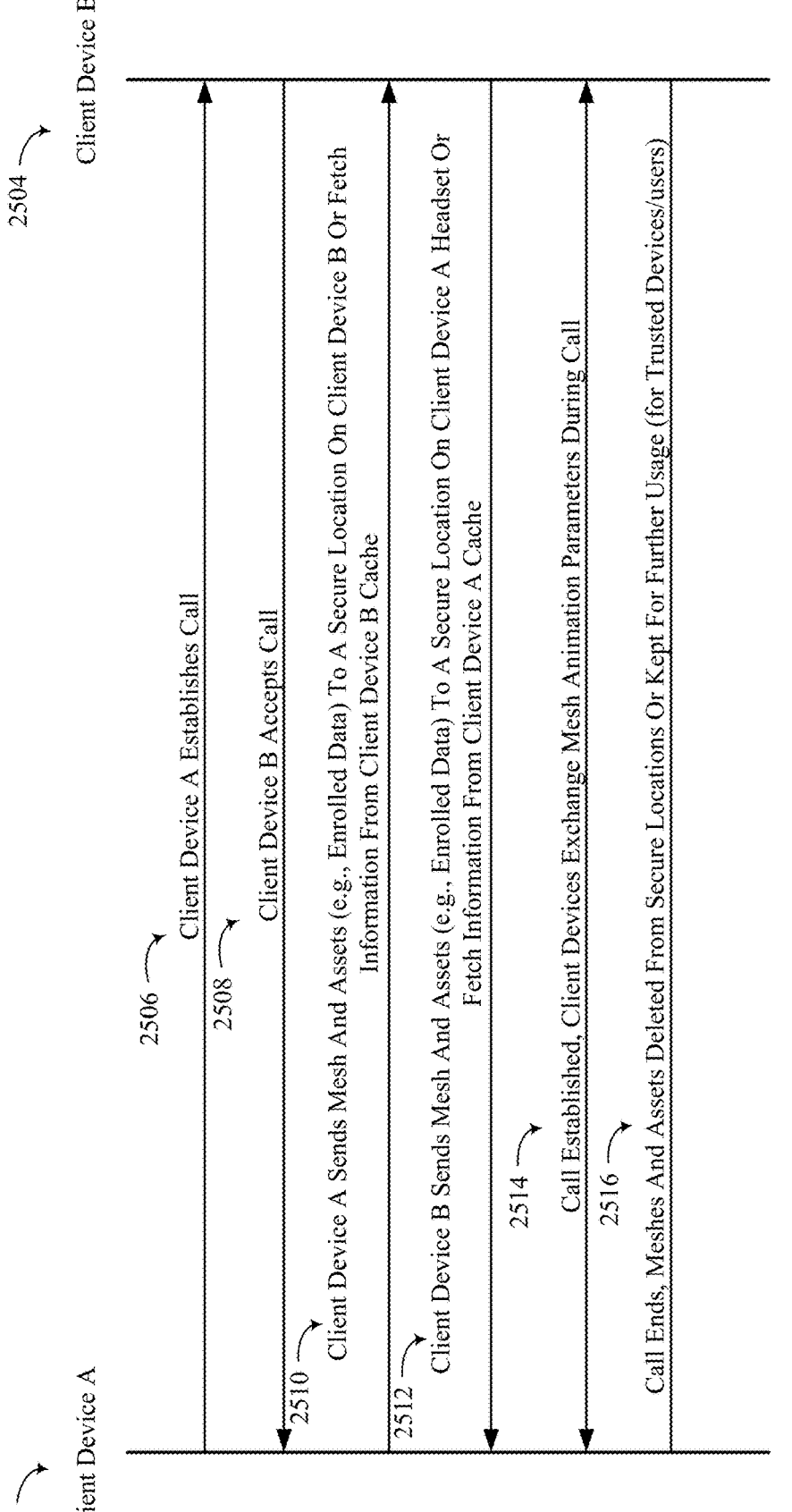
FIG. 25 is an example of a device-to-device call flow for setting up an avatar call between client devices with no edge server and a decoder on a target device for view-dependent and/or view-independent textures, according to aspects of the disclosure.

FIG. 17 is a diagram illustrating an example of an example of an XR system 1700 configured to perform aspects described herein, such as operations associated with the avatar call flow of FIG. 16 and/or FIG. 25. As shown in FIG. 17, the XR system 1700 includes some of the same components (with like numerals) as the XR system 700 of FIG. 7 and the XR system 1000 of FIG. 10. The face encoder 709, the pose engine 712, the hand engine 716, the audio coder 718, the user virtual representation system 720, the spatial audio engine 726, the lip synchronization engine 728, the re-projection engine 734, the display 736, the future pose projection engine 738, the geometry encoder engine 1011, and the audio decoder 1025 are configured to perform the same or similar operations as the same components of the XR system 700 of FIG. 7 and/or the XR system 1000 of FIG. 10. The XR system 1700 may also include components from FIG. 7, FIG. 10, FIG. 11, and/or FIG. 12 that are not shown in FIG. 17, such as the scene composition system 722, the pre-processing engine 1019, and/or other components.

As shown in FIG. 17, the user virtual representation system 720 can use enrolled data 1750 of the first user (user A) of the first client device 1602 to generate a virtual representation (e.g., an avatar) for the first user. The enrolled data 1750 of the first user can include the mesh information 1610 of FIG. 16. As described with respect to FIG. 16, the mesh information 1610 can include information defining the mesh of the avatar of the first user of the first client device 1602 and other assets associated with the avatar (e.g., a normal map, an albedo map, a specular reflection map, etc.). The mesh animation parameters 1614 described with respect to FIG. 16 can include the facial part codes from the face encoder 709 of FIG. 17, the face blend shapes from the geometry encoder engine 1011 (which may include a 3DMM head encoder in some cases) of FIG. 17, the hand joints codes from the hand engine 716 of FIG. 17, the head pose from the pose engine 712 of FIG. 17, and in some cases the audio stream from the audio coder 718 of FIG. 17.

Figure 18:
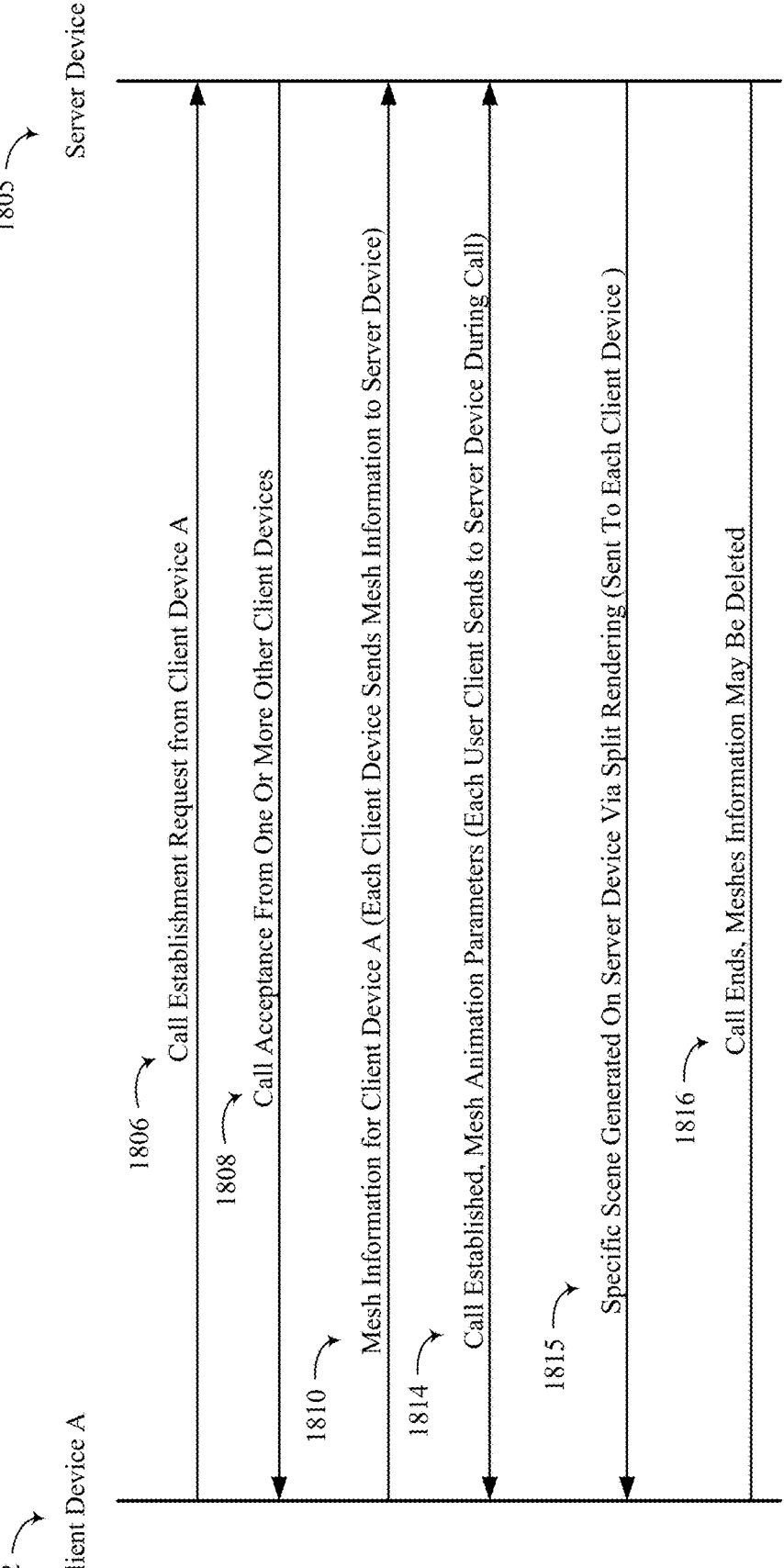
FIG. 18 is a diagram illustrating an example of an avatar call flow for setting up an avatar call between client devices utilizing a server device, according to aspects of the disclosure.

FIG. 18 is an example of an avatar call flow for setting up an avatar call between client devices utilizing a server device 1805. The communications of FIG. 18 are shown between a first client device 1802 (shown as client device A, also referred to as user A) and the server device 1805. While not shown, the server device 1805 is also in communication with one or more other client devices participating in a virtual session with the first client device 1802. The one or more other client devices can include at least a second client device of a second user. In one illustrative example, the first client device 1802 is a first XR device (e.g., an HMD configured to display VR, AR, and/or other XR content) and the second client device is a second XR device (e.g., an HMD configured to display VR, AR, and/or other XR content). The server device 1805 can include a secure or trusted server or multiple secure or trusted servers.

As shown, the first client device 1802 can establish an avatar call between the first client device 1802 and the one or more other client devices by transmitting a call establishment request 1806 to the server device 1805 to establish the avatar call. While the call flow of FIG. 18 includes the first client device 1802 initiating the call, any of the client devices can send the call establishment request 1806 to the server device 1805 to establish the avatar call. The server device 1805 can transmit the call establishment request 1806 to the one or more other client devices.

Any of the one or more other client devices (e.g., the second client device) can accept the avatar call. For instance, the second client device can accept the avatar call based on a user input from the second user accepting an invitation to participate in a virtual session (e.g., a 3D collaborative virtual meeting in a metaverse environment, a computer or virtual game, or other virtual session) with the first user and in some cases one or more other users of the one or more other devices. Any of the one or more other devices that accept the avatar call can transmit a call acceptance to the server device 1805, and the server device 1805 can send the call acceptance 1808 indicating acceptance of the avatar call to the first client device 1802.

Upon acceptance of the avatar call, the first client device 1802 can transmit mesh information 1810 to the server device 1805 (e.g., to a secure location on the server device 1805). The server device 1805 can provide (e.g., transmit, upload for access, etc.) the mesh information to the one or more other client devices. The mesh information defines the avatar (or other virtual representation) for the first user for use in participating in the virtual session (e.g., 3D collaborative virtual meeting, computer or virtual game, etc.) between the first user and the one or more other users. In some cases, the mesh information can include information defining the mesh (or geometry) of the avatar of the first user, such as vertices, edges, and/or faces of the mesh. The mesh information can further include assets, such as information defining texture and/or materials of the mesh. For instance, the assets can include a normal map defining the normal texture for the mesh (e.g., the normal map 1302 of FIG. 13), an albedo map defining the diffuse or albedo texture for the mesh (e.g., the albedo map 1304 of FIG. 13), a specular reflection map defining the specular reflection texture for the mesh (e.g., the specular reflection map 1306 of FIG. 13), any combination thereof, and/or other materials or textures. In some cases, the assets can be obtained during an enrollment process during which the asset information (e.g., normal, albedo, specular reflection, etc.) can be obtained for the user (e.g., via one or more captured images).

Each client device of the one or more client devices that accepted the call establishment request 1806 for the virtual session can provide their respective mesh information to the server device 1805. For example, the second client device can transmit mesh information defining an avatar (or other virtual representation) for the second user to the server device 1805 (e.g., to a secure location on the server device 1805). In some cases, the server device 1805 can provide the respective mesh information of each client device to the other client devices participating in the virtual session. In other cases, the server device 1805 can use the mesh information to render the scene for the virtual session.

In some aspects, the first client device 1802 (and in some cases the one or more other client devices) can register an account with the server device 1805 using a registration/setup procedure. In such aspects, the first client device 1802 can provide the mesh information 1810 once to the server device 1805. For example, the first client device 1802 can provide the mesh information 1810 as a part of the registration/setup procedure. This registration/setup procedure may be completed prior to establishment of a call. In some cases, the mesh information 1810 may be provided once during establishment of the call and the mesh information 1810 may be associated with an account during/after an account. For example, the account registration/setup may be completed at an end of a first call. The mesh information 1810 may be stored by the server device 1805. In some cases, the mesh information 1810 may be associated with an account for the first user of the client device 1802. After setting up the account and providing the mesh information 1810 to the server device 1805, the first user of the first client device 1802 can login to the account for authentication by the server device 1805 for future avatar calls without having to re-provide (e.g., re-upload, re-transmit, etc.) the mesh information 1810 to the server device 1805. For example, the client device 1802 may not provide the mesh information 1810 to the server device 1805 when establishing a call if the mesh information 1810 was previously provided to, and stored by, the server device 1805. Instead, the client device

1802 may, when establishing a call, authenticate with the server device 1805 and the server device 1805 may retrieve the stored mesh information 1810 for use in the call. Of note, the mesh information 1810 provided to the server device 1805 may not be stored on the server device 1805 itself, but rather may be stored on another server device/trusted server/cloud storage/other storage device/service, etc. that is accessible to the server device 1805. In some cases, the first client device 1802 can provide any updates to the mesh information 1810 to the server device 1805.

In some aspects, for a particular avatar call, the mesh information 1810 (and mesh information from the one or more other client devices) may be provided to the server device 1805 once at the start of the avatar call. After the first client device 1802 and the one or more other devices provide their respective mesh information to the server device 1805, the first client device 1802 and the one or more other devices may only need to provide mesh animation parameters 1814 to the server device 1805 during the avatar call. In some cases, once the call is established between the first client device 1802 and the second client device, the first client device 1802 and the second client device can exchange mesh animation parameters via the server device 1805 during the call so that the first client device 1802 can animate the avatar of the second user and the second client device can animate the avatar of the first user during the virtual session. In other cases, the server device 1805 can use the animation parameters (and the mesh information) of the various client devices to render the avatars for the first client device 1802 and the one or more other client devices and the scene for the virtual session from the perspective of the various client devices.

The virtual session can be rendered as a plurality of frames. The mesh animation parameters can include, for each frame of the plurality of frames making up the virtual session, information representing a face of the first user of the first client device 1802 (e.g., codes or features representing an appearance of the face or other information, such as that described with respect to FIG. 7, FIG. 10, etc.), information representing a body of the first user of the first client device 1802 (e.g., codes or features representing an appearance of the body, a pose of the body, or other information, such as that described with respect to FIG. 7, FIG. 10, etc.), information representing one or more hands of the first user of the first client device 1802 (e.g., codes or features representing an appearance of the hand(s), a pose of the hand(s), or other information, such as that described with respect to FIG. 7, FIG. 10, etc.), pose information of the first client device 1802 (e.g., a pose in six-degrees-of-freedom (6-DOF), referred to as a 6-DOF pose, such as that described with respect to FIG. 7, FIG. 10, etc.), audio associated with an environment in which the first client device 1802 is located such as that described with respect to FIG. 7, FIG. 10, etc., and/or other information. In some aspects, the mesh animation parameters can be compressed.

In some aspects, as noted above, the server device 1805 can use the animation parameters (and the mesh information) of the various client devices to render the avatars for the first client device 1802 and the one or more other client devices and the scene for the virtual session from the perspective of the various client devices. For instance, as shown in FIG. 18, the server device 1805 can provide (e.g., transmit, upload for access, etc.) a specific scene generated by the server device 1805 via split rendering 1815 to the first client device 1802 and to the one or more other client devices. For example, using the mesh information 1810 and the mesh animation parameters for the first client device 1802, the server device 1805 can generate a rendering of an avatar of the first user of the first client device 1802 from the perspective of second user of the second client device. In other aspects, each client device can render avatars of the one or more other users of the one or more other client devices. For instance, in such aspects, an animation and scene rendering system (e.g., similar to the animation and scene rendering system 710 of FIG. 7, the animation and scene rendering system 1010 of FIG. 10, the animation and scene rendering system 1110 of FIG. 11, etc.) of the of the first client device 1802 can process the mesh information 1812 and the animation parameters from the one or more other client devices to generate and/or animate the avatar for the one or more other users during the virtual session.

Once the virtual session is completed, the avatar call ends 1816. In some cases, upon ending of the avatar call, the mesh information can be deleted by the server device 1605.

Figure 19:
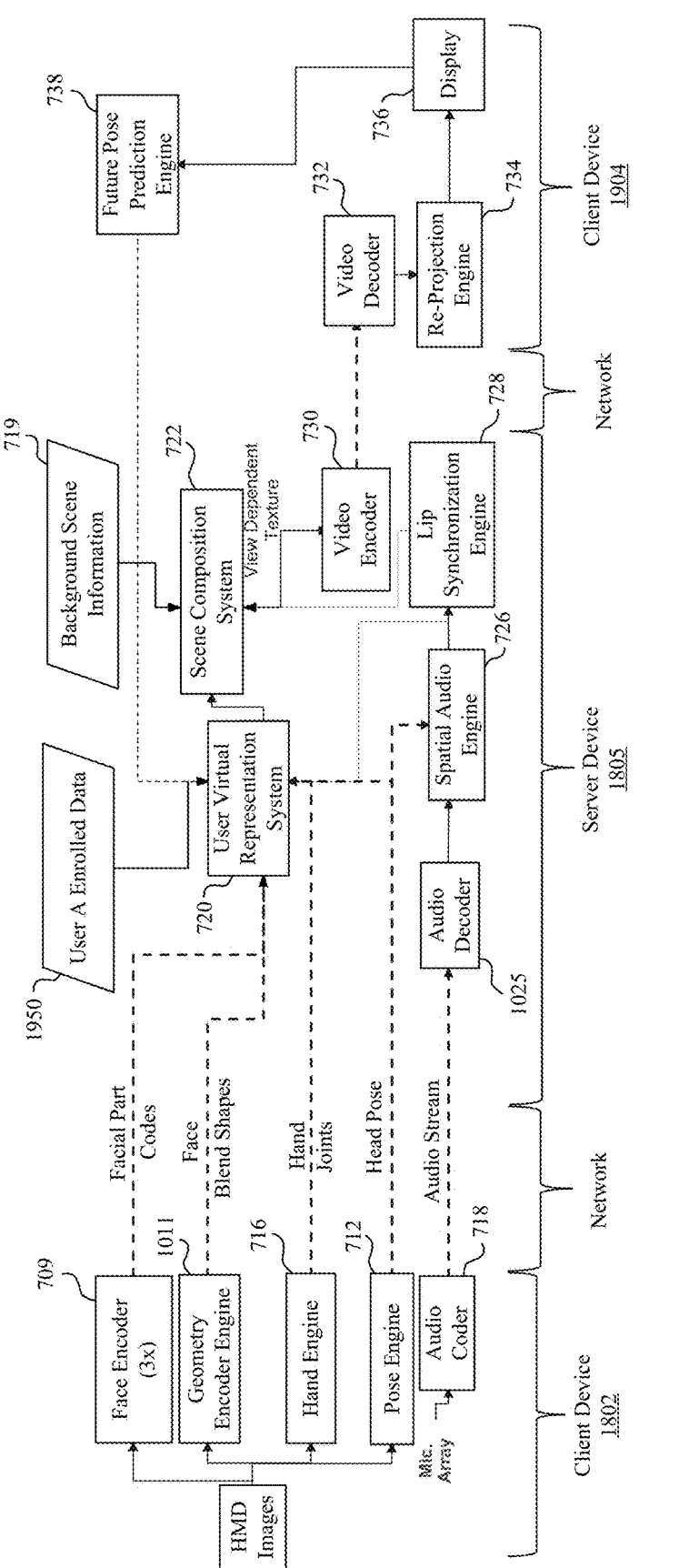
FIG. 19 is a diagram illustrating another example of an XR system configured to perform aspects described herein, according to aspects of the disclosure.

FIG. 19 is a diagram illustrating an example of an example of an XR system 1900 configured to perform aspects described herein, such as operations associated with the avatar call flow of FIG. 18. As shown in FIG. 19, the XR system 1900 includes some of the same components (with like numerals) as the XR system 700 of FIG. 7 and the XR system 1000 of FIG. 10. The face encoder 709, the pose engine 712, the hand engine 716, the audio coder 718, the background scene information 719, the user virtual representation system 720, the scene composition system 722, the spatial audio engine 726, the lip synchronization engine 728, the video encoder 730, the video decoder 732, the re-projection engine 734, the display 736, the future pose projection engine 738, the geometry encoder engine 1011, and the audio decoder 1025 are configured to perform the same or similar operations as the same components of the XR system 700 of FIG. 7 and/or the XR system 1000 of FIG. 10. The XR system 1900 may also include components from FIG. 7, FIG. 10, FIG. 11, and/or FIG. 12 that are not shown in FIG. 19, such as the pre-processing engine 1019 and/or other components.

As shown in FIG. 19, the user virtual representation system 720 can use enrolled data 1950 of the first user (user A) of the first client device 1802 to generate a virtual representation (e.g., an avatar) for the first user. The enrolled data 1950 of the first user can include the mesh information 1810 of FIG. 18. As described previously, the mesh information 1810 can include information defining the mesh of the avatar of the first user of the first client device 1802 and other assets associated with the avatar (e.g., a normal map, an albedo map, a specular reflection map, etc., such as the mesh 1301, the normal map 1302, the albedo map 1304, the specular reflection map 1306, and/or the personalized parameters 1308 of FIG. 13). The mesh animation parameters described with respect to FIG. 18 can include the facial part codes from the face encoder 709 of FIG. 19, the face blend shapes from the geometry encoder engine 1011 (which may include a 3DMM head encoder in some cases) of FIG. 19, the hand joints codes from the hand engine 716 of FIG. 19, the head pose from the pose engine 712 of FIG. 19, and in some cases the audio stream from the audio coder 718 of FIG. 19.

Figure 20:
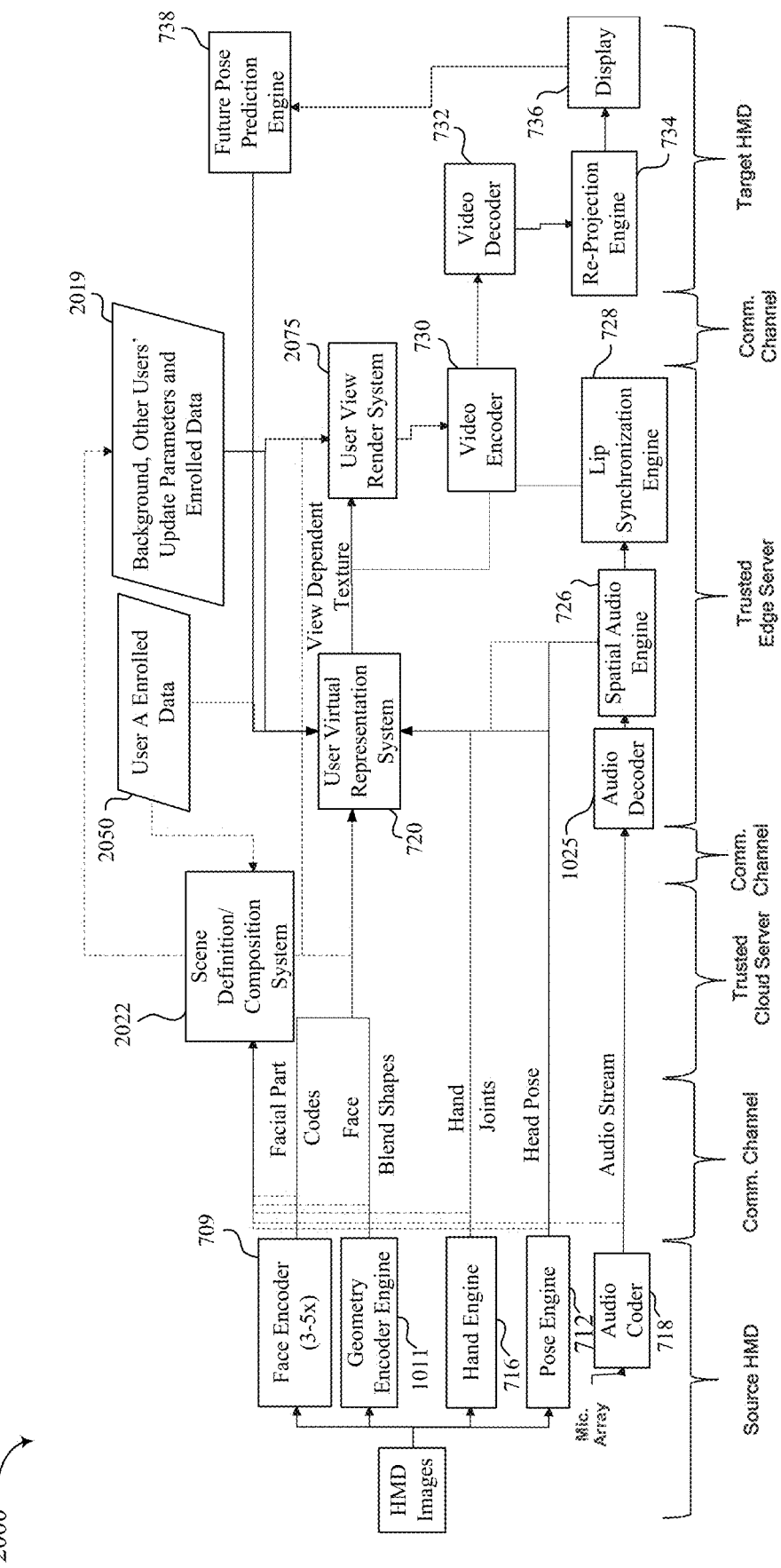
FIG. 20 is a diagram illustrating another example of an XR system configured to perform aspects described herein, according to aspects of the disclosure.

FIG. 20 is a diagram illustrating an example of an example of an XR system 2000 configured to perform aspects described herein, such as operations associated with the avatar call flow of FIG. 18. The XR system 2000 can be used when there are one or more view-dependent textures. For example, a view-dependent texture is an image that can be viewed only within certain poses, whereas a view-independent texture is an image that can be viewed irrespective of the pose of the person. For example, an image generated using a view-dependent texture may be valid (e.g., may be viewable) within a certain range of poses (e.g., for a certain number of degrees from a certain pose). If the pose of the person is shifted beyond this range, the image may have quality issues or no longer be viewable. In some cases, a more precise pose estimation may be used when generating view-dependent textures as view-dependent textures may only be valid within the certain range of poses. While view-dependent textures may be limited to a certain range of poses, view-dependent textures may be smaller in size as compared to view-independent textures and this allows for potential memory, bandwidth, and/or computational savings.

As shown in FIG. 20, the XR system 2000 includes some of the same components (with like numerals) as the XR system 700 of FIG. 7 and the XR system 1000 of FIG. 10. The face encoder 709, the pose engine 712, the hand engine 716, the audio coder 718, the user virtual representation system 720, the spatial audio engine 726, the lip synchronization engine 728, the video encoder 730, the video decoder 732, the re-projection engine 734, the display 736, the future pose projection engine 738, the geometry encoder engine 1011, and the audio decoder 1025 are configured to perform the same or similar operations as the same components of the XR system 700 of FIG. 7 and/or the XR system 1000 of FIG. 10. As shown, the XR system 2000 can use information 2019 to generate one or more virtual representations (e.g., avatars) by the user virtual representation system 720 and/or to render a view of the scene from the user's perspective by the user view rendering engine 2075, which includes background information (e.g., in some cases similar to the background scene information 719 of FIG. 7) and other users' (including one or more other users) update animation parameters and enrolled data. As shown in FIG. 20, the user virtual representation system 720 can use enrolled data 2050 of the first user (user A) to generate a virtual representation (e.g., an avatar) for the first user. The enrolled data 2050 of the first user can include the mesh information 1810 of FIG. 18, and the mesh information 1810 can include information defining the mesh of the avatar of the first user of the first client device 1802 and other assets associated with the avatar (e.g., a normal map, an albedo map, a specular reflection map, etc., such as the mesh 1301, the normal map 1302, the albedo map 1304, the specular reflection map 1306, and/or the personalized parameters 1308 of FIG. 13). The XR system 2000 also includes a scene definition/composition system 2022 that can be used to compose and/or define a scene for a virtual environment or session. The XR system 2000 is shown to include a trusted edge server that includes certain components. In some cases, the XR system 2000 may not include the edge server. In some examples, any of the XR systems of FIG. 7, FIG. 10, FIG. 11, and/or FIG. 17, and/or FIG. 19 can include an edge server as shown in FIG. 20. The XR system 2000 may also include components from FIG. 7, FIG. 10, and/or FIG. 11 that are not shown in FIG. 20, such as the pre-processing engine 1019 and/or other components.

Figure 21:
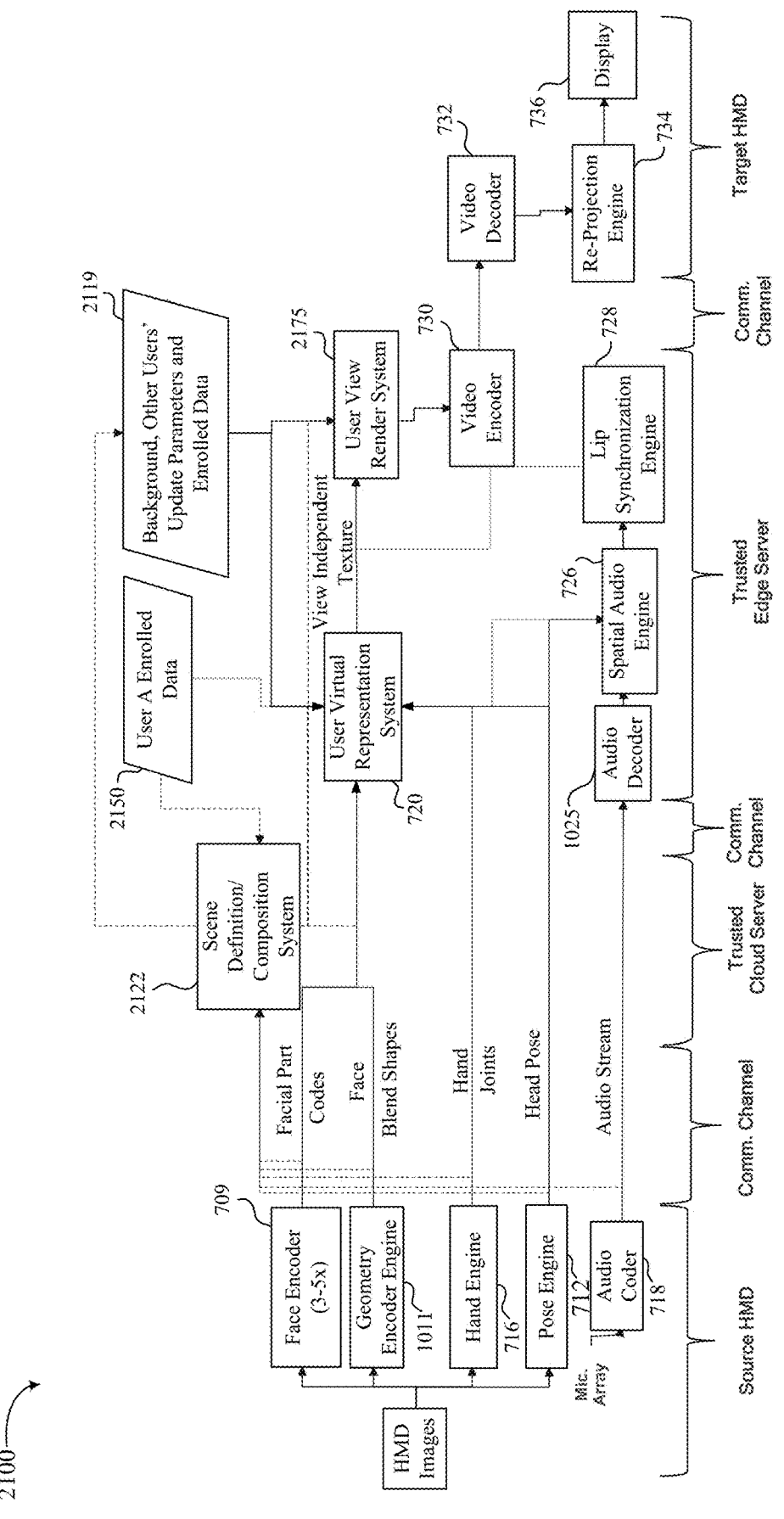
FIG. 21 is a diagram illustrating another example of an XR system configured to perform aspects described herein, according to aspects of the disclosure.

FIG. 21 is a diagram illustrating an example of an example of an XR system 2100 configured to perform aspects described herein, such as operations associated with the avatar call flow of FIG. 18. The XR system 2100 can be used when there are one or more view-independent textures. As noted above, a view-independent texture is an image that can be viewed irrespective of the pose of the person. As shown in FIG. 21, the XR system 2100 includes some of the same components (with like numerals) as the XR system 700 of FIG. 7 and the XR system 1000 of FIG. 10. The face encoder 709, the pose engine 712, the hand engine 716, the audio coder 718, the user virtual representation system 720, the spatial audio engine 726, the lip synchronization engine 728, the video encoder 730, the video decoder 732, the re-projection engine 734, the display 736, the geometry encoder engine 1011, and the audio decoder 1025 are configured to perform the same or similar operations as the same components of the XR system 700 of FIG. 7 and/or the XR system 1000 of FIG. 10. As shown, the XR system 2100 can use information 2119 to generate one or more virtual representations (e.g., avatars) by the user virtual representation system 720 and/or to render a view of the scene from the user's perspective by the user view rendering engine 2175, which includes background information (e.g., in some cases similar to the background scene information 719 of FIG. 7) and other users' (including one or more other users) update animation parameters and enrolled data. The XR system 2100 also includes a scene definition/composition system 2122 that can be used to compose and/or define a scene for a virtual environment or session. The XR system 2100 is shown to include a trusted edge server that includes certain components, such as the scene definition/composition system 2122. In some cases, the trusted cloud server may be configured to set up and/or control/direct compute operations that may be performed by the trusted edge server. For example, the scene definition/composition system 2122, executing on the trusted cloud server, may control/direct systems on the trusted edge server, such as the user virtual representation system 720 and/or user view render system 2175. In some cases, the XR system 2100 may not include the edge server. In some examples, any of the XR systems of FIG. 7. FIG. 10, FIG. 11, and/or FIG. 17, and/or FIG. 19 can include an edge server as shown in FIG. 21. The XR system 2100 may also include components from FIG. 7, FIG. 10, FIG. 11, and/or FIG. 12 that are not shown in FIG. 21, such as the pre-processing engine 1019 and/or other components.

As noted above, other example call flows can be based on device-to-device flows with no edge server and a decoder on a target or receiving client device (e.g., for view-dependent textures and view-independent textures), device-to-device flows with no edge server and all processing (e.g., decoding, avatar animation, etc.) on the source or transmitting/sending client device (e.g., for view-dependent textures and view-independent textures), device-to-device flows with an edge server and a decoder on a server device (e.g., for view-dependent textures and view-independent textures), and device-to-device flows with an edge server and all processing (e.g., decoding, avatar animation, etc.) on the source or transmitting/sending client device (e.g., for view-dependent textures and view-independent textures). As described previously, a view-dependent texture can be generated for a certain view pose and a view-independent texture can be generated for all possible view poses.

Figure 22:
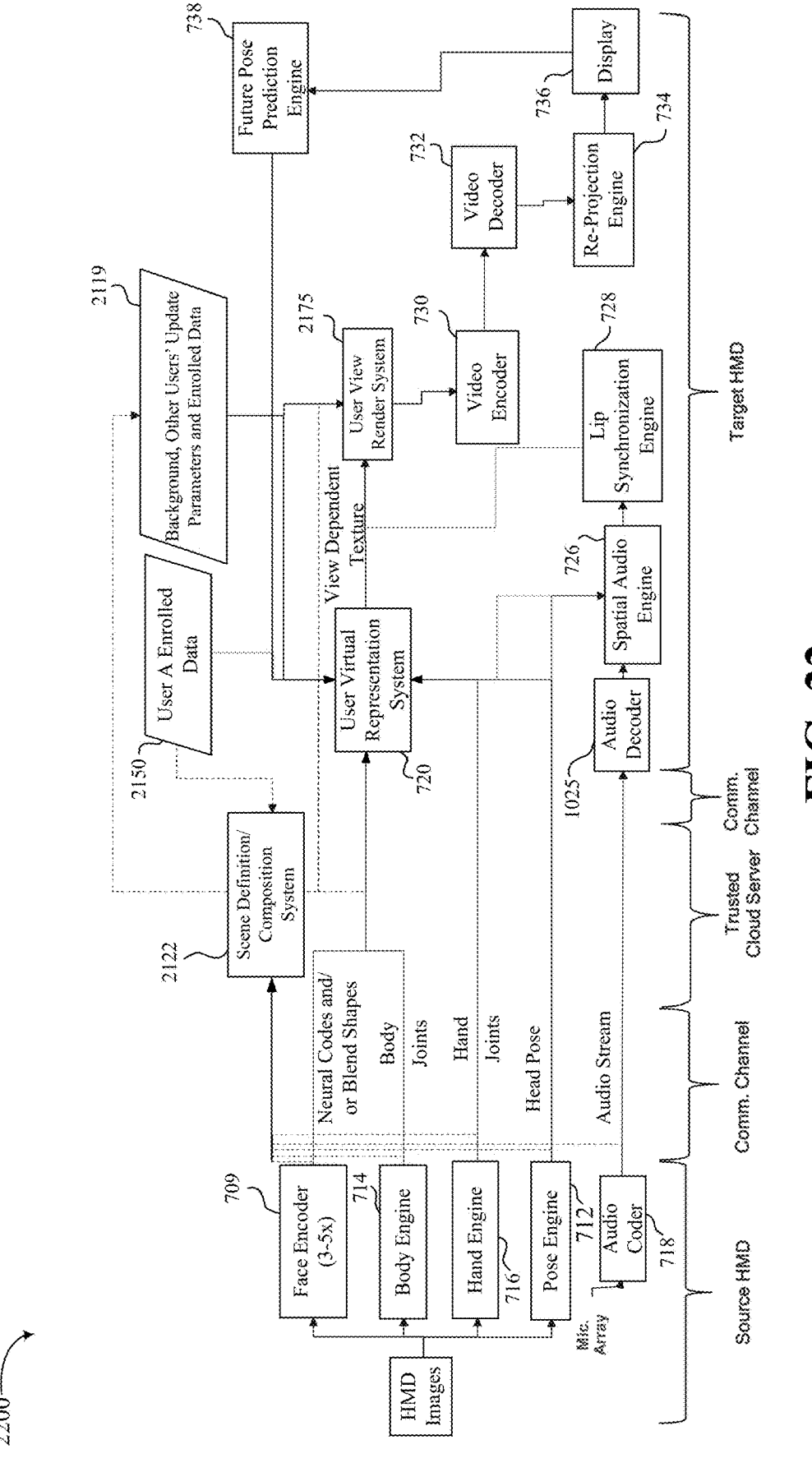
FIG. 22 is a diagram illustrating an example of an example of an XR system configured to perform aspects described herein, according to aspects of the disclosure.

FIG. 22 is a diagram illustrating an example of an example of an XR system 2200 configured to perform aspects described herein, such as operations associated with a device-to-device flow with no edge server and a decoder on a target device (e.g., a target HMD) for view-dependent textures. As shown in FIG. 22, the XR system 2200 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the body engine 714, the hand engine 716, future pose prediction engine 738 etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, the XR system 2200 can use information 2119 to generate one or more virtual representations (e.g., avatars) by the user virtual representation system 720 and/or to render a view of the scene from the user's perspective by the user view rendering engine 2175, which includes background information (e.g., in some cases similar to the background scene information 719 of FIG. 7) and other users' (including one or more other users) update animation parameters and enrolled data. The user virtual representation system 720 may pass view-dependent textures to the user view render system 2175. Passing view dependent textures may help reduce an amount of memory and/or bandwidth for sending the textures. The XR system 2200 also includes a scene definition/composition system 2122 that can be used to compose and/or define a scene for a virtual environment or session. The XR system 2200 is shown to include a trusted cloud server that includes certain components, such as the scene definition/composition system 2122. In some cases, the scene definition/composition system 2122, executing on the trusted cloud server, may control/direct systems on the trusted edge server, such as the user virtual representation system 720 and/or user view render system 2175. In some cases, the XR system 2200 may not include the cloud server. The XR system 2200 may also include components from FIG. 7, FIG. 10, FIG. 11, and/or FIG. 12 that are not shown in FIG. 22, such as the pre-processing engine 1019 and/or other components.

Figure 23:
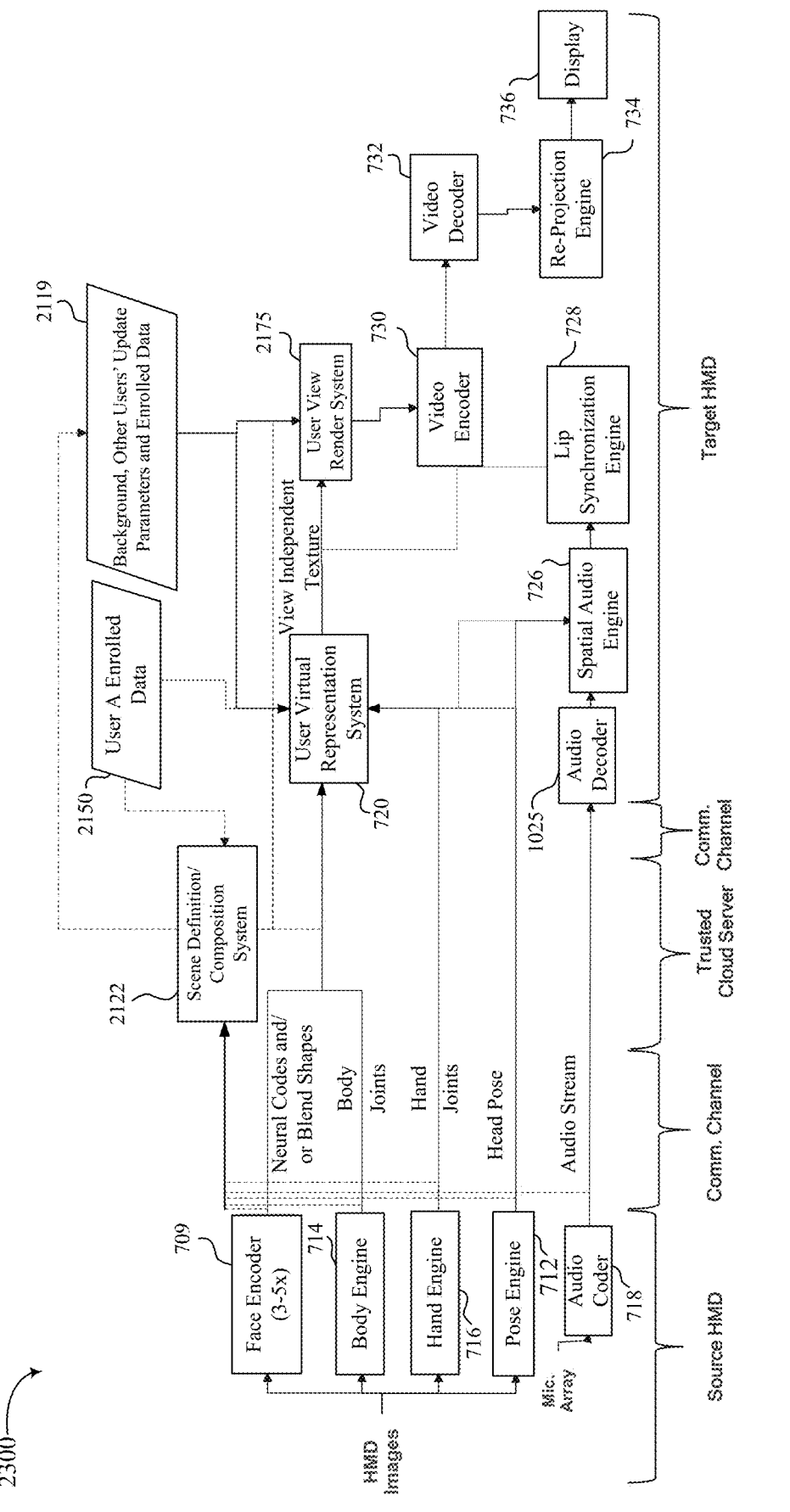
FIG. 23 is a diagram illustrating an example of an example of an XR system configured to perform aspects described herein, according to aspects of the disclosure.

FIG. 23 is a diagram illustrating an example of an example of an XR system 2300 configured to perform aspects described herein, such as operations associated with a device-to-device flow with no edge server and a decoder on a target device (e.g., a target HMD) for view-independent textures. As shown in FIG. 23, the XR system 2300 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the body engine 714, the hand engine 716, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, the XR system 2300 can use information 2119 to generate one or more virtual representations (e.g., avatars) by the user virtual representation system 720 and/or to render a view of the scene from the user's perspective by the user view rendering engine 2175, which includes background information (e.g., in some cases similar to the background scene information 719 of FIG. 7) and other users' (including one or more other users) update animation parameters and enrolled data. The user virtual representation system 720 of the XR system 2300 may pass view-independent textures to the user view render system 2175. The XR system 2300 also includes a scene definition/composition system 2122 that can be used to compose and/or define a scene for a virtual environment or session. The XR system 2300 is shown to include a trusted cloud server that includes certain components. In some cases, the XR system 2300 may not include the cloud server. The XR system 2300 may also include components from FIG. 7, FIG. 10, FIG. 11, and/or FIG. 12 that are not shown in FIG. 23, such as the pre-processing engine 1019 and/or other components.

Figure 24:
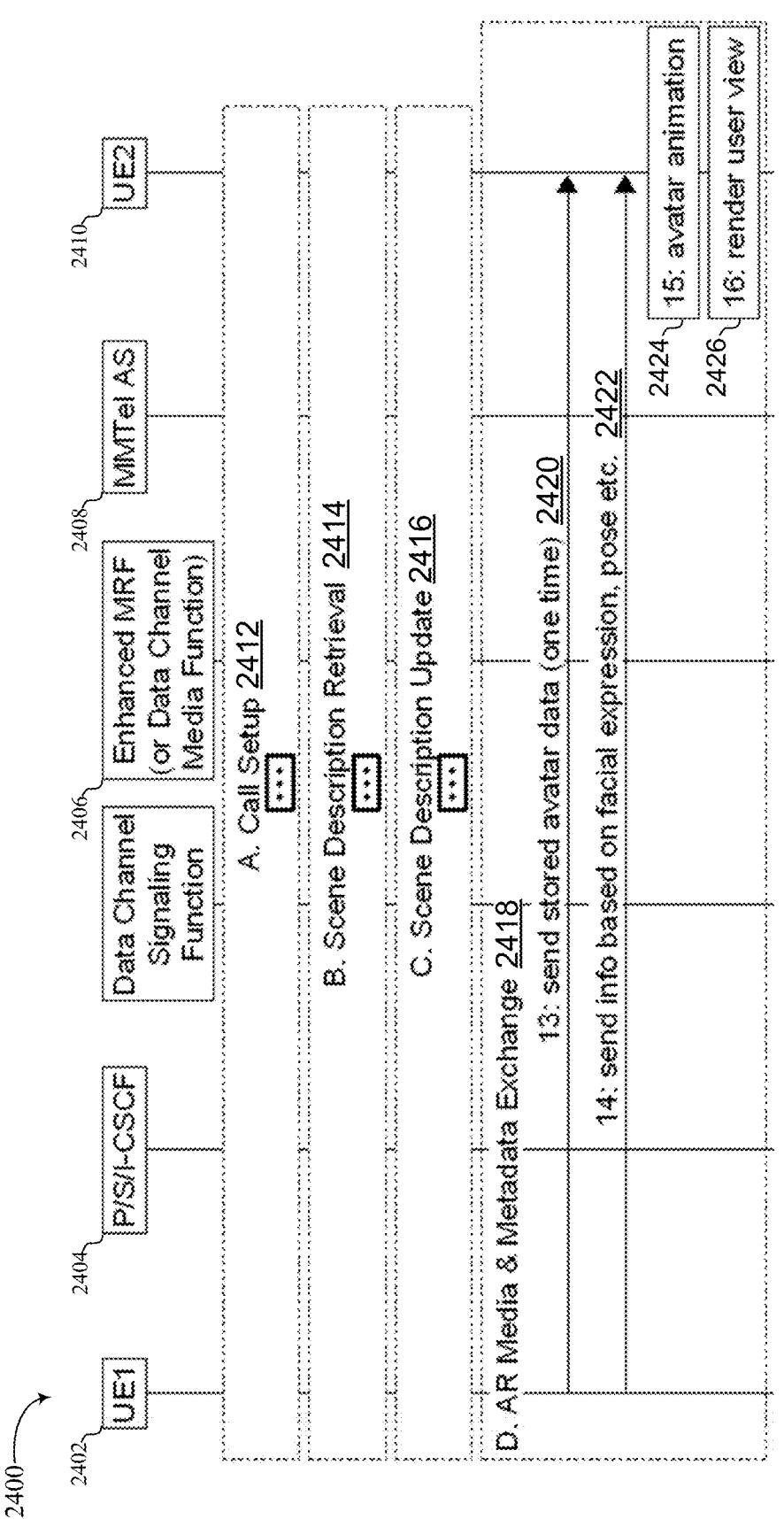
FIG. 24 is a signaling diagram illustrating communications among various devices, according to aspects of the disclosure.

FIG. 24 is a signaling diagram 2400 illustrating communications among a first user equipment (UE) (shown as UE1

2402), a Proxy Call Setup and Control Function (P-CSCF), a Serving Call Setup and Control Function (S-CSCF), an Interrogating Call Setup and Control Function (I-CSCF) (collectively P/S/I-CSCF 2404), a Media Resource Function (MRF) 2406, a Multimedia Telephony Application Server (MMTel AS) 2408, and a second UE (shown as UE2 2410) to set up an XR session. The operations of the signaling diagram 2400 can be performed by the XR system 2200 of FIG. 22 and/or the XR system 2300 of FIG. 23. In some cases, the operations of the signaling diagram 2400 can be performed according to 3GPP Technical Specification Group Service and System Aspects (SA) WG4 (SA4).

As shown, a call setup procedure 2412 may be performed to establish a call between the first UE 2402 and the second UE 2410. After call is set up, a scene description retrieval procedure 2414 may be performed. In some cases, during the scene description retrieval procedure 2414, a scene definition/composition system (e.g., scene definition/composition system 2022 of FIGS. 22-23, etc.) on a trusted cloud server may retrieve information about a scene to present in the XR session, such as user enrolled data (e.g., user A enrolled data 2150 of FIGS. 22-23, etc.) and background information (e.g., information 2119 of FIGS. 22-23). In some cases, the scene definition/composition system may also set up/establish compute processes on the trusted edge server, such as the user virtual representation system (e.g., user virtual representation system 720) and user view render system (e.g., user view render system 2175 of FIG. 22-23, etc.). A scene description update procedure 2416 may apply updates to information about the scene as needed. During an augmented reality (AR) media and metadata exchange procedure 2418 between the first UE 2402 and the second UE 2410, the first UE 2402 sends 2420 (e.g., transmits) stored avatar data (e.g., sends the data one time) to the second UE 2410. In some cases, the avatar data (e.g., the stored avatar data sent 2420 from the first UE to the second UE) may be also known as the user enrolled data (e.g., data such as user A enrolled data 2150 of FIG. 22-23, etc.). The first UE sends 2422 (e.g., transmits) information (e.g., animation parameters, such as the facial part codes, the face blend shapes, the hand joints, the head pose, and/or the audio stream of FIG. 21 or FIG. 22) based on facial expressions, pose, etc. to the second UE 2410. The second UE 2410 performs avatar animation 2424 (e.g., using the user virtual representation system 720 of FIG. 21 or FIG. 22). The second UE 2410 renders a user view 2426 (e.g., using the user view render system 2175 of FIG. 21 or FIG. 22).

FIG. 25 is an example of a device-to-device call flow for setting up an avatar call between client devices with no edge server and a decoder on a target device (e.g., a target HMD) for view-dependent and/or view-independent textures. The communications of FIG. 25 are shown between a first client device 2502 (shown as client device A, also referred to as user A, which can be an HMD, AR glasses, etc.) and a second client device 2505 (shown as client device B, also referred to as user B, which can be an HMD, AR glasses, etc.). In some cases, the communications of the call flow of FIG. 25 can be performed by the XR system 1700 of FIG. 17, XR system 2200 of FIG. 22 and/or the XR system 2300 of FIG. 23.

As shown in FIG. 25, first client device 2502 establishes a call (e.g., by sending a request message 2506 to second client device 2504) and second client device 2504 accepts the call (e.g., by sending a response 2508 or confirmation message to first client device 2502). In some cases, the first client device 2502 can then send the mesh and assets 2510 (e.g., enrolled data, mesh information 1610 of FIG. 16, etc., as discussed above with respect to FIG. 18) of user A to a secure location on second client device 2504. In other cases, the second client device 2504 can fetch the mesh and/or assets from a memory or storage (e.g., cache) of second client device 2504, such as if first client device 2502 and second client device 2505 are involved in calls often. In some cases, the second client device 2504 can send the mesh and/or assets 2512 (e.g., enrolled data) to a secure location on first client device 2502. In other cases, the first client device 2502 can fetch the mesh and/or assets from a memory or storage (e.g., cache) of first client device 2502. The call may then be established 2514, and the first client device 2502 and second client device 2504 can exchange mesh animation parameters during the call. The call may then end 2516, in which case the meshes and assets can be deleted from the secure locations on first client device 2502 and second client device 2504 or can be maintained for further usage if the users are trusted.

Figure 26:
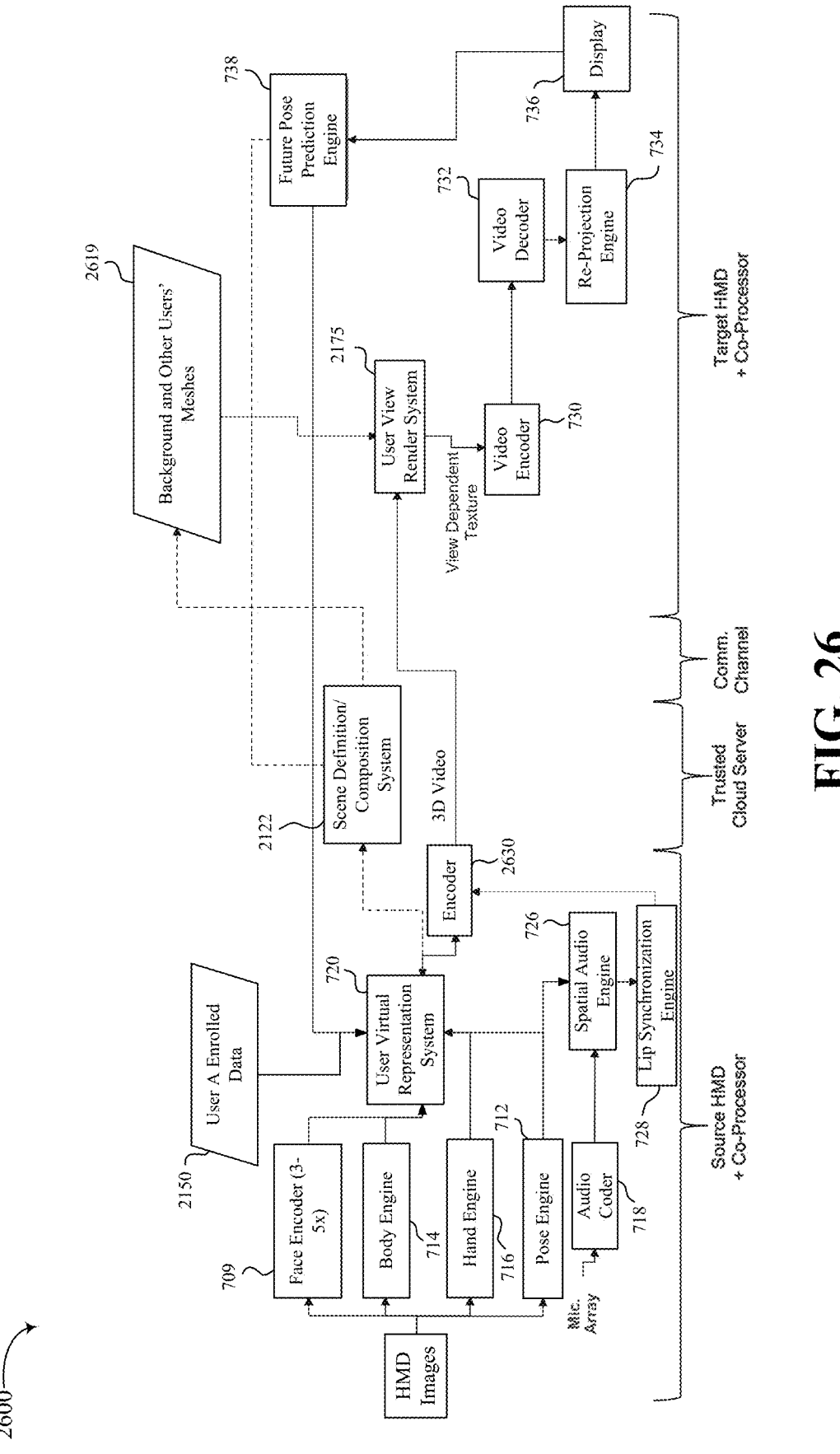
FIG. 26 is a diagram illustrating an example of an example of an XR system configured to perform aspects described herein, according to aspects of the disclosure.

FIG. 26 is a diagram illustrating an example of an example of an XR system 2600 configured to perform aspects described herein, such as operations associated with a device-to-device flow with no edge server and all processing (e.g., decoding, avatar animation, etc.) on the source or transmitting/sending client device (shown as a source HMD and co-processor) for view-dependent textures. As shown in FIG. 26, the XR system 2600 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the body engine 714, the hand engine 716, future pose prediction engine 738, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, a user virtual representation system 720 of the transmitting/sending client device can use enrolled data 2150 of a user of the transmitting/sending client device (shown as User A) to generate a virtual representation (e.g., avatars) of the user A. An encoder 2630 can encode the virtual representation of the user A and send the encoded information to a user view rendering engine 2175 of the target or receiving client device (shown as target HMD and co-processor). The user view rendering engine 2175 can use the encoded information and information 2619 (e.g., background information, in some cases similar to the background scene information 719 of FIG. 7, and one or more other users' meshes and in some cases update animation parameters and enrolled data) to render a view (including a view-dependent texture) of the scene from the perspective of the user of the target/receiving device. The XR system 2600 also includes a scene definition/composition system 2122 that can be used to compose and/or define a scene for a virtual environment or session. In some cases, the receiving client device (the target HMD and co-processor) may not include the video encoder 730, such as based on the transmitting/sending client device (the source HMD and co-processor) having the encoder 2630. The XR system 2600 is shown to include a trusted cloud server that includes certain components. In some cases, the XR system 2600 may not include the cloud server. The XR system 2600 may also include components from FIG. 7, FIG. 10, FIG. 11, and/or FIG. 12 that are not shown in FIG. 26, such as the pre-processing engine 1019 and/or other components.

Figure 27:
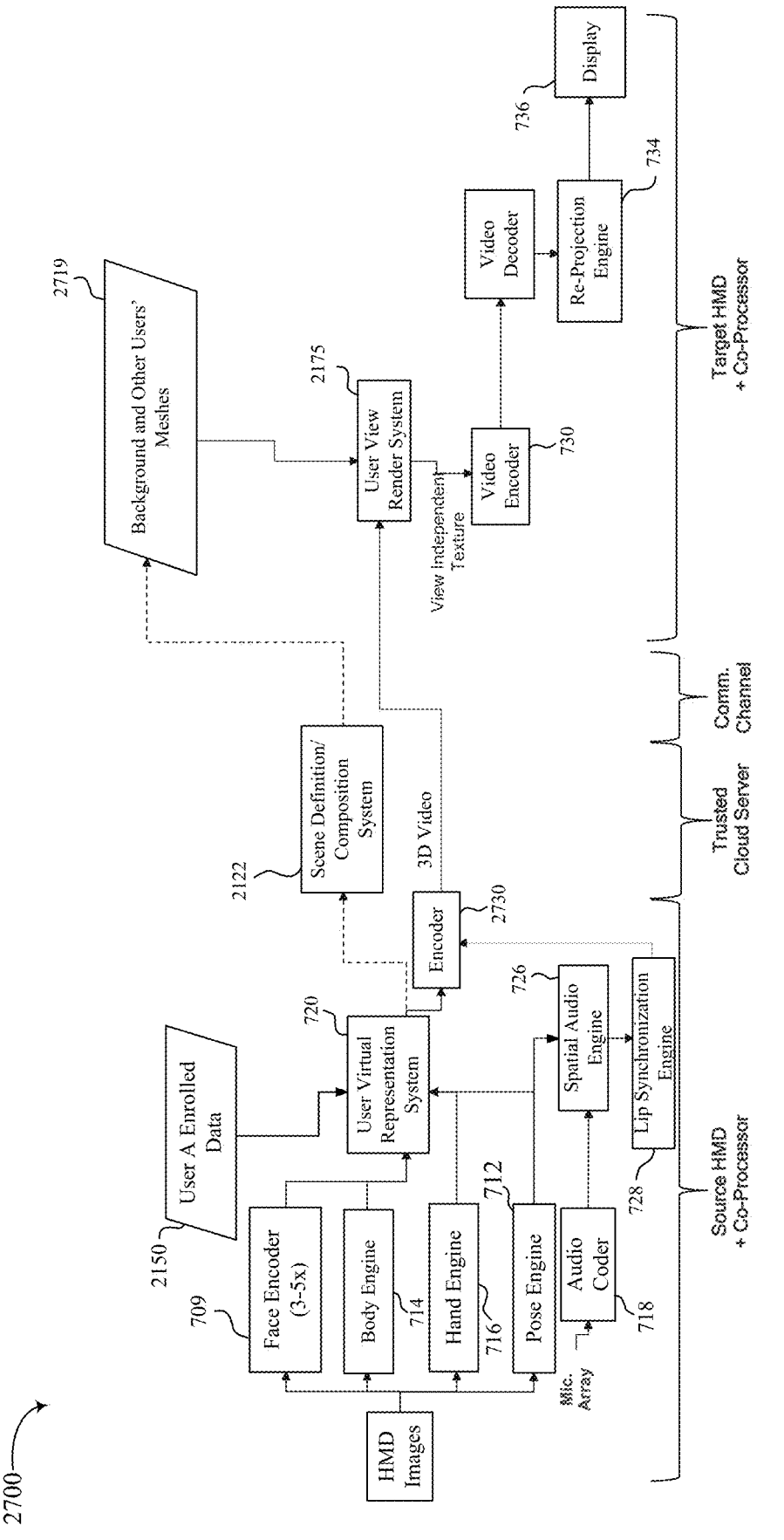
FIG. 27 is a diagram illustrating an example of an example of an XR system configured to perform aspects described herein, according to aspects of the disclosure.

FIG. 27 is a diagram illustrating an example of an example of an XR system 2700 configured to perform aspects described herein, such as operations associated with a device-to-device flow with no edge server and all processing (e.g., decoding, avatar animation, etc.) on the source or transmitting/sending client device (shown as a source HMD and co-processor) for view-independent textures. As shown in FIG. 27, the XR system 2700 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the body engine 714, the hand engine 716, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, a user virtual representation system 720 of the transmitting/sending client device can use enrolled data 2150 of a user of the transmitting/sending client device (shown as User A) to generate a virtual representation (e.g., avatars) of the user A. An encoder 2730 can encode the virtual representation of the user A and send the encoded information to a user view rendering engine 2175 of the target or receiving device (shown as target HMD and co-processor). The user view rendering engine 2175 can use the encoded information and information 2719 (e.g., background information, in some cases similar to the background scene information 719 of FIG. 7, and one or more other users' meshes and in some cases update animation parameters and enrolled data) to render a view (including a view-independent texture) of the scene from the perspective of the user of the target/receiving device. The XR system 2700 also includes a scene definition/composition system 2122 that can be used to compose and/or define a scene for a virtual environment or session. The XR system 2700 is shown to include a trusted cloud server that includes certain components. In some cases, the XR system 2700 may not include the cloud server. The XR system 2700 may also include components from FIG. 7, FIG. 10, FIG. 11, and/or FIG. 12 that are not shown in FIG. 27, such as the pre-processing engine 1019 and/or other components.

Figure 28:
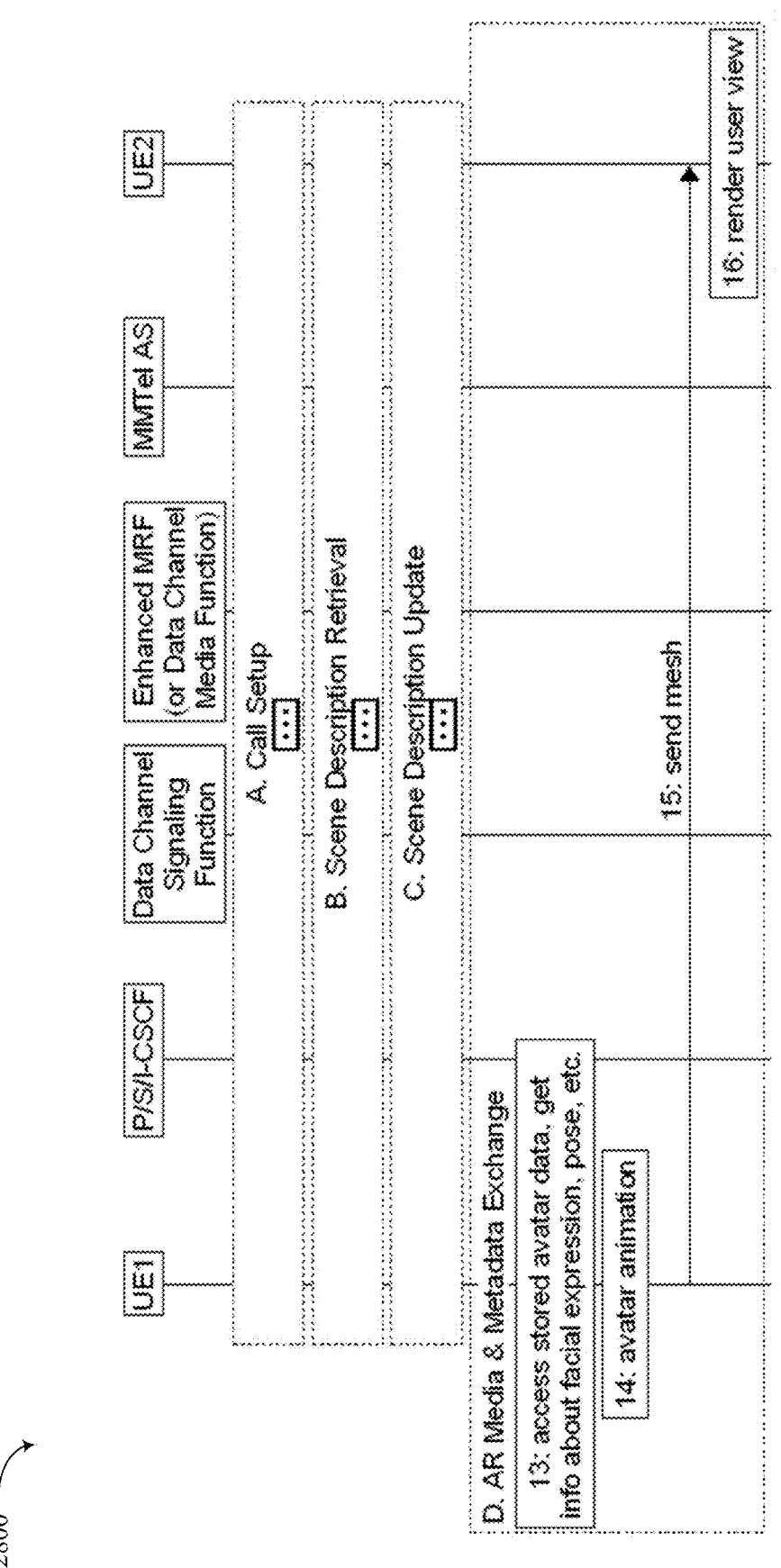
FIG. 28 is a signaling diagram illustrating communications among various devices, according to aspects of the disclosure.

FIG. 28 is a signaling diagram 2800 illustrating communications among a first UE (shown as UE1), a P-CSCF, a S-CSCF, an I-CSCF, a MRF, a MMTel AS, and a second UE (shown as UE2). The operations of the signaling diagram 2800 can be performed by the XR system 2600 of FIG. 26 and/or the XR system 2700 of FIG. 27. In some cases, the operations of the signaling diagram 2800 can be performed according to 3GPP SA4. As shown, at operation 13 during AR media and metadata exchange between the first UE and the second UE, the first UE (e.g., using user virtual representation system 720 of FIG. 26 or FIG. 27) accesses stored avatar data (e.g., from user A enrolled data 2150 of FIG. 26 or FIG. 27) and obtains information regarding a facial expression of the user, pose, etc. (e.g., animation parameters, such as facial part codes from the face encoder 709, hand joints from the hand engine 716, etc. as shown in FIG. 26 or FIG. 27). At operation 14, the first UE performs avatar animation (e.g., using user virtual representation system 720 of FIG. 26 or FIG. 27). At operation 15, the first UE sends (e.g., transmits) a mesh of the user of the first UE to the second UE. At operation 16, the second UE renders a user view (e.g., using user view render system 2175 of FIG. 26 or FIG. 27).

Figure 29:
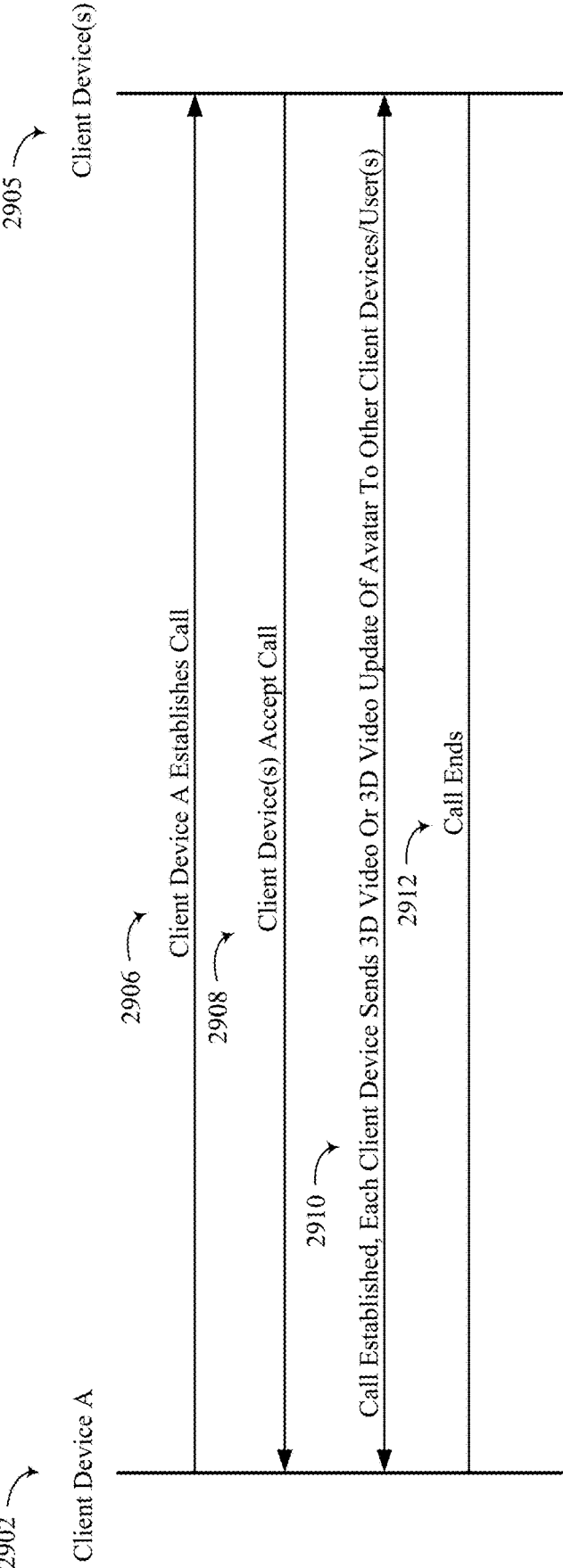
FIG. 29 is an example of a device-to-device call flow for setting up an avatar call between client devices with no edge server and all processing (e.g., decoding, avatar animation, etc.) on the source or transmitting/sending client device for view-dependent and/or view-independent textures, according to aspects of the disclosure.

FIG. 29 is an example of a device-to-device call flow for setting up an avatar call between client devices with no edge server and all processing (e.g., decoding, avatar animation, etc.) on the source or transmitting/sending client device for view-dependent and/or view-independent textures. The communications of FIG. 29 are shown between a first client device 2902 (shown as client device A, also referred to as user A, which can be an HMD, AR glasses, etc.) and one or more other client devices 2905 (which can be a single other client device or multiple other client devices). In some cases, the communications of the call flow of FIG. 29 can be performed by the XR system 2600 of FIG. 26 and/or the XR system 2700 of FIG. 27.

As shown in FIG. 29, the first client device 2902 establishes a call (e.g., by sending a request message 2906 to the one or more other client devices 2905) and at least one client device (or user of the at least one client device) from the one or more other client devices 2905 accepts the call (e.g., by sending a response 2908 or confirmation message to the first client device 2902). The call is then established 2910, and each client device (including the first client device 2902 and each client device of the one or more other client devices 2905 that accepted the call) can send a three-dimensional (3D) video or a 3D video update of the respective user's virtual representation (or avatar) to the other user(s). The call can then end 2912.

Figure 30:
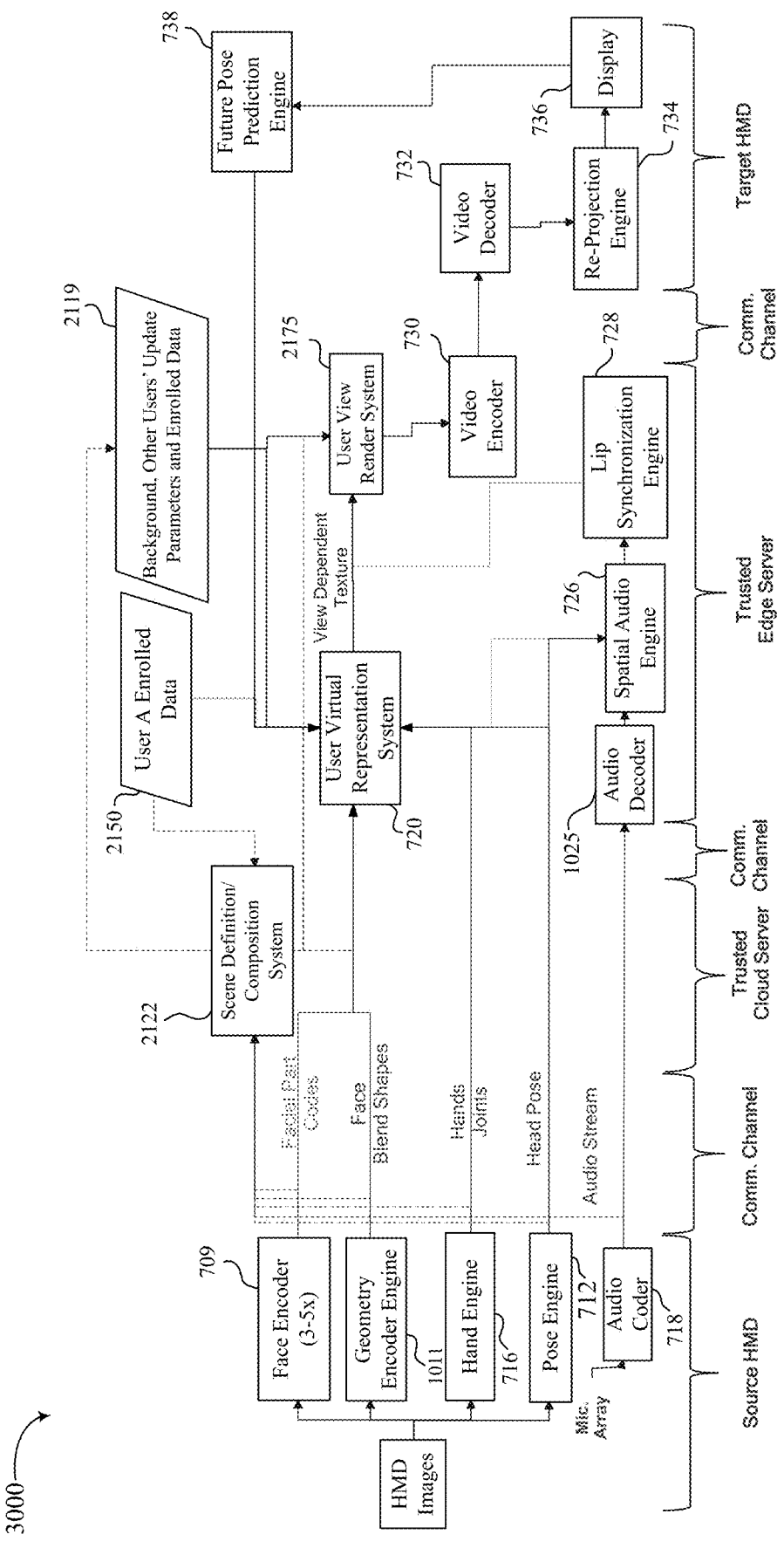
FIG. 30 is a diagram illustrating an example of an example of an XR system configured to perform aspects described herein, according to aspects of the disclosure.

FIG. 30 is a diagram illustrating an example of an example of an XR system 3000 configured to perform aspects described herein, such as operations associated with a device-to-device flow with an edge server and a decoder on a server device (e.g., the trusted edge server and/or the trusted cloud server of FIG. 30) for view-dependent textures. As shown in FIG. 30, the XR system 3000 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the geometry encoder engine 1011, the hand engine 716, future pose prediction engine 738, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, a user virtual representation system 720 of the trusted edge server can use enrolled data 2150 of a user of the transmitting/sending client device (shown as User A) to generate a virtual representation (e.g., avatars) of the user A (with a view-dependent texture). The enrolled data 2150 of the first user can include the mesh information 1810 of FIG. 18, and the mesh information 1810 can include information defining the mesh of the avatar of the first user of the first client device 1802 and other assets associated with the avatar (e.g., a normal map, an albedo map, a specular reflection map, etc., such as the mesh 1301, the normal map 1302, the albedo map 1304, the specular reflection map 1306, and/or the personalized parameters 1308 of FIG. 13). A user view rendering engine 2175 on the trusted edge server can use the view-dependent texture information and information 2119 (e.g., background information, in some cases similar to the background scene information 719 of FIG. 7, and one or more other users' update animation parameters and enrolled data) to render a view of the scene from the perspective of the user of the target/receiving device (shown as target HMD). The XR system 3000 also includes a scene definition/composition system 2122 (which may be on the cloud server) that can be used to compose and/or define a scene for a virtual environment or session. The XR system 3000 is shown to include the trusted cloud server that includes certain components. In some cases, the XR system 3000 may not include the cloud server. The XR system 3000 may also include components from FIG. 7, FIG. 10, FIG. 11, and/or FIG. 12 that are not shown in FIG. 30, such as the pre-processing engine 1019 and/or other components.

Figure 31:
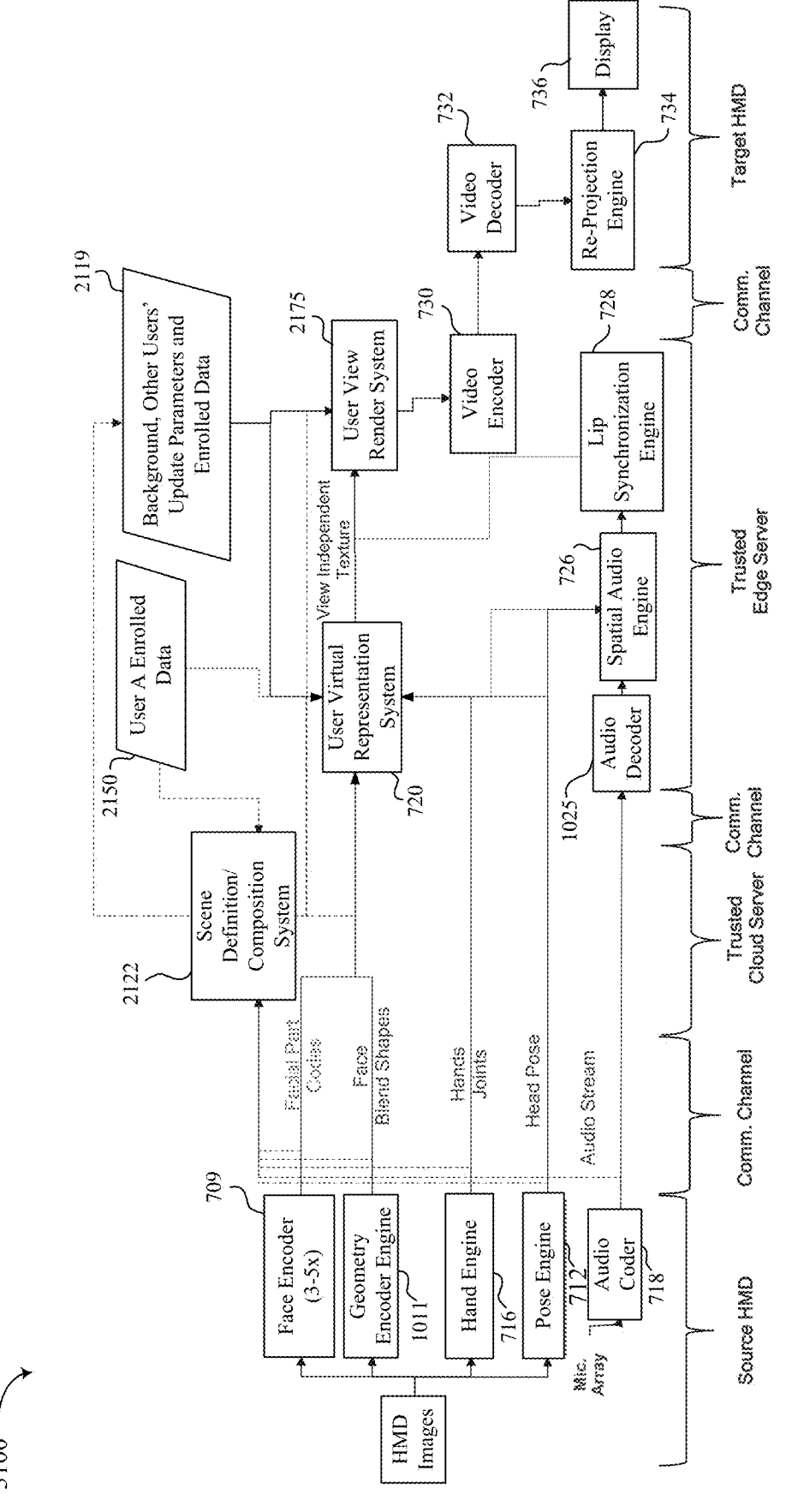
FIG. 31 is a diagram illustrating an example of an example of an XR system configured to perform aspects described herein, according to aspects of the disclosure.

FIG. 31 is a diagram illustrating an example of an example of an XR system 3100 configured to perform aspects described herein, such as operations associated with a device-to-device flow with an edge server and a decoder on a server device (e.g., the trusted edge server and/or the trusted cloud server of FIG. 31) for view-independent textures. As shown in FIG. 31, the XR system 3100 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the geometry encoder engine 1011, the hand engine 716, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, a user virtual representation system 720 of the trusted edge server can use enrolled data 2150 of a user of the transmitting/sending client device (shown as User A) to generate a virtual representation (e.g., avatars) of the user A (with a view-independent texture). A user view rendering engine 2175 on the trusted edge server can use the view-independent texture information and information 2119 (e.g., background information, in some cases similar to the background scene information 719 of FIG. 7, and one or more other users' update animation parameters and enrolled data) to render a view of the scene from the perspective of the user of the target/receiving device (shown as target HMD). The XR system 3100 also includes a scene definition/composition system 2122 (which may be on the cloud server) that can be used to compose and/or define a scene for a virtual environment or session. The XR system 3100 is shown to include the trusted cloud server that includes certain components. In some cases, the XR system 3100 may not include the cloud server. The XR system 3100 may also include components from FIG. 7, FIG. 10, FIG. 11, and/or FIG. 12 that are not shown in FIG. 31, such as the pre-processing engine 1019 and/or other components.

Figure 32:
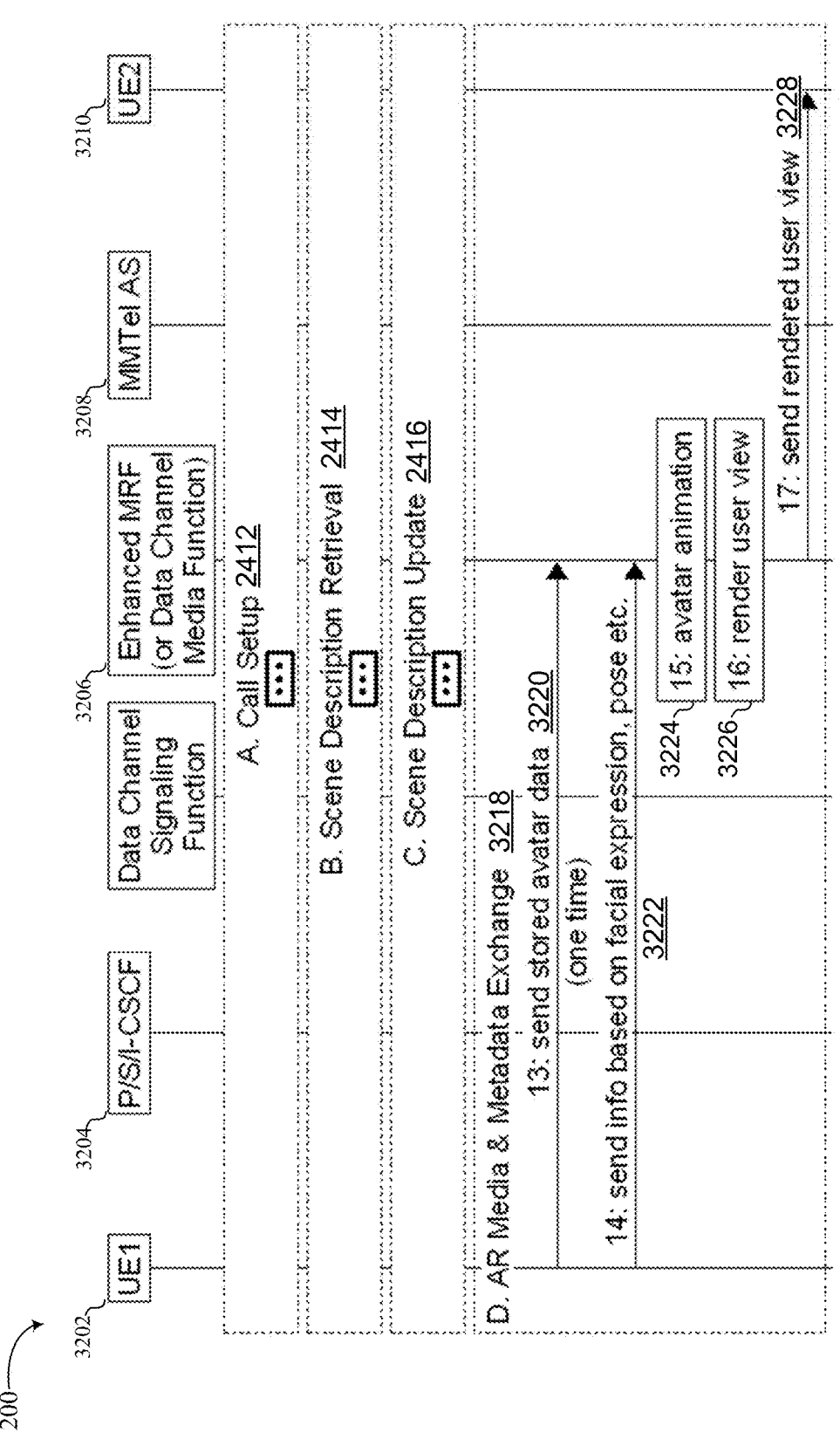
FIG. 32 is a signaling diagram illustrating communications among various devices, according to aspects of the disclosure.

FIG. 32 is a signaling diagram 3200 illustrating communications among a first UE (shown as UE1 3202), a P-CSCF, a S-CSCF, an I-CSCF (collectively P/S/I-CSCF 3204), a MRF 3206, a MMTel AS 3208, and a second UE (shown as UE2 3910). The operations of the signaling diagram 3200 can be performed by the XR system 3000 of FIG. 30 and/or the XR system 3100 of FIG. 31. In some cases, the operations of the signaling diagram 3200 can be performed according to 3GPP SA4. In some cases, a call setup procedure 2412, scene description retrieval procedure 2414, and scene description update procedure 2416 may be performed in a manner substantially similar to that discussed above with respect to FIG. 24 based on similarly numbered components of FIG. 30 and FIG. 31. As shown, during an AR media and metadata exchange between the first UE 3202, the MRF 3206, and the second UE 3210, the first UE 3202 sends 3220 (e.g., transmits) stored avatar data (e.g., sends the data one time) to the enhanced MRF 3206 (e.g., which may be part of the edge server of FIG. 30 and/or FIG. 31). The first UE 3202 sends 3222 (e.g., transmits) information (e.g., animation parameters, such as the facial part codes, the face blend shapes, the hand joints, the head pose, and/or the audio stream of FIG. 30 or FIG. 31) based on facial expressions, pose, etc. to the MRF 3206. The MRF 3206 performs avatar animation 3224 (e.g., using the user virtual representation system 720 of FIG. 30 or FIG. 31). The MRF 3206 renders a user view 3226 (e.g., using the user view render system 2175 of FIG. 30 or FIG. 31). The MRF 3206 transmits 3228 the rendered user view to the second UE 3210.

Figure 33:
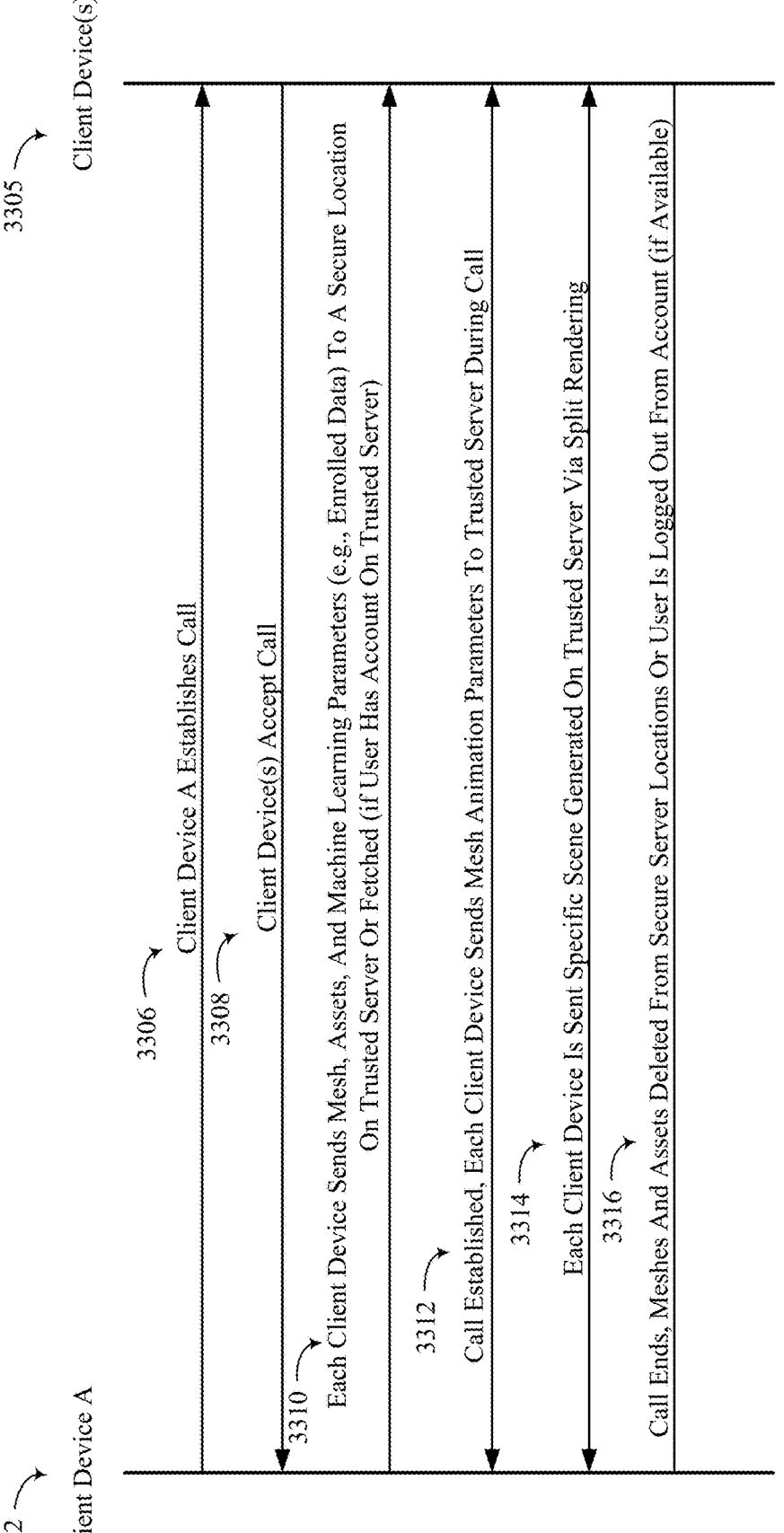
FIG. 33 is an example of a device-to-device call flow for setting up an avatar call between client devices with an edge server and a decoder on a server device for view-dependent and/or view-independent textures, according to aspects of the disclosure.

FIG. 33 is an example of a device-to-device call flow for setting up an avatar call between client devices with an edge server and a decoder on a server device (e.g., the trusted edge server and/or the trusted cloud server of FIG. 30 and/or FIG. 31) for view-dependent and/or view-independent textures. The communications of FIG. 33 are shown between a first client device 3302 (shown as client device A, also referred to as user A, which can be an HMD, AR glasses, etc.) and one or more other client devices 3305 (which can be a single other client device or multiple other client devices). In some cases, the communications of the call flow of FIG. 33 can be performed by the XR system 3000 of FIG. 30 and/or the XR system 3100 of FIG. 31.

As shown in FIG. 33, the first client device 3302 establishes a call (e.g., by sending a request message 3306 to the one or more other client devices 3305) and at least one client device (or user of the at least one client device) from the one or more other client devices 3305 accepts the call (e.g., by sending a response 3308 or confirmation message to the first client device 3302). In some cases, the first client device 3302 and each client device of the one or more other client devices 3305 that accepted the call can send (e.g., transmit) the respective mesh, assets (e.g., albedo map, normal map, specular reflection map, etc.), machine learning parameters 3310 (e.g., neural network weights), which can be part of the enrolled data, to a trusted server (e.g., the edge server of FIG. 30 and/or FIG. 31), such as a secure location or storage on the trusted server. In other cases, the client devices can fetch the mesh, assets, etc. from a memory or storage (e.g., cache) of the respective client device if the respective client device has an account with the trusted server (or a service provider using the trusted server). In such cases, the respective client device can be authenticated by the trusted server in order to allow the client device to fetch the data.

The call is then established 3312, and each client device (including the first client device 3302 and each client device of the one or more other client devices 3305 that accepted the call) can send mesh animation parameters to the trusted server during the call. The trusted server can then send to each client device a specific scene 3314 generated by the trusted server (e.g., using the user virtual representation system 720 and/or the user view render system 2175 of FIG. 30 or FIG. 31).

The call can then end 3316, in which case the meshes and assets can be deleted from the trusted server (e.g., the secure locations or storage on the trusted server) or the client devices can be logged out of their respective account.

Figure 34:
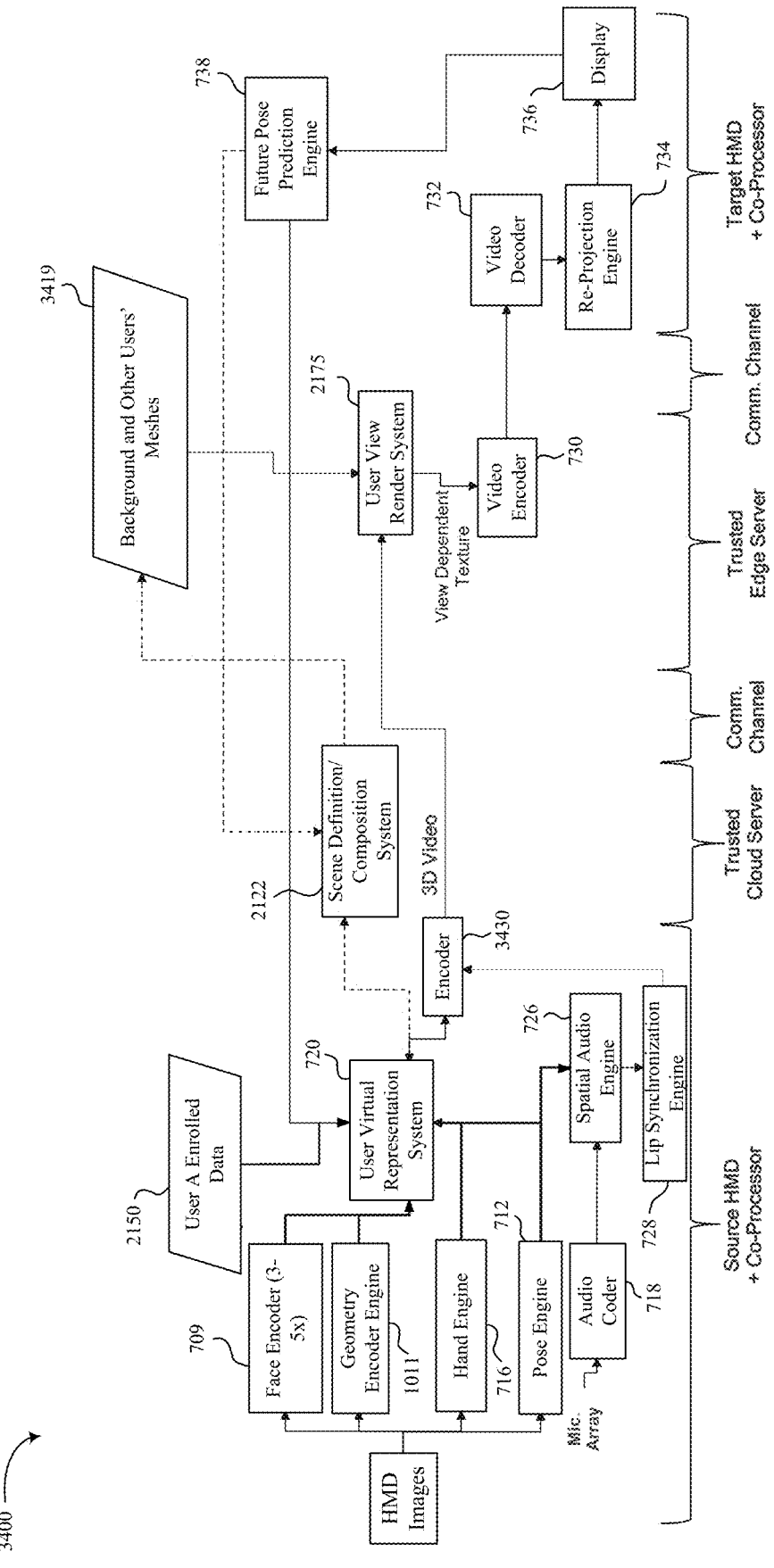
FIG. 34 is a diagram illustrating an example of an example of an XR system configured to perform aspects described herein, according to aspects of the disclosure.

FIG. 34 is a diagram illustrating an example of an example of an XR system 3400 configured to perform aspects described herein, such as operations associated with a device-to-device flow with an edge server and all processing (e.g., decoding, avatar animation, etc.) on the source or transmitting/sending client device (shown as source HMD and co-processor) for view-dependent textures. As shown in FIG. 34, the XR system 3400 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the geometry encoder engine 1011, the hand engine 716, the future pose prediction engine 738, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, a user virtual representation system 720 of the transmitting/sending client device can use enrolled data 2150 of a user of the transmitting/sending client device (shown as User A) to generate a virtual representation (e.g., avatars) of the user A. An encoder 3430 can encode the virtual representation of the user A and send the encoded information to a user view rendering engine 2175 on the edge server. The user view rendering engine 2175 can use the encoded information and information 3419 (e.g., background information, in some cases similar to the background scene information 719 of FIG. 7, and one or more other users' meshes and in some cases update animation parameters and enrolled data) to render a view (including a view-dependent texture) of the scene from the perspective of the user of the target/receiving device. The XR system 3400 also includes a scene definition/composition system 2122 that can be used to compose and/or define a scene for a virtual environment or session. In some cases, the receiving client device (the target HMD and co-processor) may not include the video encoder 730, such as based on the transmitting/sending client device (the source HMD and co-processor) having the encoder 3430. The XR system 3400 is shown to include a trusted cloud server that includes certain components. In some cases, the XR system 3400 may not include the cloud server. The XR system 3400 may also include components from FIG. 7, FIG. 10, FIG. 11, and/or FIG. 12 that are not shown in FIG. 34, such as the pre-processing engine 1019 and/or other components.

Figure 35:
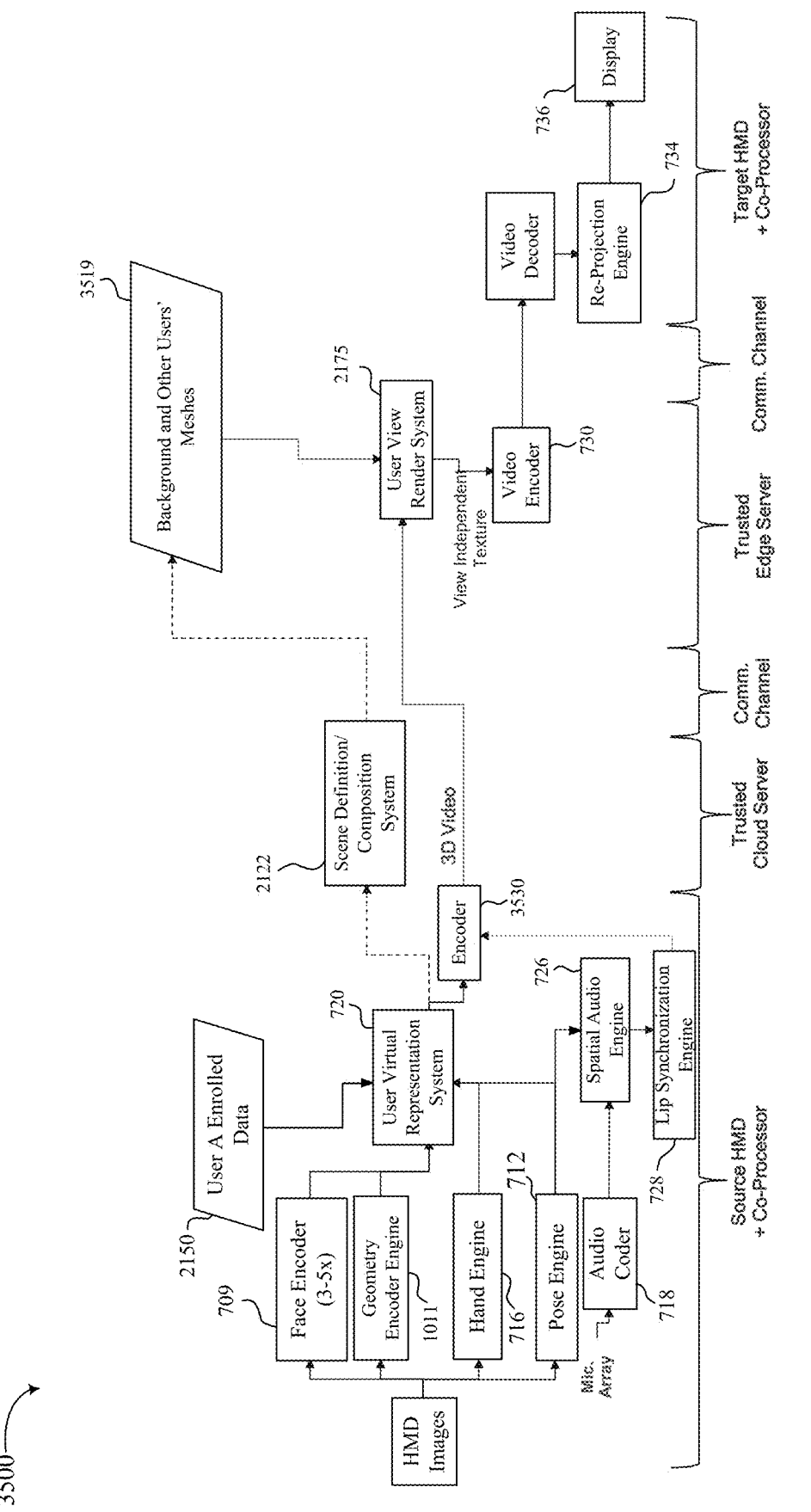
FIG. 35 is a diagram illustrating an example of an example of an XR system configured to perform aspects described herein, according to aspects of the disclosure.

FIG. 35 is a diagram illustrating an example of an example of an XR system 3500 configured to perform aspects described herein, such as operations associated with a device-to-device flow with an edge server and all processing (e.g., decoding, avatar animation, etc.) on the source or transmitting/sending client device (shown as source HMD and co-processor) for view-independent textures. As shown in FIG. 35, the XR system 3500 includes some of the same components (with like numerals) as the XR system 700 of FIG. 7, the XR system 1000 of FIG. 10, the XR system 2000 of FIG. 20, the XR system 2100 of FIG. 21, etc. Like components (e.g., the face encoder 709, the geometry encoder engine 1011, the hand engine 716, etc.) are configured to perform the same or similar operations as the same components of the XR system 700 of FIG. 7, the XR system 1000 of FIG. 10, the XR system 2000 of FIG. 20, the XR system 2100 of FIG. 21, etc. As shown, a user virtual representation system 720 of the transmitting/sending client device can use enrolled data 2150 of a user of the transmitting/sending client device (shown as User A) to generate a virtual representation (e.g., avatars) of the user A. An encoder 3530 can encode the virtual representation of the user A and send the encoded information to a user view rendering engine 2175 on the edge server. The user view rendering engine 2175 can use the encoded information and information 3519 (e.g., background information, in some cases similar to the background scene information 719 of FIG. 7, and one or more other users' meshes and in some cases update animation parameters and enrolled data) to render a view (including a view-independent texture) of the scene from the perspective of the user of the target/receiving device. The XR system 3500 also includes a scene definition/composition system 2122 that can be used to compose and/or define a scene for a virtual environment or session. The XR system 3500 is shown to include a trusted cloud server that includes certain components. In some cases, the XR system 3500 may not include the cloud server. The XR system 3500 may also include components from FIG. 7, FIG. 10, FIG. 11, and/or FIG. 12 that are not shown in FIG. 35, such as the pre-processing engine 1019 and/or other components.

Figure 36:
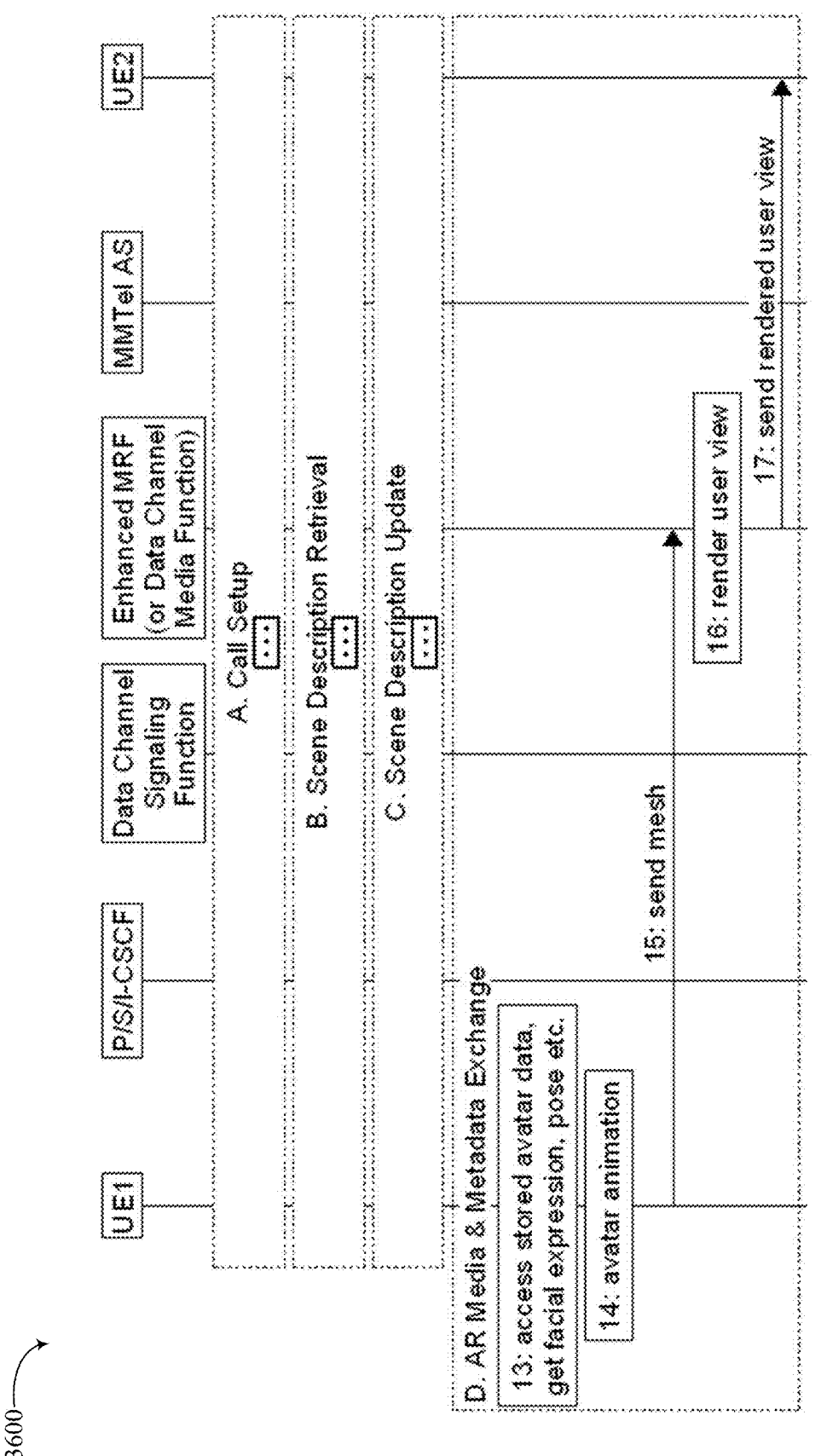
FIG. 36 is a signaling diagram illustrating communications among various devices, according to aspects of the disclosure.

FIG. 36 is a signaling diagram 3600 illustrating communications among a first UE (shown as UE1), a P-CSCF, a S-CSCF, an I-CSCF, a MRF, a MMTel AS, and a second UE (shown as UE2). The operations of the signaling diagram 3600 can be performed by the XR system 3400 of FIG. 34 and/or the XR system 3500 of FIG. 35. In some cases, the operations of the signaling diagram 3600 can be performed according to 3GPP SA4. As shown, at operation 13 during AR media and metadata exchange between the first UE, the MRF, and the second UE, the first UE (e.g., using user virtual representation system 720 of FIG. 34 or FIG. 35) accesses stored avatar data (e.g., from user A enrolled data 2150 of FIG. 34 or FIG. 35) and obtains information regarding a facial expression of the user, pose, etc. (e.g., animation parameters, such as facial part codes from the face encoder 709, hand joints from the hand engine 716, etc. as shown in FIG. 34 or FIG. 35). At operation 14, the first UE performs avatar animation (e.g., using user virtual representation system 720 of FIG. 34 or FIG. 35). At operation 15, the first UE sends (e.g., transmits) a mesh of the user of the first UE to the MRF (e.g., which may be part of the edge server of FIG. 30 and/or FIG. 31). At operation 16, the MRF renders a user view (e.g., using user view render system 2175 of FIG. 34 or FIG. 35). At operation 17, the MRF transmits the rendered user view to the second UE.

Figure 37:
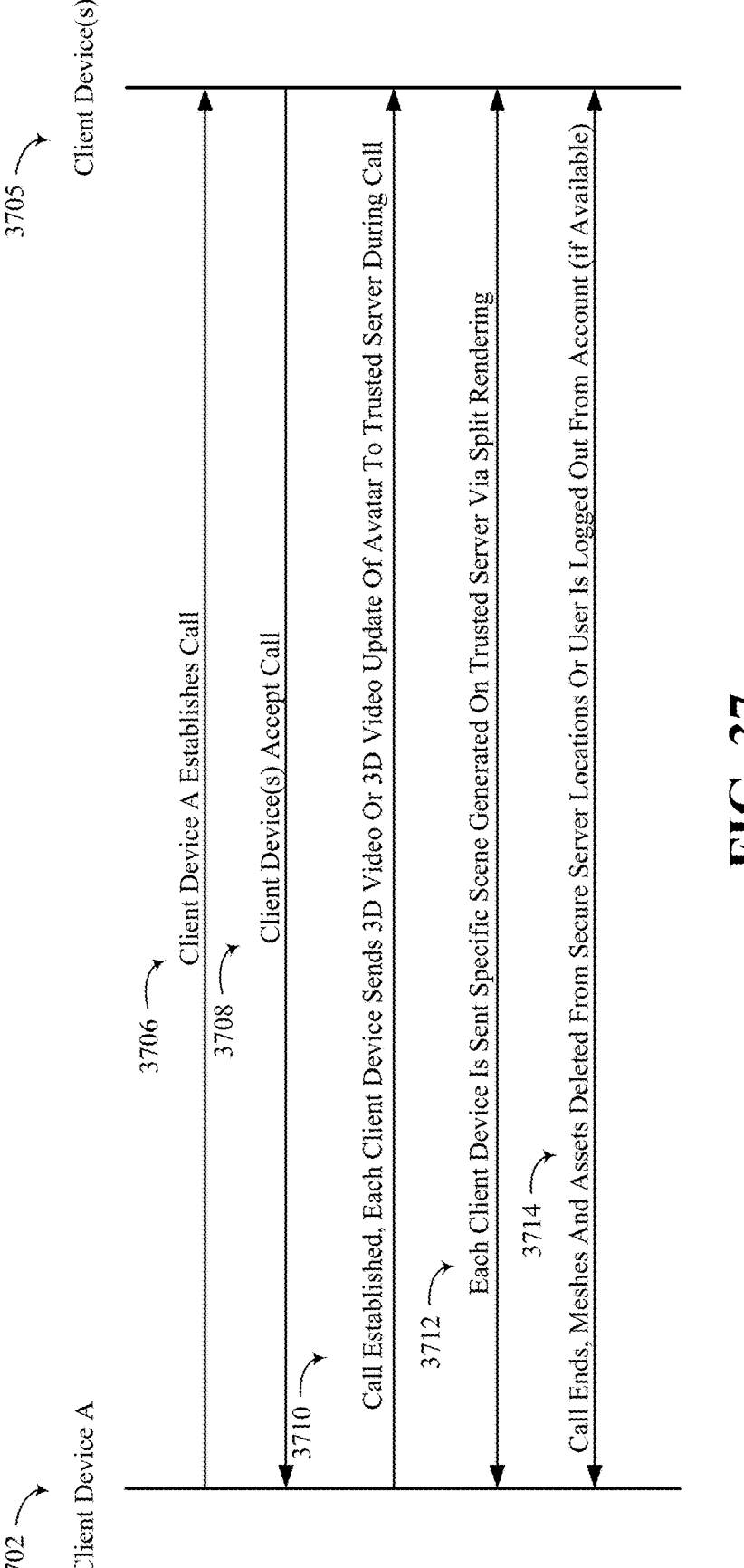
FIG. 37 is an example of a device-to-device call flow for setting up an avatar call between client devices with an edge server and all processing (e.g., decoding, avatar animation, etc.) on the source or transmitting/sending client device for view-dependent and/or view-independent textures, according to aspects of the disclosure.

FIG. 37 is an example of a device-to-device call flow for setting up an avatar call between client devices with an edge server and all processing (e.g., decoding, avatar animation, etc.) on the source or transmitting/sending client device for view-dependent and/or view-independent textures. The communications of FIG. 37 are shown between a first client device 3702 (shown as client device A, also referred to as user A, which can be an HMD, AR glasses, etc.) and one or more other client devices 3705 (which can be a single other client device or multiple other client devices). In some cases, the communications of the call flow of FIG. 37 can be performed by the XR system 3400 of FIG. 34 and/or the XR system 3500 of FIG. 35.

As shown in FIG. 37, the first client device 3702 establishes a call (e.g., by sending a request message 3706 to the one or more other client devices 3705) and at least one client device (or user of the at least one client device) from the one or more other client devices 3705 accepts the call (e.g., by sending a response 3708 or confirmation message to the first client device 3702). The call is then established 3710, and each client device (including the first client device 3702 and each client device of the one or more other client devices 3705 that accepted the call) can send a three-dimensional (3D) video or a 3D video update of the respective user's virtual representation (or avatar) to the trusted server during the call. The trusted server can then send to each client device a specific scene 3712 generated by the trusted server (e.g., using the user virtual representation system 720 and/or the user view render system 2175 of FIG. 30 or FIG. 31).

The call can then end 3714, in which case the meshes and assets can be deleted from the trusted server (e.g., the secure locations or storage on the trusted server) or the client devices can be logged out of their respective account.

Figure 38:
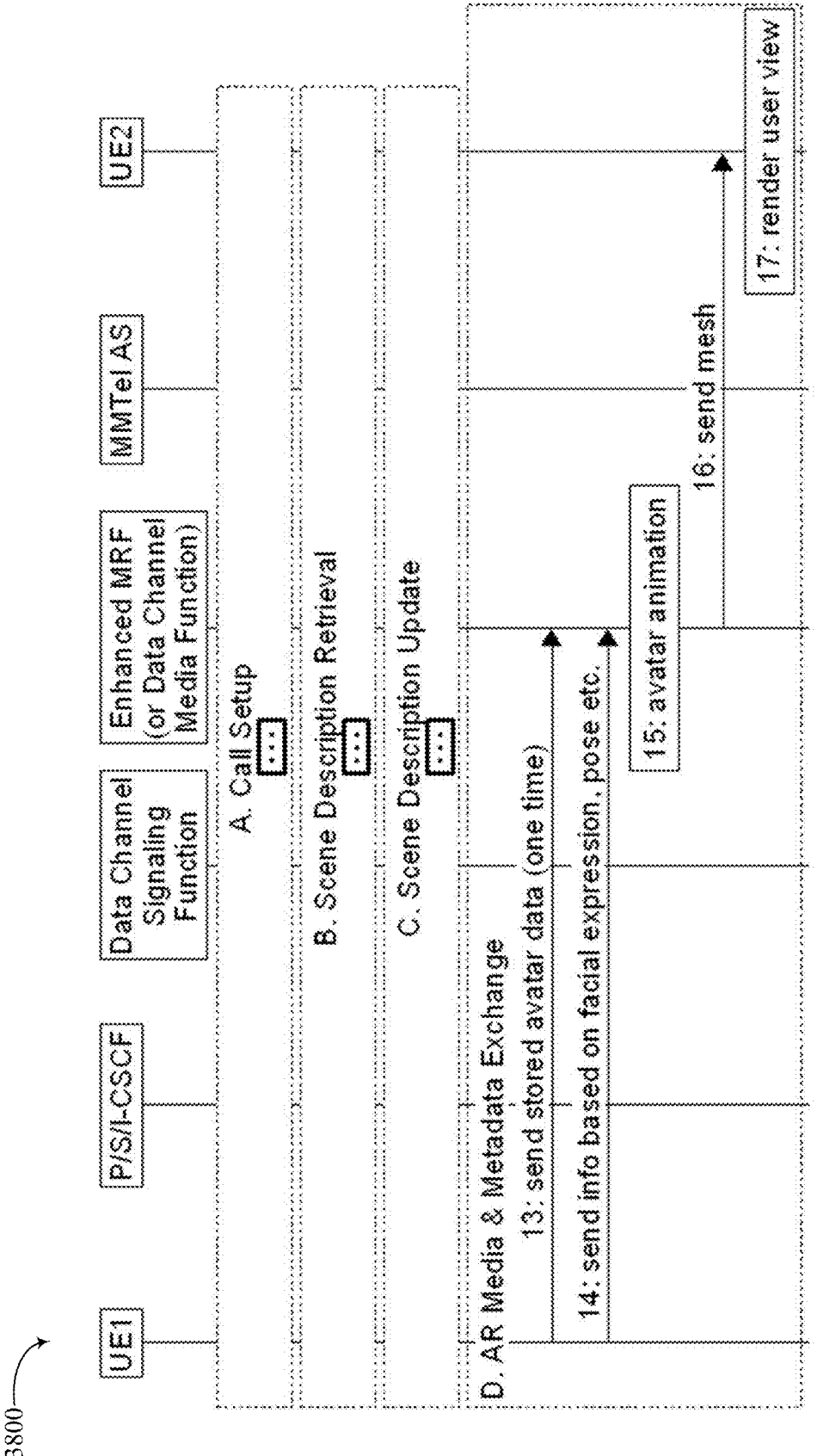
FIG. 38 is a signaling diagram illustrating another example of communications among various devices, according to aspects of the disclosure.

FIG. 38 is a signaling diagram 3800 illustrating another example of communications among a first UE (shown as UE1), a P-CSCF, a S-CSCF, an I-CSCF, a MRF, a MMTel AS, and a second UE (shown as UE2), such as in an XR system that includes an edge server and a target device (e.g., a target HMD) with a decoder. In some cases, the operations of the signaling diagram 3800 can be performed according to 3GPP SA4. As shown, at operation 13 during AR media and metadata exchange between the first UE, the MRF (e.g., which may be part of the edge server of FIG. 30, FIG. 31, and/or other figure described herein), and the second UE, the first UE can send (e.g., transmit) stored avatar data (e.g., from user A enrolled data 2150 of FIG. 34 or FIG. 35) to the MRF. At operation 14, the first UE can send (e.g., transmit) information regarding a facial expression of the user, pose, etc. (e.g., animation parameters, such as facial part codes from the face encoder 709, hand joints from the hand engine 716, etc.) to the MRF. At operation 15, the MRF performs avatar animation (e.g., using user virtual representation system 720). At operation 16, the MRF sends (e.g., transmits) a mesh of the user of the first UE to the second UE. At operation 17, the UE2 renders a user view (e.g., using user view render system 2175). In some cases, UE2 may perform the operations described above with respect to UE1 to allow UE1 to render a user view.

Figure 39:
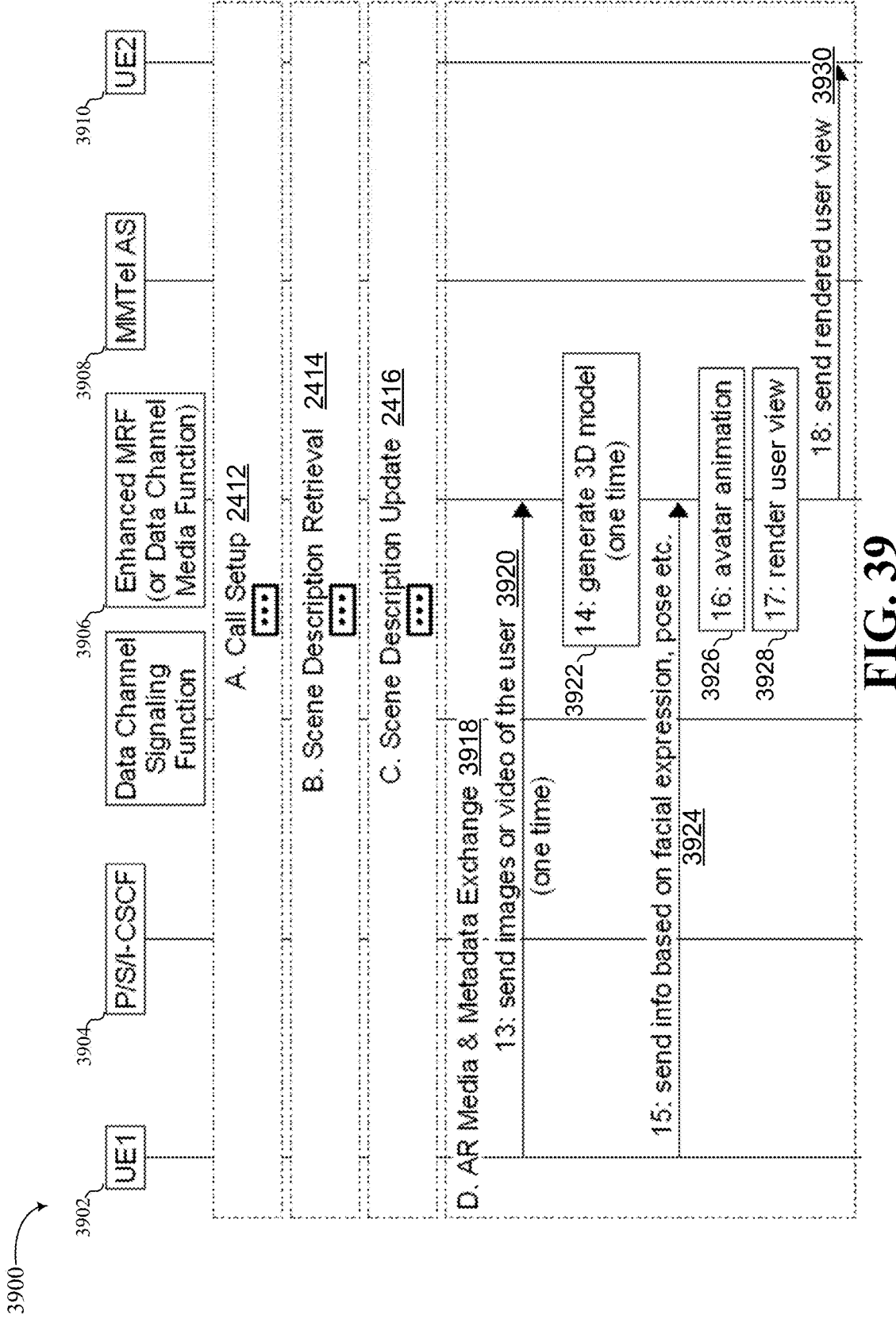
FIG. 39 is a signaling diagram illustrating another example of communications among various devices, according to aspects of the disclosure.

FIG. 39 is a signaling diagram 3900 illustrating communications among a first UE (shown as UE1 3902), a P-CSCF, a S-CSCF, an I-CSCF (collectively P/S/I-CSCF 3904), a MRF 3906, a MMTel AS 3908, and a second UE (shown as UE2 3910). The operations of the signaling diagram 3900 can be performed by the XR system 3000 of FIG. 30 and/or the XR system 3100 of FIG. 31. In some cases, the operations of the signaling diagram 3900 can be performed according to 3GPP SA4. In some cases, a call setup procedure 2412, scene description retrieval procedure 2414, and scene description update procedure 2416 may be performed in a manner substantially similar to that discussed above with respect to FIG. 24 based on similarly numbered components of FIG. 30 and FIG. 31. As shown, during an AR media and metadata exchange 3918 between the first UE 3902, the MRF 3906, and the second UE 3910, the first UE 3902 sends 3920 (e.g., transmits) images or video of a user (e.g., sends the data one time) to the enhanced MRF 3906 (e.g., which may be part of the edge server of FIG. 30 and/or FIG. 31). The MRF 3906 may generate a 3D model 3922 of the avatar based on the images or view of the user. The first UE 3902 sends 3924 (e.g., transmits) information (e.g., animation parameters, such as the facial part codes, the face blend shapes, the hand joints, the head pose, and/or the audio stream of FIG. 30 or FIG. 31) based on facial expressions, pose, etc. to the MRF 3906. The MRF 3906 performs avatar animation 3926 (e.g., using the user virtual representation system 720 of FIG. 30 or FIG. 31). The MRF 3906 renders a user view 4028 (e.g., using the user view render system 2175 of FIG. 30 or FIG. 31). The MRF 3906 transmits 3930 the rendered user view to the second UE 3910. In some cases, UE2 3910 may perform the operations described above with respect to UE1 3902 to allow UE1 3902 to receive a rendered user view from the MRF 3906.

Figure 40:
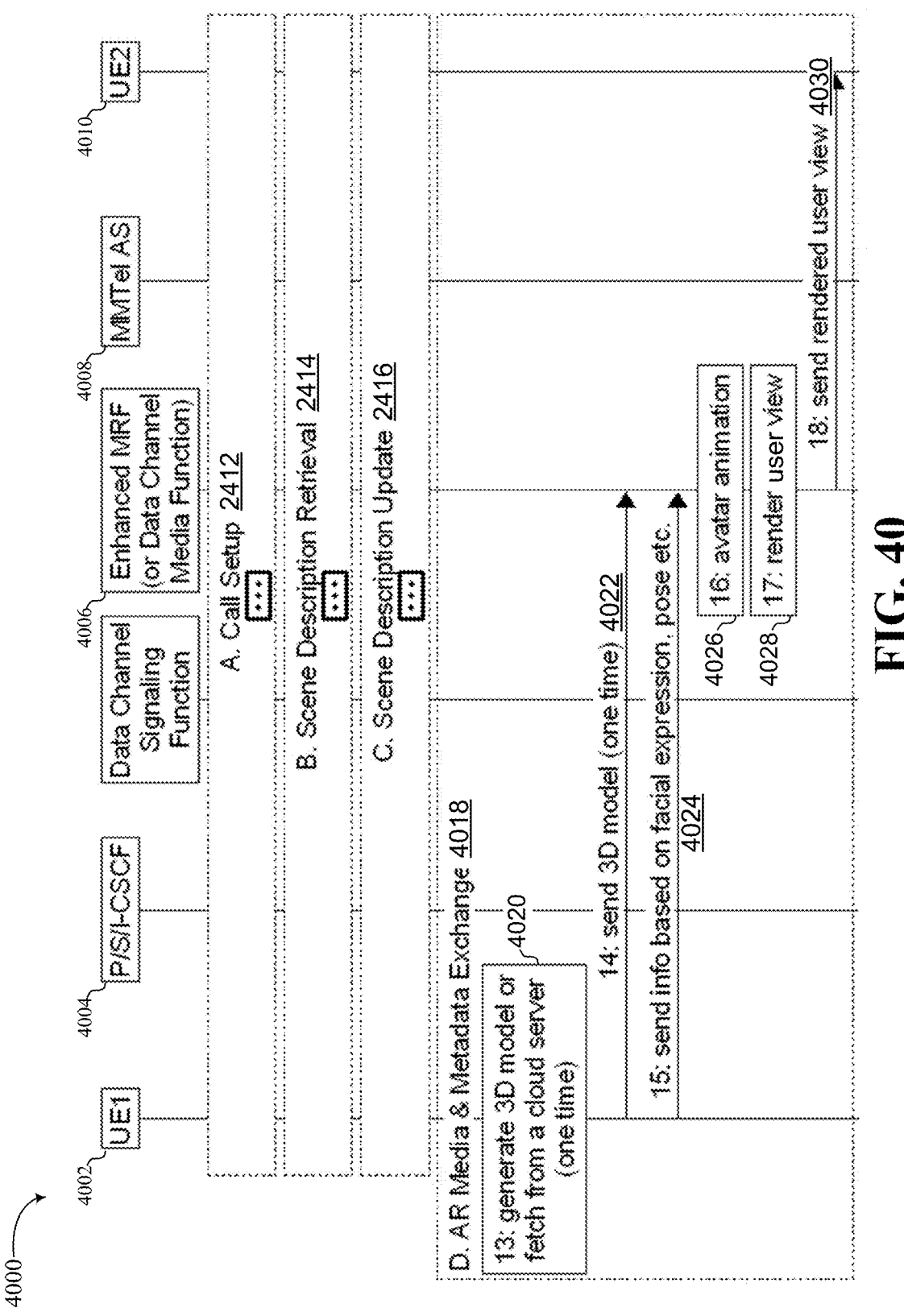
FIG. 40 is a signaling diagram illustrating another example of communications among various devices, according to aspects of the disclosure.

FIG. 40 is a signaling diagram 4000 illustrating communications among a first UE (shown as UE1 4002), a P-CSCF, a S-CSCF, an I-CSCF (collectively P/S/I-CSCF 4004), a MRF 4006, a MMTel AS 4008, and a second UE (shown as UE2 4010). The operations of the signaling diagram 4000 can be performed by the XR system 3000 of FIG. 30 and/or the XR system 3100 of FIG. 31. In some cases, the operations of the signaling diagram 4000 can be performed according to 3GPP SA4. In some cases, a call setup procedure 2412, scene description retrieval procedure 2414, and scene description update procedure 2416 may be performed in a manner substantially similar to that discussed above with respect to FIG. 24 based on similarly numbered components of FIG. 30 and FIG. 31. As shown, during an AR media and metadata exchange 4018 between the first UE 4002, the MRF 4006, and the second UE 4010, the first UE 4002 may generate or otherwise obtain 4020 (e.g., from a server) a 3D model of the avatar. The first UE 4002 then sends 4022 (e.g., transmits) the 3D model of the avatar (e.g., sends the data one time) to the enhanced MRF 4006 (e.g., which may be part of the edge server of FIG. 30 and/or FIG. 31). The first UE 4002 sends 4024 (e.g., transmits) information (e.g., animation parameters, such as the facial part codes, the face blend shapes, the hand joints, the head pose, and/or the audio stream of FIG. 30 or FIG. 31) based on facial expressions, pose, etc. to the MRF 4006. The MRF 4006 performs avatar animation 4026 (e.g., using the user virtual representation system 720 of FIG. 30 or FIG. 31). The MRF 4006 renders a user view 4028 (e.g., using the user view render system 2175 of FIG. 30 or FIG. 31). The MRF 4006 transmits 4030 the rendered user view to the second UE 4010. In some cases, UE2 4010 may perform the operations described above with respect to UE1 4002 to allow UE1 4002 to receive a rendered user view from the MRF 4006.

The avatar call flows described herein (e.g., the device-to-device call flow of FIG. 16, the server-based call flow of FIG. 18, etc.) can provide for reduced transmission data rates when transmitting information used for animating virtual representations of users. For instance, the device-to-device call flow can include two parts, including an initialization stage where mesh information is transmitted (e.g., the mesh information 1610 of FIG. 16, the mesh information 1810 of FIG. 18, etc.) and a first conversion stage where animation parameters are transmitted (e.g., the animation parameters 1614 of FIG. 16, the animation parameters 1814 of FIG. 18, etc.). The server-based call flow can include three parts, including the initialization stage, the first conversion stage, and a second conversion stage where display images (e.g., two display images per frame) are transmitted to each of the client devices in the server-based call flow. The data transmission rates for each of these stages can be kept minimal using the call flows described herein.

For example, in the initialization stage, the information defining the mesh and the assets may be transmitted only one time per avatar call and per user (or only one time for multiple avatar calls per user when a user has an account with the server, as described with respect to FIG. 18). In one illustrative example, during the initialization stage for an avatar call for a user of a client device, the client device can transmit (e.g., to the second client device 1604 in the device-to-device call flow of FIG. 16, to the server device 1805 in the server-based call flow of FIG. 18, etc.) the mesh information for the virtual representation (e.g., the avatar) of the user, including at least one mesh, a normal map, an albedo (or diffuse) map, a specular reflection map, and in some cases at least part of a neural network (e.g., weights and/or other parameters of a decoder neural network used to decode mesh animation parameters such as one or more codes or feature vectors). The mesh information for the virtual representation of the user can be transmitted one time at the start of the avatar call. In one illustrative example, Table 1 below provides an example of a size of the mesh information data:

TABLE 1

| Data | Size |
| --- | --- |
| Mesh | 35 MB |
| Albedo (Diffuse) Map | 4000 × 4000 |
| Specular Reflection Map | 4000 × 4000 |
| Normal Map | 4000 × 4000 |
| Network Weights | 16 MB |

As noted above, the mesh information data can also be compressed using any compression technique, which can further reduce the size of the data.

As another example, in the first conversation stage, the mesh animation parameters for a user can be transmitted by a client device (e.g., to the client device 1604 in the device-to-device call flow of FIG. 16, to the server device 1805 in the server-based call flow of FIG. 18, etc.) for each frame of a virtual session at a frame rate of the virtual session, such as at 30 FPS, 60 FPS, or other frame rate. In one illustrative example, the parameters update can vary between 30 to 60 FPS (where updated mesh animation parameters can be transmitted at a varying rate between 30 to 60 FPS). As described herein, the mesh animation parameters per user can include facial part codes, face blend shapes, hand joints codes, head pose information, and an audio stream. In one illustrative example, Table 2 below provides an example of a size of the mesh animation parameters. The data in Table 2 is approximation for a single user at a rate of 60 FPS, with an assumption of 2 bytes/entry for the face part code, face blend shapes, and hand joints and 4 bytes/entry for the head pose.

TABLE 2

| Data | Rate (Kbps) | Output Size | Sampling Rate |
|---|---|---|---|
| Facial Part Codes | 720 | 3 × 256 | 60 FPS |
| Face Blend Shapes | 240 | 1 × 256 | 60 FPS |
| Hand Joints | 120 | 2 × 64 | 60 FPS |
| Head Pose | 11.2 | 1 × 6 | 60 FPS |
| Audio Stream | 256 | N/A | 44.1 KHz |
| Total Per User | 1347.4 | | N/A |

As noted above, the data of the mesh animation parameters can also be compressed using any compression technique, which can further reduce the size of the data.

As another example, in the second conversation stage (for the server-based call flow), a server device (e.g., the server device 1805) can transmit display images (e.g., two display images per frame, including one display image per eye) to each of the client devices in the server-based call flow (e.g., the call flow of FIG. 18). The server device can transmit the images at the frame rate of the virtual session, such as at 60 FPS. For example, assuming a display size of 4K (corresponding to a resolution of 3840×2160), the server device can send a total of 2× (3840×2160) streams at 60 FPS for each user. In another example, the server device can stream 2 images at a resolution of 1024×768 each and the client device can upscale the images to a 4K resolution.

Figure 41:
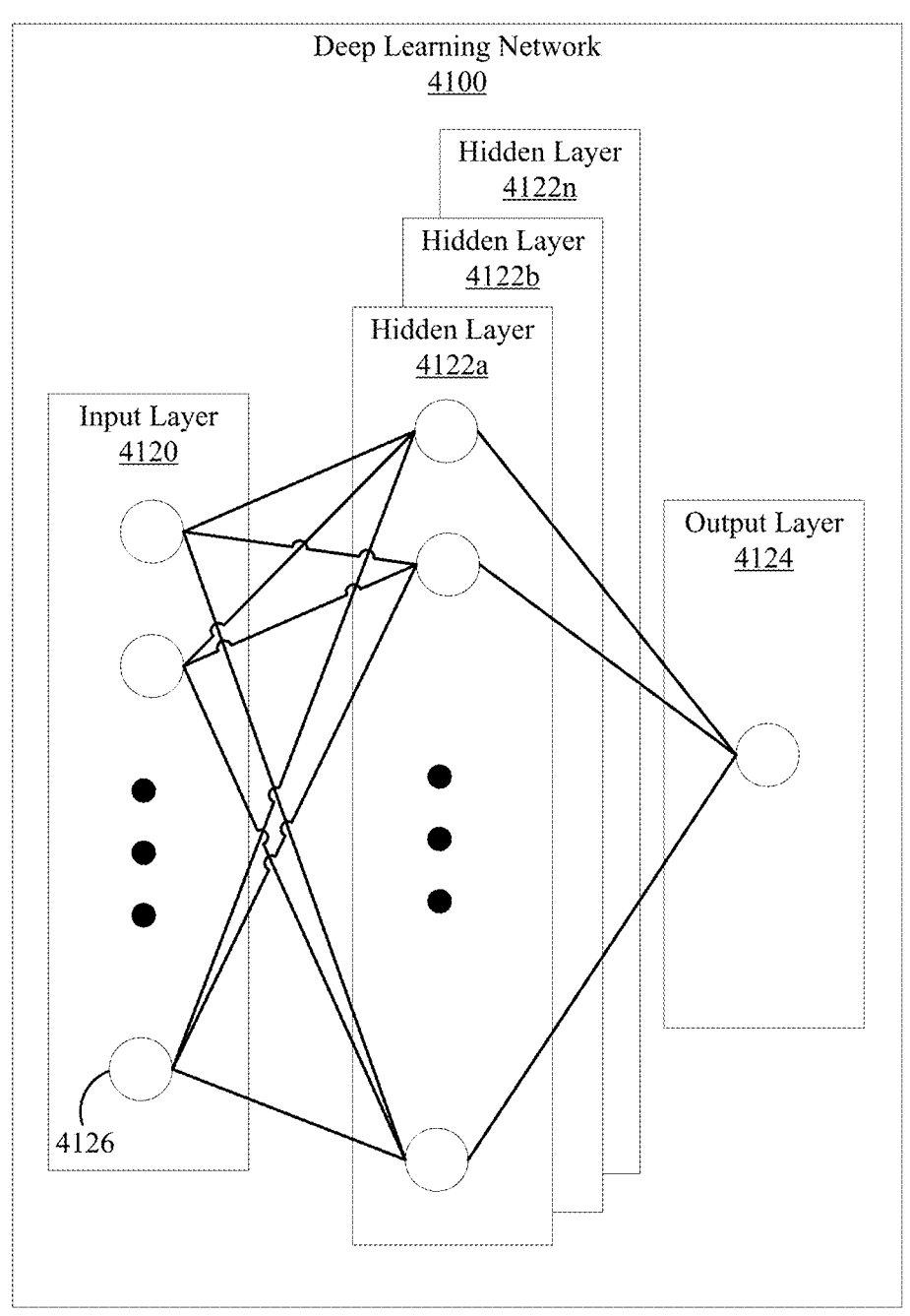
FIG. 41 is a block diagram illustrating an example of a deep learning network, in accordance with some examples.

As described herein, various aspects may be implemented using a deep network, such as a neural network or multiple neural networks. FIG. 41 is an illustrative example of a deep learning neural network 4100 that can be used by a 3D model training system. An input layer 4120 includes input data. In one illustrative example, the input layer 4120 can include data representing the pixels of an input video frame. The neural network 4100 includes multiple hidden layers 4122a, 4122b, through 4122n. The hidden layers 4122a, 4122b, through 4122n include "n" number of hidden layers, where "n" is an integer greater than or equal to one. The number of hidden layers can be made to include as many layers as needed for the given application. The neural network 4100 further includes an output layer 4124 that provides an output resulting from the processing performed by the hidden layers 4122a, 4122b, through 4122n. In one illustrative example, the output layer 4124 can provide a classification for an object in an input video frame. The classification can include a class identifying the type of object (e.g., a person, a dog, a cat, or other object).

The neural network 4100 is a multi-layer neural network of interconnected nodes. Each node can represent a piece of information. Information associated with the nodes is shared among the different layers and each layer retains information as information is processed. In some cases, the neural network 4100 can include a feed-forward network, in which case there are no feedback connections where outputs of the network are fed back into itself. In some cases, the neural network 4100 can include a recurrent neural network, which can have loops that allow information to be carried across nodes while reading in input.

Information can be exchanged between nodes through node-to-node interconnections between the various layers. Nodes of the input layer 4120 can activate a set of nodes in the first hidden layer 4122a. For example, as shown, each of the input nodes of the input layer 4120 is connected to each of the nodes of the first hidden layer 4122a. The nodes of the hidden layers 4122a, 4122b, through 4122n can transform the information of each input node by applying activation functions to the information. The information derived from the transformation can then be passed to and can activate the nodes of the next hidden layer 4122b, which can perform their own designated functions. Example functions include convolutional, up-sampling, data transformation, and/or any other suitable functions. The output of the hidden layer 4122b can then activate nodes of the next hidden layer, and so on. The output of the last hidden layer 4122n can activate one or more nodes of the output layer 4124, at which an output is provided. In some cases, while nodes (e.g., node 4126) in the neural network 4100 are shown as having multiple output lines, a node has a single output and all lines shown as being output from a node represent the same output value.

In some cases, each node or interconnection between nodes can have a weight that is a set of parameters derived from the training of the neural network 4100. Once the neural network 4100 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 4100 to be adaptive to inputs and able to learn as more and more data is processed.

The neural network 4100 is pre-trained to process the features from the data in the input layer 4122 using the different hidden layers 4122a, 4122b, through 4122n in order to provide the output through the output layer 4124. In an example in which the neural network 4100 is used to identify objects in images, the neural network 4100 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 4100 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 4100 is trained well enough so that the weights of the layers are accurately tuned.

For the example of identifying objects in images, the forward pass can include passing a training image through the neural network 4100. The weights are initially randomized before the neural network 4100 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 4100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 4100 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(target-output)^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 4100 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta\frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 4100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 4100 can include any other deep network other than a CNN, such as an autoencoder, a deep belief nets (DBNs), a Recurrent Neural Networks (RNNs), among others.

Figure 42:
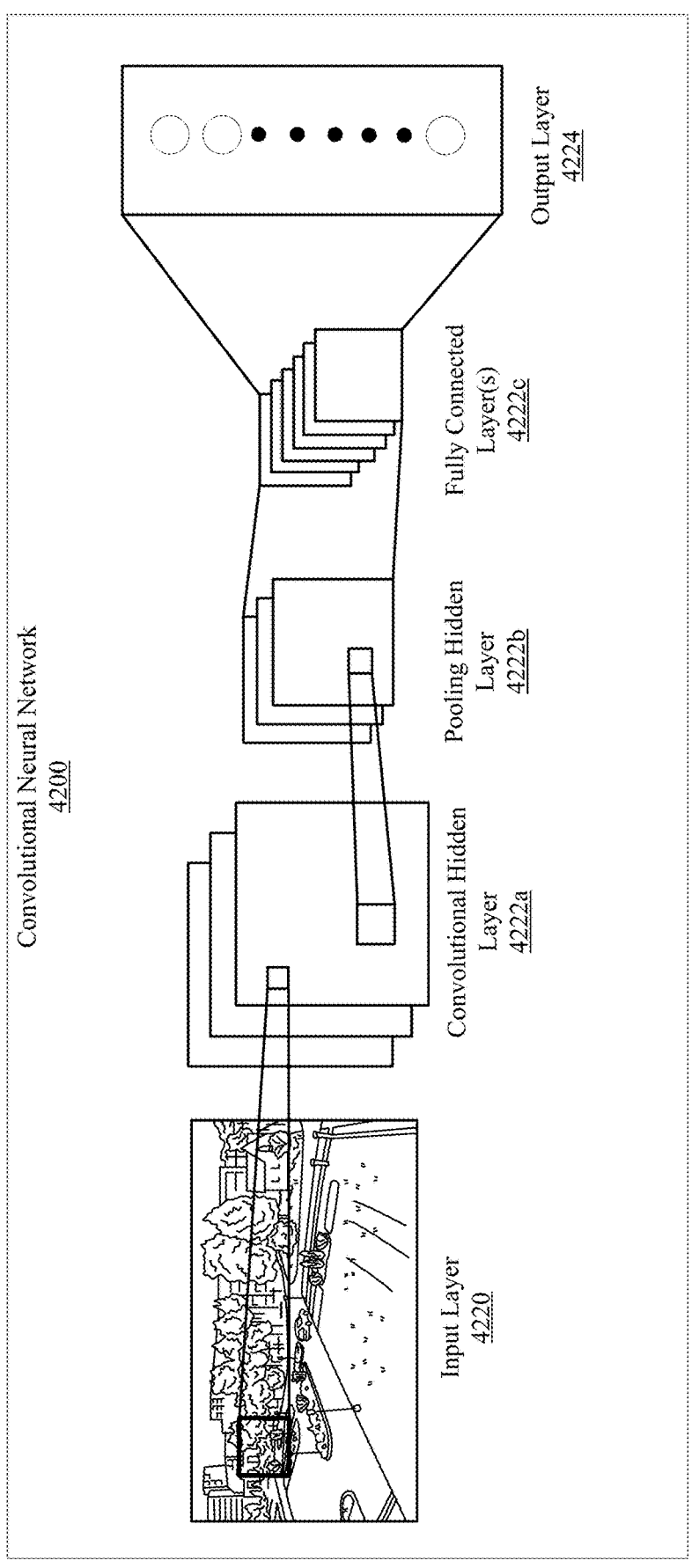
FIG. 42 is a block diagram illustrating an example of a convolutional neural network, in accordance with some examples.

FIG. 42 is an illustrative example of a convolutional neural network 4200 (CNN 4200). The input layer 4220 of the CNN 4200 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 4222a, an optional non-linear activation layer, a pooling hidden layer 4222b, and fully connected hidden layers 4222c to get an output at the output layer 4224. While only one of each hidden layer is shown in FIG. 42, one of ordinary skill will appreciate that multiple convolutional hidden layers, non-linear layers, pooling hidden layers, and/or fully connected layers can be included in the CNN 4200. As previously described, the output can indicate a single class of an object or can include a probability of classes that best describe the object in the image.

The first layer of the CNN 4200 is the convolutional hidden layer 4222a. The convolutional hidden layer 4222a analyzes the image data of the input layer 4220. Each node of the convolutional hidden layer 4222a is connected to a region of nodes (pixels) of the input image called a receptive field. The convolutional hidden layer 4222a can be considered as one or more filters (each filter corresponding to a different activation or feature map), with each convolutional iteration of a filter being a node or neuron of the convolutional hidden layer 4222a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 4222a. Each connection between a node and a receptive field for that node learns a weight and, in some cases, an overall bias such that each node learns to analyze its particular local receptive field in the input image. Each node of the hidden layer 4222a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 4222a is due to each node of the convolutional layer being applied to its corresponding receptive field. For example, a filter of the convolutional hidden layer 4222a can begin in the top-left corner of the input image array and can convolve around the input image. As noted above, each convolutional iteration of the filter can be considered a node or neuron of the convolutional hidden layer 4222a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 4222a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 4222a.

The mapping from the input layer to the convolutional hidden layer 4222a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 4222a can include several activation maps in order to identify multiple features in an image. The example shown in FIG. 42 includes three activation maps. Using three activation maps, the convolutional hidden layer 4222a can detect three different kinds of features, with each feature being detectable across the entire image.

In some examples, a non-linear hidden layer can be applied after the convolutional hidden layer 4222a. The non-linear layer can be used to introduce non-linearity to a system that has been computing linear operations. One illustrative example of a non-linear layer is a rectified linear unit (ReLU) layer. A ReLU layer can apply the function $f(x)=max(0, x)$ to all of the values in the input volume, which changes all the negative activations to 0. The ReLU can thus increase the non-linear properties of the CNN 4200 without affecting the receptive fields of the convolutional hidden layer 4222a.

The pooling hidden layer 4222b can be applied after the convolutional hidden layer 4222a (and after the non-linear hidden layer when used). The pooling hidden layer 4222b is used to simplify the information in the output from the convolutional hidden layer 4222a. For example, the pooling hidden layer 4222b can take each activation map output from the convolutional hidden layer 4222a and generates a condensed activation map (or feature map) using a pooling function. Max-pooling is one example of a function performed by a pooling hidden layer. Other forms of pooling functions be used by the pooling hidden layer 4222a, such as average pooling, L2-norm pooling, or other suitable pooling functions. A pooling function (e.g., a max-pooling filter, an L2-norm filter, or other suitable pooling filter) is applied to each activation map included in the convolutional hidden layer 4222a. In the example shown in FIG. 42, three pooling filters are used for the three activation maps in the convolutional hidden layer 4222a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 4222a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 4222a having a dimension of 24×24 nodes, the output from the pooling hidden layer 4222b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 4200.

The final layer of connections in the network is a fully-connected layer that connects every node from the pooling hidden layer 4222b to every one of the output nodes in the output layer 4224. Using the example above, the input layer includes 28×28 nodes encoding the pixel intensities of the input image, the convolutional hidden layer 4222a includes 3×24×24 hidden feature nodes based on application of a 5×5 local receptive field (for the filters) to three activation maps, and the pooling layer 4222b includes a layer of 3×12×12 hidden feature nodes based on application of max-pooling filter to 2×2 regions across each of the three feature maps. Extending this example, the output layer 4224 can include ten output nodes. In such an example, every node of the 3×12×12 pooling hidden layer 4222b is connected to every node of the output layer 4224.

The fully connected layer 4222c can obtain the output of the previous pooling layer 4222b (which should represent the activation maps of high-level features) and determines the features that most correlate to a particular class. For example, the fully connected layer 4222c layer can determine the high-level features that most strongly correlate to a particular class, and can include weights (nodes) for the high-level features. A product can be computed between the weights of the fully connected layer 4222c and the pooling hidden layer 4222b to obtain probabilities for the different classes. For example, if the CNN 4200 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 4224 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 43:
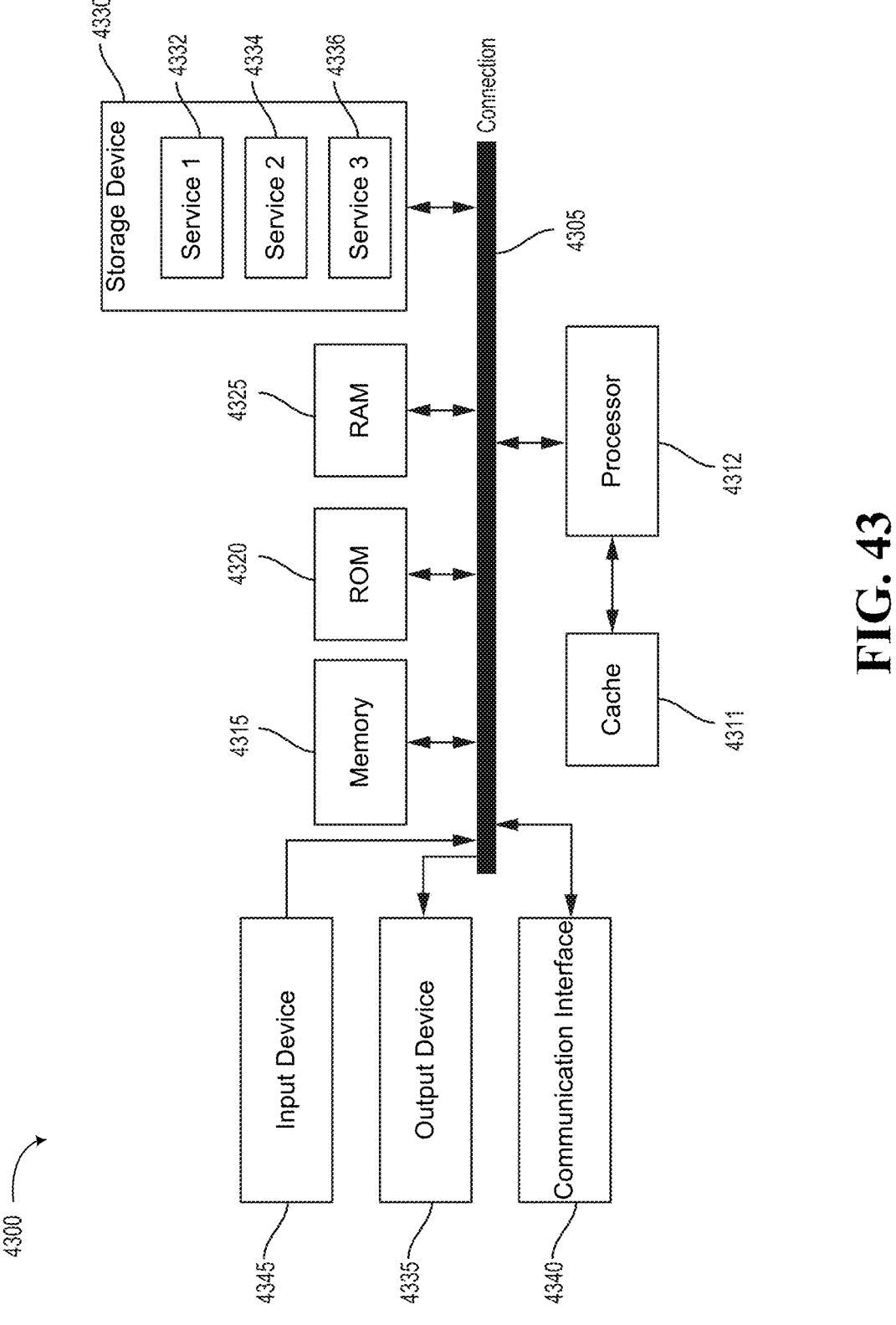
FIG. 43 is a diagram illustrating an example of a computing system, according to aspects of the disclosure.

FIG. 43 is a diagram illustrating an example of a system for implementing certain aspects of the present technology. In particular, FIG. 43 illustrates an example of computing system 4300, which can be for example any computing device making up internal computing system, a remote computing system, a camera, or any component thereof in which the components of the system are in communication with each other using connection 4305. Connection 4305 can be a physical connection using a bus, or a direct connection into processor 4310, such as in a chipset architecture. Connection 4305 can also be a virtual connection, networked connection, or logical connection.

In some aspects, computing system 4300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 4300 includes at least one processing unit (CPU or processor) 4310 and connection 4305 that couples various system components including system memory 4315, such as read-only memory (ROM) 4320 and random-access memory (RAM) 4325 to processor 4310. Computing system 4300 can include a cache 4311 of high-speed memory connected directly with, in close proximity to, or integrated as part of processor 4310.

Processor 4310 can include any general-purpose processor and a hardware service or software service, such as services 4332, 4334, and 4336 stored in storage device 4330, configured to control processor 4310 as well as a special-purpose processor where software instructions are incorporated into the actual processor design. Processor 4310 may essentially be a completely self-contained computing system, containing multiple cores or processors, a bus, memory controller, cache, etc. A multi-core processor may be symmetric or asymmetric.

To enable user interaction, computing system 4300 includes an input device 4345, which can represent any number of input mechanisms, such as a microphone for speech, a touch-sensitive screen for gesture or graphical input, keyboard, mouse, motion input, speech, etc. Computing system 4300 can also include output device 4335, which can be one or more of a number of output mechanisms. In some instances, multimodal systems can enable a user to provide multiple types of input/output to communicate with computing system 4300. Computing system 4300 can include communications interface 4340, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 4340 may also include one or more GNSS receivers or transceivers that are used to determine a location of the computing system 4300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 4330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 4330 can include software services, servers, services, etc., that when the code that defines such software is executed by the processor 4310, it causes the system to perform a function. In some aspects, a hardware service that performs a particular function can include the software component stored in a computer-readable medium in connection with the necessary hardware components, such as processor 4310, connection 4305, output device 4335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

FIG. 44 is a flow diagram illustrating a process 4400 for generating virtual content in a distributed system, in accordance with aspects of the present disclosure. The process 4400 may be performed by a computing device (or apparatus) or a component (e.g., a chipset, codec, etc.) of the computing device, such as CPU 510 and/or GPU 525 of FIG. 5, and/or processor 4312 of FIG. 43. The computing device may be an animation and scene rendering system (e.g., an edge or cloud-based server, a personal computer acting as a server device, a mobile device such as a mobile phone acting as a server device, an XR device acting as a server device, a network router, or other device acting as a server or other device). The operations of the process 4400 may be implemented as software components that are executed and run on one or more processors (e.g., CPU 510 and/or GPU 525 of FIG. 5, and/or processor 4312 of FIG. 43).

At block 4402, the computing device (or component thereof) (e.g., client device 1602 of FIGS. 16 and 17, client device 1802 of FIGS. 18 and 19) may transmit, to a second device (e.g., client device 1604 of FIGS. 16 and 17, server device 1805 of FIGS. 18 and 19, client device 1904 of FIG. 19), a call establishment request for a virtual representation call for a virtual session (e.g., call establishment request 1606 of FIG. 16, call establishment request 1806 of FIG. 18, etc.). In some cases, the second device comprises a server device (e.g., server device 1805 of FIGS. 18 and 19). In some examples, the second device comprises a client device (e.g., client device 1604 of FIG. 16, client device 1904 of FIG. 19).

At block 4404, the computing device (or component thereof) may receive, from the second device, a call acceptance indicating acceptance of the call establishment request (e.g., call acceptance 1608 of FIG. 16, call acceptance 1808 of FIG. 18).

At block 4406, the computing device (or component thereof) may transmit, to the second device, first mesh information for a first virtual representation of a first user of the apparatus (e.g., mesh information 1610 of FIG. 16, mesh information 1810 of FIG. 18). In some cases, the first mesh information is transmitted once for the virtual representation call for the virtual session, and wherein the second mesh information is received once for the virtual representation call for the virtual session. In some examples, the first mesh information is transmitted to the server device for storage prior to transmitting the call establishment request. In some cases, the first mesh information is transmitted to the server device for storage as a part of a registration procedure. In some examples, the computing device (or component thereof) may authenticate with the server device, to enable access to stored first mesh information.

At block 4408, the computing device (or component thereof) may transmit, to the second device, first mesh animation parameters for the first virtual representation of the first user of the apparatus (e.g., mesh animation parameters 1614 of FIG. 16, mesh animation parameters 1814 of FIG. 18).

At block 4410, the computing device (or component thereof) may receive, from the second device, second mesh information for a second virtual representation of a second user of the second device (e.g., mesh information 1612 of FIG. 16, split rendering 1815 of FIG. 18)

At block 4412, the computing device (or component thereof) may receive, from the second device, second mesh animation parameters for the second virtual representation of the second user of the second device (e.g., exchange mesh animation parameters 1614 of FIG. 16, split rendering 1815 of FIG. 18).

At block 4414, the computing device (or component thereof) may generate, based on the second mesh information and the second mesh animation parameters, the second virtual representation of the second user of the second device. For example, the server device can use the animation parameters (and the mesh information) of the various client devices to render the avatars for the client devices and the scene for the virtual session from the perspective of the various client devices. In some cases, the first mesh animation parameters are transmitted and the second mesh animation parameters are received for each frame the virtual session at a frame rate associated with the virtual session.

FIG. 45 is a flow diagram illustrating a process 4500 for generating virtual content in a distributed system, in accordance with aspects of the present disclosure. The process 4500 may be performed by a computing device (or apparatus) or a component (e.g., a chipset, codec, etc.) of the computing device, such as CPU 510 and/or GPU 525 of FIG. 5, and/or processor 4312 of FIG. 43. The computing device may be a mobile device (e.g., a mobile phone, device 105 of FIG. 1, Client device 302, 304 of FIG. 3, client devices 405 of FIG. 4, device 500, client devices 602, 604, and/or 606 of FIG. 6, client device 702, 704 of FIG. 7, computing system 4300 of FIG. 43, etc.), a network-connected wearable such as a watch, an extended reality (XR) device such as a virtual reality (VR) device or augmented reality (AR) device, a companion device, vehicle or component or system of a vehicle, or other type of computing device. The operations of the process 4500 may be implemented as software components that are executed and run on one or more processors (e.g., CPU 510 and/or GPU 525 of FIG. 5, and/or processor 4312 of FIG. 43).

At block 4502, the computing device (or component thereof) (e.g., server device 1805 of FIGS. 18 and 19) may receive, from a first client device (e.g., client device 1802 of FIGS. 18 and 19), a call establishment request for a virtual representation call for a virtual session (e.g., call establishment request 1806 of FIG. 18, etc.).

At block 4504, the computing device (or component thereof) may transmit the call establishment request to a second client device.

At block 4506, the computing device (or component thereof) may receive, from the second client device, a call acceptance indicating acceptance of the call establishment request.

At block 4508, the computing device (or component thereof) may transmit, to the first client device, the call acceptance (e.g., call acceptance 1808 of FIG. 18).

At block 4510, the computing device (or component thereof) may receive, from the first client device, first mesh information for a first virtual representation of a first user of the first client device (e.g., mesh information 1810 of FIG. 18). In some cases, the first mesh information is received once for the virtual representation call for the virtual session. In some examples, the first mesh information is received in response to the call acceptance transmitted to the first client device. In some cases, the first mesh information is received before receiving the call establishment request. In some examples, the first mesh information is received as a part of a registration procedure. In some cases, the computing device (or component thereof) may store the first mesh information and retrieve the first mesh information based on the received call acceptance. In some examples, the computing device (or component thereof) may authenticate the first client device to enable access to the stored first mesh information.

At block 4512, the computing device (or component thereof) may receive first mesh animation parameters for the first virtual representation of the first user of the first client device (e.g., mesh animation parameters 1814 of FIG. 18). In some cases, the first mesh animation parameters are received for each frame the virtual session at a frame rate associated with the virtual session. In some examples, the first mesh animation parameters include information representing the first user. In some cases, the information representing the first user comprises at least one of information representing a face of the first user of the first client device, information representing a body of the first user of the first client device, information representing one or more hands of the first user of the first client device, pose information of the first client device, or audio associated with an environment in which the first client device is located.

At block 4514, the computing device (or component thereof) may generate, based on the first mesh information and the first mesh animation parameters, the first virtual representation of the first user of the first client device (e.g., split rendering 1815 of FIG. 18).

At block 4516, the computing device (or component thereof) may transmit, to the second client device, the first virtual representation of the first user of the first client device.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to (">") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. A and B and C, or any duplicate information or data (e.g., A and A, B and B, C and C. A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method of generating virtual content at a first device in a distributed system, the method comprising: receiving, from a second device associated with a virtual session, input information associated with at least one of the second device or a user of the second device; generating, based on the input information, a virtual representation of the user of the second device; generating a virtual scene from a perspective of a user of a third device associated with the virtual session, wherein the virtual scene includes the virtual representation of the user of the second device; and transmitting, to the third device, one or more frames depicting the virtual scene from the perspective of the user of the third device.

Aspect 2. The method of Aspect 1, wherein the input information includes at least one of information representing a face of the user of the second device, information representing a body of the user of the second device, information representing one or more hands of the user of the second device, pose information of the second device, or audio associated with an environment in which the second device is located.

Aspect 3. The method of Aspect 2, wherein the information representing the body of the user of the second device includes a pose of the body, and wherein the information representing the one or more hands of the user of the second device includes a respective pose of each hand of the one or more hands.

Aspect 4. The method of any of Aspects 2 or 3, wherein generating the virtual representation comprises: generating a virtual representation of a face of the user of the second device using the information representing the face of the user, the pose information of the second device, and pose information of the third device; generating a virtual representation of a body of the user of the second device using the pose information of the second device and pose information of the third device; and generating a virtual representation of hair of the user of the second device.

Aspect 5. The method of Aspect 4, wherein the virtual representation of the body of the user of the second device is generated further using the information representing the body of the user.

Aspect 6. The method of any of Aspects 4 or 5, wherein the virtual representation of the body of the user of the second device is generated further using inverse kinematics.

Aspect 7. The method of any of Aspects 4 to 6, wherein the virtual representation of the body of the user of the second device is generated further using the information representing the one or more hands of the user.

Aspect 8. The method of any of Aspects 4 to 7, further comprising: combining the virtual representation of the face with the virtual representation of the body to generate a combined virtual representation; and adding the virtual representation of the hair to the combined virtual representation.

Aspect 9. The method of any of Aspects 1 to 8, wherein generating the virtual scene comprises: obtaining a background representation of the virtual scene; adjusting, based on the background representation of the virtual scene, lighting of the virtual representation of the user of the second device to generate a modified virtual representation of the user; and combining the background representation of the virtual scene with the modified virtual representation of the user.

Aspect 10. The method of any of Aspects 1 to 9, further comprising: generating, based on input information from the third device, a virtual representation of the user of the third device; generating a virtual scene including the virtual representation of the user of the third device from a perspective of the user of second device; and transmitting, to the second device, one or more frames depicting the virtual scene from the perspective of the user of the second device.

Aspect 11. An apparatus associated with a first device for generating virtual content in a distributed system, comprising: at least one memory; and at least one processor coupled to at least one memory and configured to: receive, from a second device associated with a virtual session, input information associated with at least one of the second device or a user of the second device; generate, based on the input information, a virtual representation of the user of the second device; generate a virtual scene from a perspective of a user of a third device associated with the virtual session, wherein the virtual scene includes the virtual representation of the user of the second device; and output, for transmission to the third device, one or more frames depicting the virtual scene from the perspective of the user of the third device.

Aspect 12. The apparatus of Aspect 11, wherein the input information includes at least one of information representing a face of the user of the second device, information representing a body of the user of the second device, information representing one or more hands of the user of the second device, pose information of the second device, or audio associated with an environment in which the second device is located.

Aspect 13. The apparatus of Aspect 12, wherein the information representing the body of the user of the second device includes a pose of the body, and wherein the information representing the one or more hands of the user of the second device includes a respective pose of each hand of the one or more hands.

Aspect 14. The apparatus of any of Aspects 12 or 13, wherein the at least one processor is configured to: generate a virtual representation of a face of the user of the second device using the information representing the face of the user, the pose information of the second device, and pose information of the third device; generate a virtual representation of a body of the user of the second device using the pose information of the second device and pose information of the third device; and generate a virtual representation of hair of the user of the second device.

Aspect 15. The apparatus of Aspect 14, wherein the virtual representation of the body of the user of the second device is generated further using the information representing the body of the user.

Aspect 16. The apparatus of any of Aspects 14 or 15, wherein the virtual representation of the body of the user of the second device is generated further using inverse kinematics.

Aspect 17. The apparatus of any of Aspects 14 to 16, wherein the virtual representation of the body of the user of the second device is generated further using the information representing the one or more hands of the user.

Aspect 18. The apparatus of any of Aspects 14 to 17, wherein the at least one processor is configured to: combine the virtual representation of the face with the virtual representation of the body to generate a combined virtual representation; and add the virtual representation of the hair to the combined virtual representation.

Aspect 19. The apparatus of any of Aspects 11 to 18, wherein the at least one processor is configured to: obtain a background representation of the virtual scene; adjust, based on the background representation of the virtual scene, lighting of the virtual representation of the user of the second device to generate a modified virtual representation of the user; and combine the background representation of the virtual scene with the modified virtual representation of the user.

Aspect 20. The apparatus of any of Aspects 11 to 19, wherein the at least one processor is configured to: generate, based on input information from the third device, a virtual representation of the user of the third device; generate a virtual scene including the virtual representation of the user of the third device from a perspective of the user of second device; and output, for transmission to the second device, one or more frames depicting the virtual scene from the perspective of the user of the second device.

Aspect 21. The apparatus of any of Aspects 11 to 20, wherein the apparatus is implemented as the first device, and further comprising at least one transceiver configured to: receive the input information from the second device; and transmit, to the third device, the one or more frames.

Aspect 22. A non-transitory computer-readable medium having stored thereon instructions that, when executed by one or more processors, cause the one or more processors to perform operations according to any of Aspects 1 to 21.

Aspect 23. An apparatus for generating virtual content in a distributed system, the apparatus including one or more means for performing operations according to any of Aspects 1 to 21.

Aspect 31. A method of establishing one or more virtual sessions between users, the method comprising: transmitting, by a first device to a second device, a call establishment request for a virtual representation call for a virtual session; receiving, at the first device from the second device, a call acceptance indicating acceptance of the call establishment request; transmitting, by the first device to the second device, first mesh information for a first virtual representation of a first user of the first device; transmitting, by the first device to the second device, first mesh animation parameters for the first virtual representation of the first user of the first device; receiving, at the first device from the second device, second mesh information for a second virtual representation of a second user of the second device; receiving, at the first device from the second device, second mesh animation parameters for the second virtual representation of the second user of the second device; and generating, at the first device based on the second mesh information and the second mesh animation parameters, the second virtual representation of the second user of the second device.

Aspect 32. The method of Aspect 31, wherein the first mesh information is transmitted once for the virtual representation call for the virtual session, and wherein the second mesh information is received once for the virtual representation call for the virtual session.

Aspect 33. The method of any one of Aspects 31 or 32, wherein the first mesh animation parameters are transmitted and the second mesh animation parameters are received for each frame the virtual session at a frame rate associated with the virtual session.

Aspect 34. The method of any one of Aspects 31 to 33, wherein the second mesh animation parameters include information representing the second user.

Aspect 35. The method of Aspect 34, wherein the information representing the second user comprises at least one of information representing a face of the second user of the second device, information representing a body of the second user of the second device, information representing one or more hands of the second user of the second device, pose information of the second device, or audio associated with an environment in which the second device is located.

Aspect 36. The method of Aspect 35, wherein the information representing the body of the second user of the second device includes a pose of the body, and wherein the information representing the one or more hands of the second user of the second device includes a respective pose of each hand of the one or more hands.

Aspect 37. The method of any one of Aspects 35 or 36, wherein generating the second virtual representation comprises: generating a virtual representation of a face of the second user of the second device using the information representing the face of the second user and the pose information of the second device; generating a virtual representation of a body of the second user of the second device using the pose information of the second device; and generating a virtual representation of hair of the second user of the second device.

Aspect 38. The method of Aspect 37, wherein the virtual representation of the body of the second user of the second device is generated further using the information representing the body of the second user.

Aspect 39. The method of any one of Aspects 35 to 38, wherein the virtual representation of the body of the second user of the second device is generated further using inverse kinematics.

Aspect 40. The method of any one of Aspects 35 to 39, wherein the virtual representation of the body of the second user of the second device is generated further using the information representing the one or more hands of the second user.

Aspect 41. The method of any one of Aspects 35 to 40, further comprising: combining the virtual representation of the face with the virtual representation of the body to generate a combined virtual representation; and adding the virtual representation of the hair to the combined virtual representation.

Aspect 42. A method of establishing one or more virtual sessions between users, the method comprising: receiving, by a server device from a first client device, a call establishment request for a virtual representation call for a virtual session; transmitting, by the server device, the call establishment request to a second client device; receiving, by the server device from the second client device, a call acceptance indicating acceptance of the call establishment request; transmitting, by the server device to the first client device, the call acceptance; receiving, from the first client device based on the call acceptance, first mesh information for a first virtual representation of a first user of the first client device; transmitting, by the server device, first mesh animation parameters for the first virtual representation of the first user of the first client device; generating, by the server device based on the first mesh information and the first mesh animation parameters, the first virtual representation of the first user of the first client device; and transmitting, by the server device to the second client device, the first virtual representation of the first user of the first client device.

Aspect 43. The method of Aspect 42, wherein the first mesh information is received once for the virtual representation call for the virtual session.

Aspect 44. The method of any one of Aspects 42 or 43, wherein the first mesh animation parameters are received for each frame the virtual session at a frame rate associated with the virtual session.

Aspect 45. The method of any one of Aspects 42 to 44, wherein the first mesh animation parameters include information representing the first user.

Aspect 46. The method of Aspect 45, wherein the information representing the first user comprises at least one of information representing a face of the first user of the first client device, information representing a body of the first user of the first client device, information representing one or more hands of the first user of the first client device, pose information of the first client device, or audio associated with an environment in which the first client device is located.

Aspect 47. The method of Aspect 46, wherein the information representing the body of the first user of the first client device includes a pose of the body, and wherein the information representing the one or more hands of the first user of the first client device includes a respective pose of each hand of the one or more hands.

Aspect 48. An apparatus, comprising at least one memory and at least one processor coupled to at least one memory and configured to perform operations according to any of Aspects 31 to 40.

Aspect 49. An apparatus, comprising at least one memory and at least one processor coupled to at least one memory and configured to perform operations according to any of Aspects 41 to 45.

Aspect 50. A non-transitory computer-readable medium having stored thereon instructions that, when executed by one or more processors, cause the one or more processors to perform operations according to any of Aspects 31 to 41.

Aspect 51. A non-transitory computer-readable medium having stored thereon instructions that, when executed by one or more processors, cause the one or more processors to perform operations according to any of Aspects 42 to 47.

Aspect 52. An apparatus for generating virtual content in a distributed system, the apparatus including one or more means for performing operations according to any of Aspects 31 to 41.

Aspect 53. An apparatus for generating virtual content in a distributed system, the apparatus including one or more means for performing operations according to any of Aspects 42 to 47.

Aspect 61. A method of establishing one or more virtual sessions between users, the method comprising: transmitting, by a first device to a second device, a call establishment request for a virtual representation call for a virtual session; receiving, at the first device from the second device, a call acceptance indicating acceptance of the call establishment request; transmitting, by the first device to the second device, first mesh information for a first virtual representation of a first user of the first device; transmitting, by the first device to the second device, first mesh animation parameters for the first virtual representation of the first user of the first device; receiving, at the first device from the second device, second mesh information for a second virtual representation of a second user of the second device; receiving, at the first device from the second device, second mesh animation parameters for the second virtual representation of the second user of the second device; and generating, at the first device based on the second mesh information and the second mesh animation parameters, the second virtual representation of the second user of the second device.

Aspect 62. The method of Aspect 61, wherein the first mesh information is transmitted once for the virtual representation call for the virtual session, and wherein the second mesh information is received once for the virtual representation call for the virtual session.

Aspect 63. The method of any of Aspects 61-62, wherein the second device comprises a server device.

Aspect 64. The method of Aspect 63, wherein the first mesh information is transmitted to the server device for storage prior to transmitting the call establishment request.

Aspect 65. The method of any of Aspects 63-64, wherein the first mesh information is transmitted to the server device for storage as a part of a registration procedure.

Aspect 66. The method of Aspect 55, further comprising authenticating, by the first device, with the server device, to enable access to stored first mesh information.

Aspect 67. The method of any of Aspects 61-66, wherein the second device comprises a client device.

Aspect 68. The method of any of Aspects 61-67, wherein the first mesh animation parameters are transmitted and the second mesh animation parameters are received for each frame of the virtual session at a frame rate associated with the virtual session.

Aspect 69. The method of any of Aspects 61-68, wherein the second mesh animation parameters include information representing the second user.

Aspect 70. The method of Aspect 69, wherein the information representing the second user comprises at least one of information representing a face of the second user of the second device, information representing a body of the second user of the second device, information representing one or more hands of the second user of the second device, pose information of the second device, or audio associated with an environment in which the second device is located.

Aspect 71. The method of Aspect 60, wherein the information representing the body of the second user of the second device includes a pose of the body, and wherein the information representing the one or more hands of the second user of the second device includes a respective pose of each hand of the one or more hands.

Aspect 72. A method of establishing one or more virtual sessions between users, the method comprising: receiving, by a server device from a first client device, a call establishment request for a virtual representation call for a virtual session; transmitting, by the server device, the call establishment request to a second client device; receiving, by the server device from the second client device, a call acceptance indicating acceptance of the call establishment request; transmitting, by the server device to the first client device, the call acceptance; receiving, by the server device from the first client device, first mesh information for a first virtual representation of a first user of the first client device; receiving, by the server device, first mesh animation parameters for the first virtual representation of the first user of the first client device; generating, by the server device based on the first mesh information and the first mesh animation parameters, the first virtual representation of the first user of the first client device; and transmitting, by the server device to the second client device, the first virtual representation of the first user of the first client device.

Aspect 73. The method of Aspect 72, wherein the first mesh information is received once for the virtual representation call for the virtual session.

Aspect 74. The method of Aspect 73, wherein the first mesh information is received in response to the call acceptance transmitted to the first client device.

Aspect 75. The method of any of Aspects 72-74, wherein the first mesh information is received before receiving the call establishment request.

Aspect 76. The method of any of Aspects 72-75, wherein the first mesh information is received as a part of a registration procedure.

Aspect 77. The method of any of Aspects 72-76, further comprising: storing the first mesh information; and retrieving the first mesh information based on the received call acceptance.

Aspect 78. The method of Aspect 77, further comprising: authenticating the first client device to enable access to the stored first mesh information.

Aspect 79. The method of any of Aspects 72-78, wherein the first mesh animation parameters are received for each frame the virtual session at a frame rate associated with the virtual session.

Aspect 80. The method of any of Aspects 72-79, wherein the first mesh animation parameters include information representing the first user.

Aspect 81. The method of Aspect 80, wherein the information representing the first user comprises at least one of information representing a face of the first user of the first client device, information representing a body of the first user of the first client device, information representing one or more hands of the first user of the first client device, pose information of the first client device, or audio associated with an environment in which the first client device is located.

Aspect 82. An apparatus for communications, the apparatus comprising: at least one memory; and at least one processor coupled to the at least one memory, the at least one processor being configured to: transmit, to a second device, a call establishment request for a virtual representation call for a virtual session; receive, from the second device, a call acceptance indicating acceptance of the call establishment request; transmit, to the second device, first mesh information for a first virtual representation of a first user of the apparatus; transmit, to the second device, first mesh animation parameters for the first virtual representation of the first user of the apparatus; receive, from the second device, second mesh information for a second virtual representation of a second user of the second device; receive, from the second device, second mesh animation parameters for the second virtual representation of the second user of the second device; and generate, based on the second mesh information and the second mesh animation parameters, the second virtual representation of the second user of the second device.

Aspect 83. The apparatus of Aspect 82, wherein the first mesh information is transmitted once for the virtual representation call for the virtual session, and wherein the second mesh information is received once for the virtual representation call for the virtual session.

Aspect 84. The apparatus of Aspect 82, wherein the second device comprises a server device.

Aspect 85. The apparatus of Aspect 84, wherein the first mesh information is transmitted to the server device for storage prior to transmitting the call establishment request.

Aspect 86. The apparatus of any of Aspects 84-85, wherein the first mesh information is transmitted to the server device for storage as a part of a registration procedure.

Aspect 87. The apparatus of Aspect 86, wherein the at least one processor is further configured to authenticate with the server device, to enable access to stored first mesh information.

Aspect 88. The apparatus of any of Aspects 82-87, wherein the second device comprises a client device.

Aspect 89. The apparatus of any of Aspects 82-88, wherein the first mesh animation parameters are transmitted and the second mesh animation parameters are received for each frame the virtual session at a frame rate associated with the virtual session.

Aspect 90. An apparatus for communications, the apparatus comprising: at least one memory; and at least one processor coupled to the at least one memory, the at least one processor being configured to: receive, from a first client device, a call establishment request for a virtual representation call for a virtual session; transmit the call establishment request to a second client device; receive, from the second client device, a call acceptance indicating acceptance of the call establishment request; transmit, to the first client device, the call acceptance; receive, from the first client device, first mesh information for a first virtual representation of a first user of the first client device; receive first mesh animation parameters for the first virtual representation of the first user of the first client device; generate, based on the first mesh information and the first mesh animation parameters, the first virtual representation of the first user of the first client device; and transmit, to the second client device, the first virtual representation of the first user of the first client device.

Aspect 91. An apparatus, comprising at least one memory and at least one processor coupled to at least one memory and configured to perform operations according to any of Aspects 61 to 71.

Aspect 92. An apparatus, comprising at least one memory and at least one processor coupled to at least one memory and configured to perform operations according to any of Aspects 72 to 81.

Aspect 93. A non-transitory computer-readable medium having stored thereon instructions that, when executed by one or more processors, cause the one or more processors to perform operations according to any of Aspects 61 to 71.

Aspect 94. A non-transitory computer-readable medium having stored thereon instructions that, when executed by one or more processors, cause the one or more processors to perform operations according to any of Aspects 72 to 81.

Aspect 95. An apparatus for generating virtual content in a distributed system, the apparatus including one or more means for performing operations according to any of Aspects 61 to 71.

Aspect 96. An apparatus for generating virtual content in a distributed system, the apparatus including one or more means for performing operations according to any of Aspects 72 to 81.

What is claimed is:

1. A method of establishing one or more virtual sessions between users, the method comprising:

transmitting, by a first device to a second device, a call establishment request for a virtual representation call for a virtual session;

receiving, at the first device from the second device, a call acceptance indicating acceptance of the call establishment request;

transmitting, by the first device to the second device, first mesh information for a first virtual representation of a first user of the first device;

transmitting, by the first device to the second device, first mesh animation parameters for the first virtual representation of the first user of the first device, wherein the first mesh animation parameters comprise parameters for animating the first virtual representation separate from the first mesh information;

receiving, at the first device from the second device, second mesh information for a second virtual representation of a second user of the second device;

receiving, at the first device from the second device, second mesh animation parameters for the second virtual representation of the second user of the second device, wherein the second mesh animation parameters comprise parameters for animating the second virtual representation separate from the second mesh information; and generating, at the first device based on the second mesh information and the second mesh animation parameters, the second virtual representation of the second user of the second device.

2. The method of claim 1, wherein the first mesh information is transmitted once for the virtual representation call for the virtual session, and wherein the second mesh information is received once for the virtual representation call for the virtual session.

3. The method of claim 1, wherein the second device comprises a server device.

4. The method of claim 3, wherein the first mesh information is transmitted to the server device for storage prior to transmitting the call establishment request.

5. The method of claim 3, wherein the first mesh information is transmitted to the server device for storage as a part of a registration procedure.

6. The method of claim 5, further comprising authenticating, by the first device, with the server device, to enable access to stored first mesh information.

7. The method of claim 1, wherein the second device comprises a client device.

8. The method of claim 1, wherein the first mesh animation parameters are transmitted and the second mesh animation parameters are received for each frame of the virtual session at a frame rate associated with the virtual session.

9. The method of claim 1, wherein the second mesh animation parameters include information representing the second user.

10. The method of claim 9, wherein the information representing the second user comprises at least one of information representing a face of the second user of the second device, information representing a body of the second user of the second device, information representing one or more hands of the second user of the second device, pose information of the second device, or audio associated with an environment in which the second device is located.

11. The method of claim 10, wherein the information representing the body of the second user of the second device includes a pose of the body, and wherein the information representing the one or more hands of the second user of the second device includes a respective pose of each hand of the one or more hands.

12. A method of establishing one or more virtual sessions between users, the method comprising:

receiving, by a server device from a first client device, a call establishment request for a virtual representation call for a virtual session;

transmitting, by the server device, the call establishment request to a second client device;

receiving, by the server device from the second client device, a call acceptance indicating acceptance of the call establishment request;

transmitting, by the server device to the first client device, the call acceptance;

receiving, by the server device from the first client device, first mesh information for a first virtual representation of a first user of the first client device;

receiving, by the server device, first mesh animation parameters for the first virtual representation of the first user of the first client device, wherein the first mesh animation parameters comprise parameters for animating the first virtual representation separate from the first mesh information;

generating, by the server device based on the first mesh information and the first mesh animation parameters, the first virtual representation of the first user of the first client device; and transmitting, by the server device to the second client device, the first virtual representation of the first user of the first client device.

13. The method of claim 12, wherein the first mesh information is received once for the virtual representation call for the virtual session.

14. The method of claim 13, wherein the first mesh information is received in response to the call acceptance transmitted to the first client device.

15. The method of claim 12, wherein the first mesh information is received before receiving the call establishment request.

16. The method of claim 12, wherein the first mesh information is received as a part of a registration procedure.

17. The method of claim 12, further comprising:

storing the first mesh information; and retrieving the first mesh information based on the received call acceptance.

18. The method of claim 17, further comprising: authenticating the first client device to enable access to the stored first mesh information.

19. The method of claim 12, wherein the first mesh animation parameters are received for each frame the virtual session at a frame rate associated with the virtual session.

20. The method of claim 12, wherein the first mesh animation parameters include information representing the first user.

21. The method of claim 20, wherein the information representing the first user comprises at least one of information representing a face of the first user of the first client device, information representing a body of the first user of the first client device, information representing one or more hands of the first user of the first client device, pose information of the first client device, or audio associated with an environment in which the first client device is located.

22. An apparatus for communications, the apparatus comprising:

at least one memory; and at least one processor coupled to the at least one memory, the at least one processor being configured to:

transmit, to a second device, a call establishment request for a virtual representation call for a virtual session;

receive, from the second device, a call acceptance indicating acceptance of the call establishment request;

transmit, to the second device, first mesh information for a first virtual representation of a first user of the apparatus;

transmit, to the second device, first mesh animation parameters for the first virtual representation of the first user of the apparatus, wherein the first mesh animation parameters comprise parameters for animating the first virtual representation separate from the first mesh information;

receive, from the second device, second mesh information for a second virtual representation of a second user of the second device;

receive, from the second device, second mesh animation parameters for the second virtual representation of the second user of the second device, wherein the second mesh animation parameters comprise parameters for animating the second virtual representation separate from the first mesh information; and generate, based on the second mesh information and the second mesh animation parameters, the second virtual representation of the second user of the second device.

23. The apparatus of claim 22, wherein the first mesh information is transmitted once for the virtual representation call for the virtual session, and wherein the second mesh information is received once for the virtual representation call for the virtual session.

24. The apparatus of claim 22, wherein the second device comprises a server device.

25. The apparatus of claim 24, wherein the first mesh information is transmitted to the server device for storage prior to transmitting the call establishment request.

26. The apparatus of claim 24, wherein the first mesh information is transmitted to the server device for storage as a part of a registration procedure.

27. The apparatus of claim 26, wherein the at least one processor is further configured to authenticate with the server device, to enable access to stored first mesh information.

28. The apparatus of claim 22, wherein the second device comprises a client device.

29. The apparatus of claim 22, wherein the first mesh animation parameters are transmitted and the second mesh animation parameters are received for each frame the virtual session at a frame rate associated with the virtual session.

30. An apparatus for communications, the apparatus comprising:

at least one memory; and at least one processor coupled to the at least one memory, the at least one processor being configured to:

receive, from a first client device, a call establishment request for a virtual representation call for a virtual session;

transmit the call establishment request to a second client device;

receive, from the second client device, a call acceptance indicating acceptance of the call establishment request;

transmit, to the first client device, the call acceptance;

receive, from the first client device, first mesh information for a first virtual representation of a first user of the first client device;

receive first mesh animation parameters for the first virtual representation of the first user of the first client device, wherein the first mesh animation parameters comprise parameters for animating the first virtual representation separate from the first mesh information;

generate, based on the first mesh information and the first mesh animation parameters, the first virtual representation of the first user of the first client device; and transmit, to the second client device, the first virtual representation of the first user of the first client device.

31. The apparatus of claim 1, wherein the first mesh animation parameters include at least one of facial part codes, face blend shapes, hand joint codes, head pose, or audio stream.

* * * * *